United States Patent
Nakashima et al.

(10) Patent No.: US 8,735,513 B2
(45) Date of Patent: May 27, 2014

(54) REACTOR FOR PROPYLENE POLYMERIZATION AND PROCESS FOR PRODUCING PROPYLENE POLYMER

(75) Inventors: Takanori Nakashima, Yokkaichi (JP); Katsuhiko Oono, Yokkaichi (JP); Kenji Mitsutani, Yokkaichi (JP); Takao Tayano, Yokkaichi (JP); Tomoyuki Yoshida, Yokkaichi (JP); Shigeo Mizukami, Yokkaichi (JP); Yusuke Yamada, Yokkaichi (JP)

(73) Assignee: Japan Polypropylene Corporation, Tokyo (JP)

( * ) Notice: Subject to any disclaimer, the term of this patent is extended or adjusted under 35 U.S.C. 154(b) by 0 days.

(21) Appl. No.: 13/505,852

(22) PCT Filed: Nov. 5, 2010

(86) PCT No.: PCT/JP2010/069752
§ 371 (c)(1),
(2), (4) Date: Jun. 27, 2012

(87) PCT Pub. No.: WO2011/055802
PCT Pub. Date: May 12, 2011

(65) Prior Publication Data
US 2012/0264893 A1    Oct. 18, 2012

(30) Foreign Application Priority Data

Nov. 6, 2009  (JP) ................................. 2009-254892
Nov. 6, 2009  (JP) ................................. 2009-254898

(51) Int. Cl.
*C08F 2/00*       (2006.01)
*C08F 210/00*   (2006.01)
*C08F 110/06*   (2006.01)
*B01J 19/18*     (2006.01)

(52) U.S. Cl.
USPC .............. 526/65; 422/134; 526/348; 526/351

(58) Field of Classification Search
USPC .............................. 422/134; 526/65, 348, 351
See application file for complete search history.

(56) References Cited

U.S. PATENT DOCUMENTS 6,184,299 B1    2/2001 Madden et al.

FOREIGN PATENT DOCUMENTS

CN    87100218 A    8/1988
CN    1590416 A    3/2005

(Continued)

OTHER PUBLICATIONS

Search report from International Application No. PCT/JP2010/069752, mail date is Feb. 1, 2011.

(Continued)

*Primary Examiner* — William Cheung
(74) *Attorney, Agent, or Firm* — Greenblum & Bernstein, P.L.C.

(57) ABSTRACT

A propylene polymerization reaction apparatus and a production method of a propylene-based polymer are capable of producing a continuous multi-stage polymer in low cost, high productivity and stably, and significantly reducing generation amount of an off-specification product accompanying change of polymerization condition, in multi-stage continuous vapor phase polymerization method of a propylene-based polymer using a catalyst for olefin polymerization. A reaction apparatus for producing a propylene-based polymer by a multi-stage continuous vapor phase polymerization method is used. One or more reactor of a horizontal-type reactor having inside a stirring machine which rotates around a horizontal axis, and a continuous stirred tank reactor to be connected to the horizontal-type reactor are provided, and a production method of a propylene-based polymer using the same.

30 Claims, 16 Drawing Sheets

(56) References Cited

FOREIGN PATENT DOCUMENTS

| | | | |
|---|---|---|---|
| CN | 1590416 A | * | 3/2005 |
| CN | 1887916 A | | 1/2007 |
| JP | 57-65703 | | 4/1982 |
| JP | 61-66705 | | 4/1986 |
| JP | 3-65366 | * | 10/1991 |
| JP | 7-118342 | | 5/1995 |
| JP | 2675919 | | 7/1997 |
| JP | 2000-302806 | | 10/2000 |
| JP | 2002-30127 | | 1/2002 |
| JP | 2004-217896 | | 8/2004 |
| JP | 3852957 | | 9/2006 |
| JP | 2007-84645 | | 4/2007 |
| JP | 2007-321136 | | 12/2007 |
| JP | 2008-115321 | | 5/2008 |
| JP | 2008-247999 | | 10/2008 |
| JP | 2008-260546 | | 10/2008 |
| JP | 4217272 | | 11/2008 |
| JP | 2009-73890 | | 4/2009 |

OTHER PUBLICATIONS

Office Action in counterpart Chinese Application No. 201080060910.9, mailed Jul. 10, 2013.

Japanese Office Action in relation to Japanese Application No. 2010-248934, dated Jan. 28, 2014, with Abstract.

Japanese Office Action in relation to Japanese Application No. 2010-245319, dated Jan. 28, 2014, with Abstract.

Japanese Office Action in relation to Japanese Application No. 2010-245316, dated Jan. 28, 2014, with Abstract.

Moore, Polypropylene Handbook, Polymerization, Characterization, Properties, Processing , Applications, 1996, Carl Hanser Verlag, 1996, pp. 292, 293.

Pages of the Novolen Process downloaded Feb. 28, 2014 from website http://www.novolentechnology.com/swf/Novolen Neu 16.swf (4 pp.).

* cited by examiner

REACTOR FOR PROPYLENE POLYMERIZATION AND PROCESS FOR PRODUCING PROPYLENE POLYMER

This application is a U.S. national stage application of International Application No. PCT/JP2010/069752 filed Nov. 5, 2010. The contents of which are hereby incorporated by reference in their entirety.

TECHNICAL FIELD

The present invention relates to a propylene polymerization reaction apparatus and a production method of a propylene-based polymer, and in more detail, the present invention relates to a propylene polymerization reaction apparatus and a production method of a propylene-based polymer, which are capable of producing a high quality continuous multi-stage polymer in low cost, high productivity and stably, in multi-stage continuous vapor phase polymerization method of a propylene-based polymer using a catalyst for olefin polymerization.

In more detail, the present invention relates to a propylene polymerization reaction apparatus and a production method of a propylene-based polymer, which are capable of significantly reducing generation amount of an off-specification product accompanying with change of polymerization condition, without decreasing productivity, providing superior balance of rigidity/impact strength, as well as suppressing gel generation, and also stably and efficiently producing a high quality continuous multi-stage polymer such as the one having suppressed gloss, one having high fluidity, or one having a wide composition with suppressed adhesion inside a reactor.

BACKGROUND ART

A polypropylene resin has conventionally been used in various fields, because of being relatively cheap and having many superior characteristics.

However, because of limited applications as a simple substance of polypropylene, various improvements have been added. For example, there have been proposed a propylene-based block copolymer obtained by homopolymerization of propylene and then copolymerization of propylene and ethylene, to enhance impact resistance, or a propylene-based polymer with widened molecular weight distribution obtained by stepwise production of polypropylene with different molecular weight, to improve formability and appearance.

In producing these resins, there is a method for kneading again each component in predetermined ratio, after producing each component separately, however, from economical efficiency and worry of decrease in quality by kneading, a multi-stage continuous polymerization method for producing each component continuously is advantageous. However, because polymer particles become nearly a completely mixed state in one container, short pass where not sufficiently grown particles are exhausted, or accumulation of too grown particles inside the container easily occurs, thus causing decrease in quality of said polymer. To solve this, it is also considered to attain plug flow as a whole by connecting a plurality of continuous stirred tank reactors in series, however, installment of many reactors requires equipment cost.

In one reactor, there has been known, as a known one for attaining plug flow by decreasing residence time distribution, a horizontal-type reactor having a stirring machine which rotates around a horizontal axis (a horizontal-type vapor phase method process, for example, refer to PATENT LITERATURE 1. Hereafter a reactor may be referred to as a reaction tank.). In general, catalyst particles gradually grow to polymer particles by a polymerization reaction, however, in the case of performing polymerization in the horizontal-type reactor, these particles proceed along an axis direction of a reactor while gradually growing, by two forces of generation of polypropylene by polymerization and mechanical stirring. Therefore, particles with the same degree of growth, that is, residence time align with time from the upstream toward the downstream of the reactor. That is, in the horizontal-type reactor, a flow pattern of fluid becomes a plug flow-type, which has effect of narrowing residence time distribution in the same degree as in the case of aligning a plurality units of continuous stirred tank reactors in series. Accordingly, in producing said polymer, the propylene polymerization reaction apparatus composed by connecting multiple units of horizontal-type reactors in series is advantageous.

It should be noted that, in the case of aiming at improvement of polypropylene shown by the above-described example, a component having low molecular weight, or a component having many ethylene components or the like is produced in a certain polymerization step. In the horizontal-type reactor, latent heat of liquefied propylene is utilized to remove heat of polymerization. As liquefied propylene, the liquefied one obtained by taking out unreacted propylene gas from a polymerization reaction tank and then by cooling with a heat exchanger, may be used in some cases. Because temperature (dew point) where unreacted gas is liquefied depends on pressure and a composition of unreacted gas, a large quantity of mixing of a gas component having lower dew point, such as hydrogen or ethylene, into propylene, as compared with dew point of single propylene, decreases dew point accompanying with increase in mixing amount. As a result, in a process including the horizontal-type reactor, a problem of significant decrease in productivity in view of heat removal is raised, in producing a multi-stage polymer containing a component having low molecular weight, or a component such as ethylene.

To solve the above problems, there is also a method for enhancing cooling capability of a heat exchanger, however, that case requires tremendous equipment cost. Provided that the heat exchanger having high capability is installed, its operation requires tremendous energy.

In this way, although a horizontal-type vapor phase method process has superior plug flow characteristics, the case of producing a multi-stage polymer having a component containing low molecular weight, or a component having ethylene or the like in high content has a problem to be solved in view of productivity and operation cost.

In addition, crystalline polypropylene is cheap and has superior characteristics in rigidity and heat resistance, however, had a problem that impact strength, in particular, impact strength at low temperature is weak. As a method for improving this point, there has been known a method for forming a block copolymer by step-wise polymerization of propylene and an α-olefin or other olefin. A propylene-based block copolymer is composed of a crystalline propylene polymer part and a amorphous propylene/α-olefin copolymer part, and is capable of preparing a molded article having high rigidity and superior impact resistance at low temperature. Accordingly, it has widely been used in applications of automotive parts, electric appliance parts and the like.

It should be noted that in molded articles made of polyolefin to be used in automobile and electric appliance applications, there are applications requiring gloss, while there are also applications requiring low gloss, because molded articles with low gloss provide feeling of luxury. In particular, in applications of automotive interior or exterior materials, a material showing low gloss is desired.

In the propylene-based block copolymer, furnishing of impact resistance is mainly attained by increasing content of the amorphous propylene/α-olefin copolymer, as well as suppression of gloss is attained by increasing molecular weight of the amorphous propylene/α-olefin copolymer and content of the α-olefin. However, these methods not only increase gel in the propylene-based block copolymer, and deteriorate appearance of a product caused by a large quantity of gel but also cause to decrease impact resistance. To begin with, because main cause of gel generation is generation of distribution of polymerization time (residence time in a polymerization tank) of a catalyst component in the first stage polymerization step, and generation of particles having high content of the amorphous propylene/α-olefin copolymer, when particles exhausted from the polymerization tank in relatively short time (bypassing particles) enter a polymerization tank of the second stage polymerization step, in the multi-stage continuous vapor phase polymerization method, it can be reduced significantly by adopting a batch method. However, a batch method has a problem of being inferior in view of economical efficiency and productivity.

As a method for producing a propylene-based block copolymer having low gloss by the multi-stage continuous vapor phase polymerization method, there has been disclosed a method for increasing molecular weight of the amorphous propylene/α-olefin copolymer or content of the α-olefin (for example, refer to PATENT LITERATURE 2 and 3), however, because the first stage polymerization step is performed in the continuous stirred tank reactor, there is left a problem in view of suppression of gel. On the other hand, as a polymerization method in which gel is suppressed, there has been known a method for using a horizontal-type reactor (for example, refer to PATENT LITERATURE 1). This method is advantageous in view of suppression of gel, because of narrow residence time distribution in a reaction tank, which enables to reduce bypassing particles in one reaction tank, however, has a problem of generation of composition distribution and easy providing high gloss in producing the amorphous propylene/α-olefin copolymer, because of removing heat of polymerization by latent heat of vaporization of liquid propylene, causing a non-uniform gas composition in a reactor. As another method, there has been disclosed a method for performing the first stage polymerization step by connecting three reaction tanks in series, and subsequently producing a copolymer component having increased content of the α-olefin (for example, refer to PATENT LITERATURE 4). This method improves as for suppression of gel, however, requires installment of many reactors, as well as has a problem of inability of producing desired amount of a copolymer in the second stage polymerization step, because of longer residence time in the first stage polymerization step, which decreases capability of a catalyst.

On the other hand, it has been described in the above-described PATENT LITERATURE 2 that molecular weight of the amorphous propylene/α-olefin copolymer is also an important factor in producing said propylene-based block copolymer. In the multi-stage continuous vapor phase polymerization method, because transfer of a polymer between polymerization reactors is performed by pressurized transfer, gas in a vapor phase polymerization reactor of the first stage polymerization step is also sent to the second stage polymerization step entrained with the polymer, therefore a gas composition in the vapor phase polymerization reactor of the first stage polymerization step is largely influenced by that of the first stage polymerization step. For example, to obtain a polymer having desired molecular weight, generally hydrogen is used in many cases as a molecular weight modifier, however, in the case of supplying a large quantity of hydrogen to obtain a polymer with low molecular weight in the first stage polymerization step, even trying to obtain a copolymer with high molecular weight without supplying hydrogen in the second stage polymerization step, hydrogen in entrained gas from a reactor of the first stage polymerization step inevitably flows into a reactor of the second stage polymerization step, resulting in generation of limitation in molecular weight of a copolymer formed in the second stage polymerization step.

As a method for solving this problem, there has been disclosed a method for diluting entrained gas with inert gas, in a receiver installed between polymerization reactors, to lower a hydrogen gas composition, and after that for transferring it to the second stage polymerization step (for example, refer to PATENT LITERATURE 6), however, this method cannot prevent flowing-in of hydrogen or the like completely, and could incur fluctuation of partial pressure of a monomer. As another method, there has been disclosed a method for receiving a polymer into said receiver, and then once exhausting entrained gas in said receiver, and transferring it to the second stage polymerization step by pressurization again using propylene gas or inert gas, (for example, refer to PATENT LITERATURE 7). This is a method for suppressing flow-in of hydrogen or the like to the second stage polymerization step to the utmost, however, because of necessity to supply propylene or inert gas into said receiver, till completion of transfer of a polymer remaining inside the receiver or a pipeline, excess propylene or inert gas flows-in to the second stage polymerization step, which could fluctuate partial pressure of a monomer. As a further another method, there has been disclosed a method for installing a receiver at a position higher than a reactor of the second stage polymerization step, and using circulation gas of the second stage polymerization step as pressurized gas (for example, refer to PATENT LITERATURE 8), however, because of use of circulation gas of the second stage polymerization step containing a comonomer such as ethylene, there is left a problem of risk of forming a sticky polymer in the receiver and inside a pipeline.

In addition, in particular, in automotive members, it has been desired enhancement of balance of rigidity/impact resistance at low temperature of a propylene-based block copolymer, as well as attaining high fluidity of said copolymer, aiming at making larger and lighter members.

Generally, in attaining high fluidity of the propylene-based block copolymer, it is mainly attained by attaining high fluidity (decreasing molecular weight) of the crystalline propylene polymer part. As another method, there is also a method for decreasing molecular weight of an amorphous propylene/α-olefin copolymer component, however, this method decreases at the same time impact resistance at low temperature of the propylene-based block copolymer, and is thus not preferable to attain the object of the present invention.

In general, to adjust molecular weight of the crystalline propylene component, a molecular weight modifier such as hydrogen is used, however, in particular, to express high fluidity of the propylene-based block copolymer the present invention desires, it is necessary to maintain high hydrogen concentration inside a polymerization reactor in the first stage polymerization step, and further maintain low hydrogen concentration in a copolymerization step.

As a method for producing the propylene-based block copolymer with enhanced impact resistance by the multi-stage continuous vapor phase polymerization method, there has been disclosed a method for increasing molecular weight of the amorphous propylene/α-olefin copolymer or content of the α-olefin (for example, refer to PATENT LITERATURE 2 and 3), however, because the first stage polymerization step is performed in the continuous stirred tank reactor, there is left a problem in view of suppression of gel. On the other hand, as a polymerization method in which gel is suppressed, there has been known a method for using a horizontal-type reactor (for example, refer to PATENT LITERATURE 5). This method has a problem that condensation of unreacted gas becomes difficult and content of a comonomer cannot be increased, in the case of using a comonomer having low boiling point such as ethylene, as the α-olefin to be used in the second stage polymerization step, because removal of heat of polymerization is performed by latent heat of vaporization of liquid propylene, although having advantage in view of suppression of gel, because residence time distribution inside a reaction tank is narrow and thus bypassing particles in one reaction tank can be reduced. Further, because of using two horizontal-type reactors, in continuous operation, it is difficult to produce a copolymer component having desired high molecular weight due to leakage of hydrogen from the first reactor.

As another method, there has been disclosed a method for connecting three continuous stirred tank reactors in series, to perform the first stage polymerization step in the first reaction tank, and produce a copolymer component having increased content of the α-olefin in the second and the third reaction tanks (for example, refer to PATENT LITERATURE 4 and 9). The method of PATENT LITERATURE 4 requires setting of restriction of molecular weight of a polymer in each tank for gel suppression, and thus has a problem in more increasing molecular weight of the amorphous propylene/α-olefin copolymer component. In addition, the method of PATENT LITERATURE 9 has a problem in view of increasing productivity while maintaining quality of the propylene-based block copolymer, such as requiring setting of restriction of production speed in the first stage polymerization step.

Further, as another method aiming at suppression of gel in a three-stage polymerization method, or reducing adhesion or the like in the reaction tank, there has been proposed a method for specifying amount of an electron donor compound to be added to the second and the third tanks (for example, refer to PATENT LITERATURE 10). However, this method requires addition of a relatively large quantity of the electron donor compound to the second reactor, which raises restriction of reaction amount of a copolymer production in each reactor, depending on amount the electron donor compound to be added.

Accordingly, in multi-stage continuous vapor phase polymerization method, there has been desired a propylene polymerization reaction apparatus or a production method of a propylene-based polymer, which are capable of producing a high quality continuous multi-stage polymer such as the one having superior balance of rigidity/impact strength, as well as suppressed gel generation, and also suppressed gloss, high fluidity, or the one having a wide composition with suppressed adhesion inside a reaction tan, in low cost and stably, without decreasing productivity, even in the case of polymerization of a component having low molecular weight.

CITATION LIST

Patent Literature

PATENT LITERATURE 1: JP-B-2675919
PATENT LITERATURE 2: JP-A-2002-30127
PATENT LITERATURE 3: JP-A-2008-260546
PATENT LITERATURE 4: JP-A-2004-217896
PATENT LITERATURE 5: JP-A-2007-321136
PATENT LITERATURE 6: JP-A-57-65703
PATENT LITERATURE 7: JP-A-3-65366
PATENT LITERATURE 8: JP-A-7-118342
PATENT LITERATURE 9: JP-B-3852957
PATENT LITERATURE 10: JP-B-4217272

SUMMARY OF INVENTION

Technical Problem

In view of the above conventional technical problems, it is an object of the present invention to provide a propylene polymerization reaction apparatus and a production method of a propylene-based polymer, which are capable of producing a high quality continuous multi-stage polymer in low cost, high productivity and stably, in multi-stage continuous vapor phase polymerization method of a propylene-based polymer using a catalyst for olefin polymerization.

In more detail, it is an object of the present invention to provide a propylene polymerization reaction apparatus and a production method of a propylene-based polymer, which are capable of significantly reducing generation amount of an off-specification product accompanying with change of polymerization condition, without decreasing productivity, in multi-stage continuous vapor phase polymerization method, for producing stably and efficiently a high quality continuous multi-stage polymer, such as the one having superior balance of rigidity/impact strength, as well as suppressing gel generation, and also suppressed gloss, the one having high fluidity, or the one having a wide composition with suppressed adhesion in a reaction tank.

Solution to Problem

The present inventors have intensively studied a way to solve the above problems and discovered that the above problems can be solved by preparing the propylene polymerization reaction apparatus provided with each at least one or more tank of a horizontal-type reactor, and a continuous stirred tank reactor to be connected thereto, in a reaction apparatus for producing a propylene-based polymer by a multi-stage continuous vapor phase polymerization method, and further by the production method of a propylene-based polymer using the same, and have thus completed the present invention.

That is, according to a first aspect of the present invention, there is provided a propylene polymerization reaction apparatus for producing a propylene-based polymer by a multi-stage continuous vapor phase polymerization method, characterized in that each at least one reactor or more of a horizontal-type reactor having inside a stirring machine which rotates around a horizontal axis, and a continuous stirred tank reactor to be connected to said horizontal-type reactor are provided.

In addition, according to a second aspect of the present invention, there is provided, in the first aspect, the propylene polymerization reaction apparatus, characterized in that the continuous stirred tank reactor is installed just after the horizontal-type reactor.

In addition, according to a third aspect of the present invention, there is provided, in the first aspect, the propylene polymerization reaction apparatus, characterized in that at least two reactors of the horizontal-type reactor are provided.

In addition, according to a fourth aspect of the present invention, there is provided, in the third aspect, the propylene polymerization reaction apparatus, characterized in that at least two reactors among the horizontal-type reactors are arranged at the upstream side than the continuous stirred tank reactor arranged at the most upstream process side among the continuous stirred tank reactors.

In addition, according to a fifth aspect of the present invention, there is provided, in the third aspect, the propylene polymerization reaction apparatus, characterized in that at least one reactor among the horizontal-type reactors, other one reactor among the horizontal-type reactors, and one reactor among the continuous stirred tank reactors are arranged in this order from the upstream process side.

In addition, according to a sixth aspect of the present invention, there is provided, in the first aspect, the propylene polymerization reaction apparatus, characterized in that at least two reactors of the continuous stirred tank reactor are provide In addition, according to a seventh aspect of the present invention, there is provided, in the sixth aspect, the propylene polymerization reaction apparatus, characterized in that at least one reactor among the horizontal-type reactors is arranged at the upstream side than the continuous stirred tank reactor arranged at the most upstream process side among the continuous stirred tank reactors.

In addition, according to an eight aspect of the present invention, there is provided, in the sixth aspect, the propylene polymerization reaction apparatus, characterized in that at least one reactor among the horizontal-type reactors, one reactor among the continuous stirred tank reactors, and other one reactor among the continuous stirred tank reactors are arranged in this order from the upstream process side.

In addition, according to a ninth aspect of the present invention, there is provided, in any one of the first to the eighth aspects, the propylene polymerization reaction apparatus, characterized in that a receiver having at least one level gauge is installed between the horizontal-type reactor and the continuous stirred tank reactor to control amount of a polymer which should be transferred between both reactors.

In addition, according to a tenth aspect of the present invention, there is provided, in the ninth aspect, the propylene polymerization reaction apparatus, characterized in that the continuous stirred tank reactor is installed just after the horizontal-type reactor via the receiver.

In addition, according to an eleventh aspect of the present invention, there is provided, in the ninth or the tenth aspect, the propylene polymerization reaction apparatus, characterized in that the receiver is arranged just under an exit for taking out a polymer of the horizontal-type reactor, and at a position higher than an entrance of the polymer of the continuous stirred tank reactor.

In addition, according to a twelfth aspect of the present invention, there is provided, in any one of the ninth to the eleventh aspects, the propylene polymerization reaction apparatus, characterized in that the receiver is the one provided with a gas introduction valve and a gas exhaustion valve.

In addition, according to a thirteenth aspect of the present invention, there is provided, in any one of the first to the twelfth aspects, the propylene polymerization reaction apparatus, characterized in that the continuous stirred tank reactor is a reactor for performing removal of heat of polymerization by utilization of mainly sensible heat of circulation gas.

In addition, according to a fourteenth aspect of the present invention, there is provided, in any one of the first to the thirteenth aspects, the propylene polymerization reaction apparatus, characterized in that the continuous stirred tank reactor is a reactor selected from a vertical-type stirring tank reactor, a stirring-type fluidized bed-type reactor, or a fluidized bed-type reactor.

In addition, according to a fifteenth aspect of the present invention, there is provided, in any one of the first to the thirteenth aspects, the propylene polymerization reaction apparatus, characterized in that the continuous stirred tank reactor is a fluidized bed-type reactor.

In addition, according to a sixteenth aspect of the present invention, there is provided, in any one of the first to the fifteenth aspects, the propylene polymerization reaction apparatus, characterized in that the horizontal-type reactor has an L/D of 5 or larger (L: length of a horizontally longer direction, and D: inner diameter).

In addition, according to a seventeenth aspect of the present invention, there is provided, in any one of the first to the sixteenth aspects, a production method of a propylene-based polymer, characterized by using the propylene polymerization reaction apparatus, and performing multi-stage continuous vapor phase polymerization of propylene in the presence of a catalyst for olefin polymerization.

In addition, according to an eighteenth aspect of the present invention, there is provided, in the seventeenth aspect, the production method of a propylene-based polymer, characterized in that a polymerization reaction in the continuous stirred tank reactor is performed using reactant gas having a dew point of 50° C. or lower.

In addition, according to a nineteenth aspect of the present invention, there is provided, in the seventeenth aspect, the production method of a propylene-based polymer, characterized by performing a first stage polymerization step for producing a polymer component (A) having a content of a monomer unit, based on propylene, of 95% by weight or more, by homopolymerization of propylene, or copolymerization of propylene and an α-olefin (provided that propylene is excluded) in the horizontal-type reactor, and subsequently performing a second stage polymerization step for producing a copolymer component (B) having a content of a monomer unit, based on propylene, of 95 to 5% by weight, by copolymerization of propylene and an α-olefin (provided that propylene is excluded) in the continuous stirred tank reactor.

In addition, according to a twentieth aspect of the present invention, there is provided, in the nineteenth aspect, the production method of a propylene-based polymer9, characterized in that the first stage polymerization step is performed in at least one reactor of the horizontal-type reactor.

In addition, according to a twenty first aspect of the present invention, there is provided, in the nineteenth aspect, the production method of a propylene-based polymer, characterized in that the second stage polymerization step is performed in at least one reactor of the continuous stirred tank reactor.

In addition, according to a twenty second aspect of the present invention, there is provided, in any one of the third to the fifth aspects, a production method of a propylene-based polymer for performing multi-stage continuous vapor phase polymerization of propylene in the presence of a catalyst for olefin polymerization, using the propylene polymerization reaction apparatus, characterized in that the first stage polymerization step is performed in at least two reactors of the horizontal-type reactor.

In addition, according to a twenty third aspect of the present invention, there is provided, in any one of the sixth to the eighth aspects, a production method of a propylene-based polymer for performing multi-stage continuous vapor phase polymerization of propylene in the presence of a catalyst for olefin polymerization, using the propylene polymerization reaction apparatus, characterized in that the second stage polymerization step is performed in at least two reactors of the continuous stirred tank reactor.

In addition, according to a twenty fourth aspect of the present invention, there is provided, in any one of the nineteenth to the twenty third aspects, the production method of a propylene-based polymer, characterized in that melt flow rate of the polymer component (A) ($MFR_1$) and melt flow rate of the copolymer component (B) ($MFR_2$) satisfy a relation of $3 \leq \log(MFR_1/MFR_2) \leq 7$.

In addition, according to a twenty fifth aspect of the present invention, there is provided, in the twenty third aspect, the production method of a propylene-based polymer, characterized in that the copolymer components produced in each of the continuous stirred tank reactors differ in content of the α-olefin and/or molecular weight.

Advantageous Effects of Invention

According to the first aspect of the present invention, there is effect that it is a production apparatus which is capable of producing a continuous multi-stage polymer of a propylene-based polymer in minimal capital investment cost, and by stably maintaining high productivity.

In addition, according to the second aspect of the present invention, in the case of changing residence time in a specific vapor phase polymerization reaction tank in the multi-stage continuous vapor phase polymerization method, adjustment thereof becomes extremely easy (short time), as a result, there is effect that it is a production apparatus which is capable of producing by significantly reducing generation amount of an off-specification product accompanying with change of polymerization condition.

In addition, according to the third to the fifth aspects of the present invention, there is effect that they are manufacturing apparatuses which are capable of efficiently producing a propylene-based block polymer, which has superior balance of rigidity/impact resistance at low temperature, as well as suppressing generation of gel and high fluidity, which is suitable for automotive exterior material or the like. In addition, there is effect that they are manufacturing apparatuses enabling to supply the propylene-based block copolymer which is cheaper and stable in quality, because of a continuous vapor phase polymerization method.

In addition, according to the sixth to the eighth aspects of the present invention, there is effect that they are manufacturing apparatuses which are capable of stably and efficiently producing, by suppressing adhesion in the reaction tank, a propylene-based block polymer, which has superior balance of rigidity/impact resistance, as well as suppressing generation of gel, which is suitable for automotive members or electric appliance members and the like. Additionally, there is effect that they are manufacturing apparatus enabling to supply the propylene-based block copolymer which is cheaper and stable in quality, because of a continuous vapor phase polymerization method.

In addition, by installing two or more continuous stirred tank reactors, not only increase in content of the copolymer component of the propylene-based block copolymer becomes easy but also in the case of producing the copolymer component in two or more tanks, by making the copolymer component having different content of the α-olefin and/or molecular weight in each tank, there is effect that they are manufacturing apparatus enabling to attain further quality enhancement and diversity.

In addition, according to the ninth to the twelfth aspects of the present invention, there is effect that they are production apparatus which are capable of efficiently producing a propylene-based block polymer, which has superior balance of rigidity/impact resistance, as well as suppressed generation of gel and gloss, which is suitable for automotive exterior material or the like. In addition, there is effect that they are manufacturing apparatus enabling to supply the propylene-based block copolymer which is cheaper and stable in quality, because of a continuous vapor phase polymerization method.

In addition, according to the thirteenth to the fifteenth aspects of the present invention, there is effect that it is a production apparatus not receiving influence of decrease in dew point of reactant gas (gas at a reaction zone) on productivity, because of utilization of sensible heat of circulation gas (gas at a reaction zone) for removal of heat of polymerization.

In addition, according to the sixteenth aspect of the present invention, there is effect that it is a manufacturing apparatus enabling to attain narrowing residence time distribution sufficiently.

In addition, according to the seventeenth aspect of the present invention, there is effect that it is a production apparatus which is capable of producing a continuous multi-stage polymer of a propylene-based polymer in minimal capital investment cost, and by stably maintaining high productivity.

In addition, according to the eighteenth aspect of the present invention, in the case of changing residence time in a specific vapor phase polymerization reaction tank in the multi-stage continuous vapor phase polymerization method, adjustment thereof becomes extremely easy (short time), as a result, there is effect that it is a production apparatus of a propylene-based polymer, which is capable of producing by significantly reducing generation amount of an off-specification product accompanying with change of polymerization condition.

In addition, according to the nineteenth to the twenty first aspects of the present invention, there is effect that they are manufacturing apparatuses which are capable of producing a continuous multi-stage polymer of a propylene-based block copolymer in minimal capital investment cost, and by stably maintaining high productivity.

In addition, according to the twenty second or the twenty fourth aspects of the present invention, there is effect that it is a production method which is capable of efficiently producing a propylene-based block polymer, which has superior balance of rigidity/impact resistance at low temperature, as well as suppressed gel generation and high fluidity, which is suitable for automotive exterior material or the like. In addition, there is effect of being a production method enabling to supply the propylene-based block copolymer which is cheaper and stable in quality, because of a continuous vapor phase polymerization method.

In addition, according to the twenty third or the twenty fifth aspects of the present invention, there is effect that it is a production method which is capable of stably and efficiently producing, by suppressing adhesion inside the reaction tank, a propylene-based block polymer, which has superior balance of rigidity/impact resistance, as well as suppressed gel generation, which is suitable for automotive members or electric appliance members and the like. In addition, there is effect that it is a production method enabling to supply the propylene-based block copolymer which is cheaper and stable in quality, because of a continuous vapor phase polymerization method.

In addition, by installing two or more continuous stirred tank reactors, not only increase in copolymer component content of the propylene-based block copolymer becomes easy but also in the case of producing the copolymer component in two or more tanks, by making the copolymer component having different content of the α-olefin and/or molecular weight in each tank, there is effect that it is a production method enabling to attain further quality enhancement and diversity.

DESCRIPTION OF EMBODIMENTS

Figure 1:
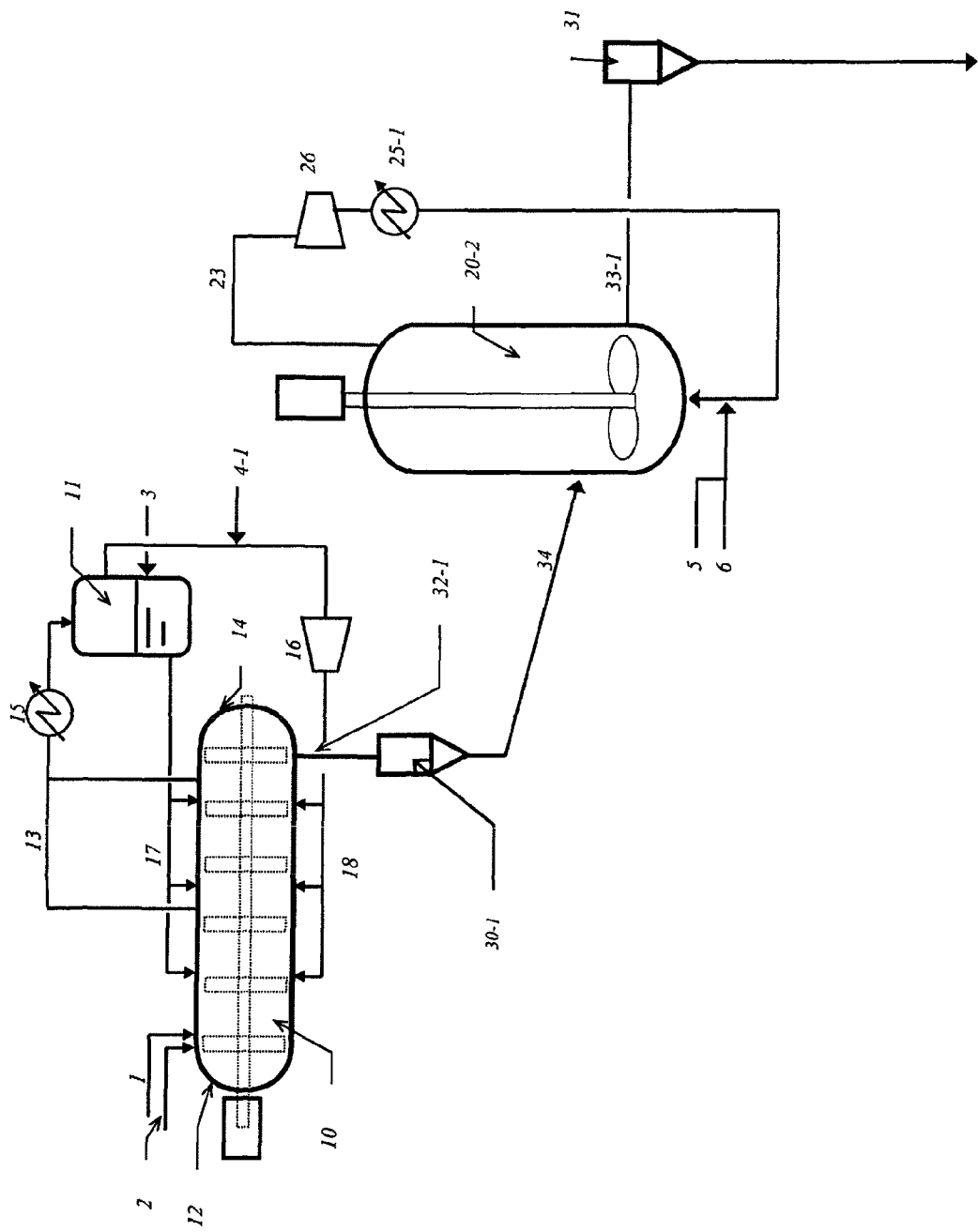
FIG. 1 is a schematic drawing showing a flow sheet of a propylene polymerization reaction apparatus, in combination of a horizontal-type reactor and a stirring-type fluidized bed-type reactor, in the present invention.

The propylene polymerization reaction apparatus of the present invention is a reaction apparatus for producing a propylene-based polymer by a multi-stage continuous vapor phase polymerization method, characterized in that each at least one or more tank of a horizontal-type reactor having inside a stirring machine which rotates around a horizontal axis, and a continuous stirred tank reactor to be connected to said horizontal-type reactor are provided.

In addition, the propylene polymerization reaction apparatus of the present invention is a reaction apparatus for producing a propylene-based polymer by a multi-stage continuous vapor phase polymerization method, characterized in that at least two horizontal-type reactors having inside a stirring machine which rotates around a horizontal axis, and at least one continuous stirred tank reactor are provided, all in series.

In addition, the propylene polymerization reaction apparatus of the present invention is a polymerization reaction apparatus for producing a propylene-based polymer by a multi-stage continuous vapor phase polymerization method, characterized in that at least one horizontal-type reactor having inside a stirring machine which rotates around a horizontal axis, and at least two continuous stirred tank reactors are provided, all in series.

In addition, the propylene polymerization reaction apparatus of the present invention is further characterized in that a receiver having a level gauge is installed between the horizontal-type reactor and the continuous stirred tank reactor to control amount of a polymer which should be transferred between both tanks.

In addition, the propylene polymerization reaction apparatus of the present invention is a production method of a propylene-based polymer using the propylene polymerization reaction apparatus, characterized in that multi-stage continuous vapor phase polymerization of propylene is performed in the presence of a catalyst for olefin polymerization.

Explanation will be given below in detail on embodiments of the present invention, with reference to drawings as needed. In addition, positional relation of up and down, left and right or the like shall be based on positional relation shown in the drawings, unless otherwise specified. Further, dimensional ratio of the drawings shall not be limited to ratio shown in the drawing.

<The Propylene Polymerization Reaction Apparatus>

The propylene polymerization reaction apparatus of the present invention is a reaction apparatus for producing a propylene-based polymer by a multi-stage continuous vapor phase polymerization method, characterized in that each at least one or more tank of a horizontal-type reactor having inside a stirring machine which rotates around a horizontal axis, and a continuous stirred tank reactor to be connected to said horizontal-type reactor are provided.

In addition, the propylene polymerization reaction apparatus of the present invention is a reaction apparatus for producing a propylene-based polymer by a multi-stage continuous vapor phase polymerization method, characterized in that at least two horizontal-type reactors having inside a stirring machine which rotates around a horizontal axis, and at least one continuous stirred tank reactor are arranged, all in series.

In addition, the propylene polymerization reaction apparatus of the present invention is a reaction apparatus for producing a propylene-based polymer by a multi-stage continuous vapor phase polymerization method, characterized in that at least one horizontal-type reactor having inside a stirring machine which rotates around a horizontal axis, and at least two continuous stirred tank reactors are arranged, all in series.

In addition, the propylene polymerization reaction apparatus of the present invention is further characterized in that a receiver having a level gauge is installed between the horizontal-type reactor and the continuous stirred tank reactor to control amount of a polymer which should be transferred between both tanks.

FIG. 1 to FIG. 14 show examples of apparatuses with a constitution of minimal reaction tanks of the present invention.

<The Horizontal-Type Reactor>

As the horizontal-type reactor constituting the propylene polymerization reaction apparatus of the present invention, a known reaction tank may be used as long as it is a horizontal-type reactor having inside a stirring machine which rotates around a horizontal axis. As one example, a horizontal-type reactor as shown in FIGS. 1 to 16 may be used. The horizontal-type reactor shown in FIGS. 1 to 16 may each be the same one.

In FIGS. 1 to 16, a horizontal-type reactor 10, 20-1, having inside a stirring machine which rotates around a horizontal axis, which is used at least one tank, is slender, and has upstream ends 12, 22 and downstream ends 14, 24, and generally installed at a horizontal position, as shown in FIGS. 1 to 16.

As shown in FIGS. 1 to 4, a stirring axis extends into the downstream end 14 of the reaction tank 10, and a blade for stirring is attached inside the reaction tank 10. The stirring blade mixes polymer particles, in the reaction tank 10, with other substances introduced therein.

A catalyst component introduced from upstream part pipelines 1 and 2 of the reaction tank 10 initiates polymerization while being mixed with polymer particles using the stirring blade. In polymerization, generating heat of polymerization is removed by latent heat of vaporization of raw material liquefied propylene supplied from a top part pipeline 17. Unreacted propylene gas is exhausted outside the reaction system using a pipeline 13, and a part thereof is condensed at a condenser 15, and separated to a liquid phase and a vapor phase at a vapor liquid separation tank 11. The liquid phase is introduced to the pipeline 17 for removal of heat of polymerization, and the vapor phase is mixed with hydrogen or the like for adjustment of molecular weight and supplied via a pipeline 18 installed at the bottom part of the reaction tank 10.

Figure 5:
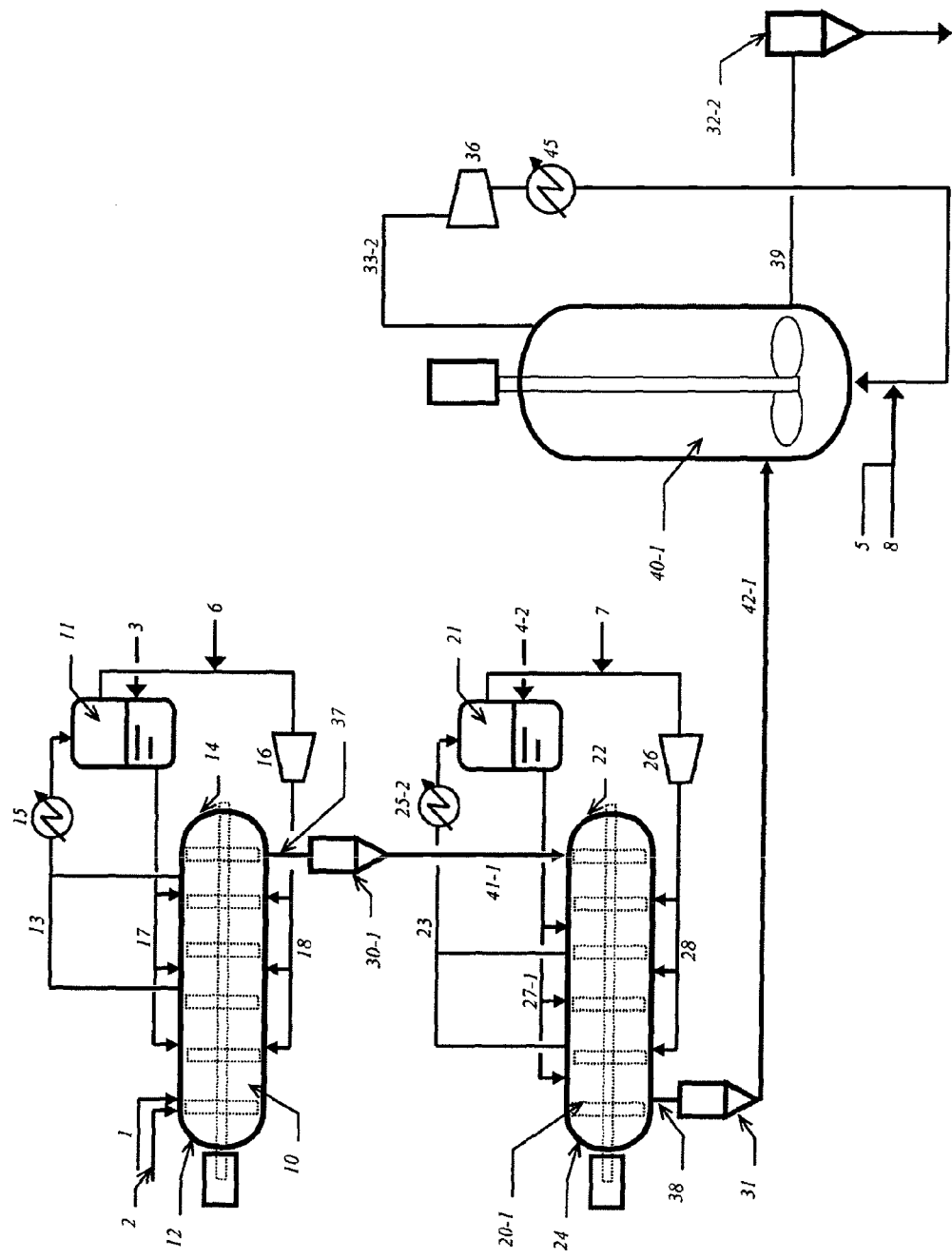
FIG. 5 is a schematic drawing showing a flow sheet of a propylene polymerization reaction apparatus, in combination of two horizontal-type reactors and one stirring-type fluidized bed-type reactor, in the present invention.
Figure 6:
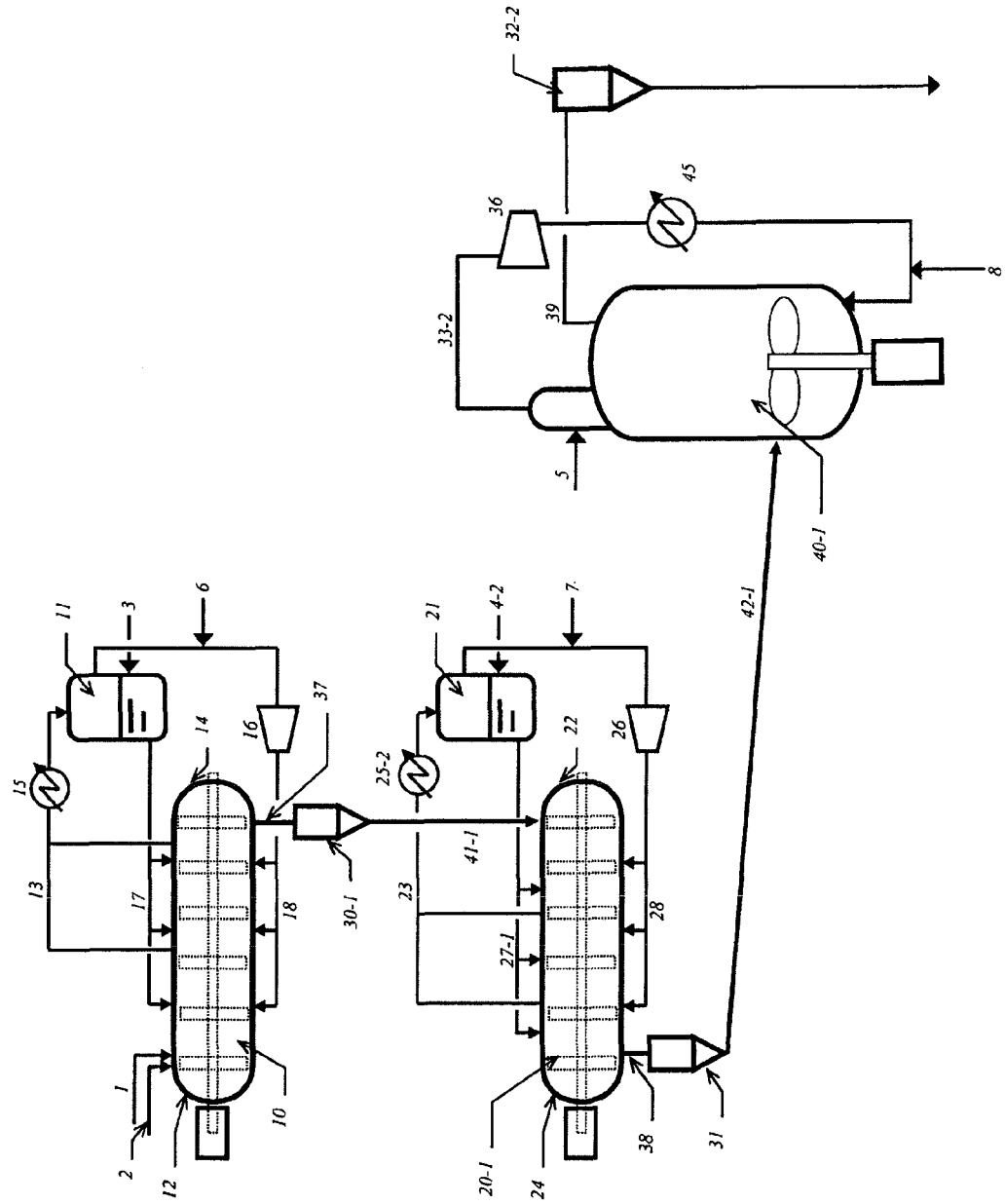
FIG. 6 is a schematic drawing showing a flow sheet of a propylene polymerization reaction apparatus, in combination of two horizontal-type reactors and one (vertical-type) stirring tank, in the present invention.
Figure 7:
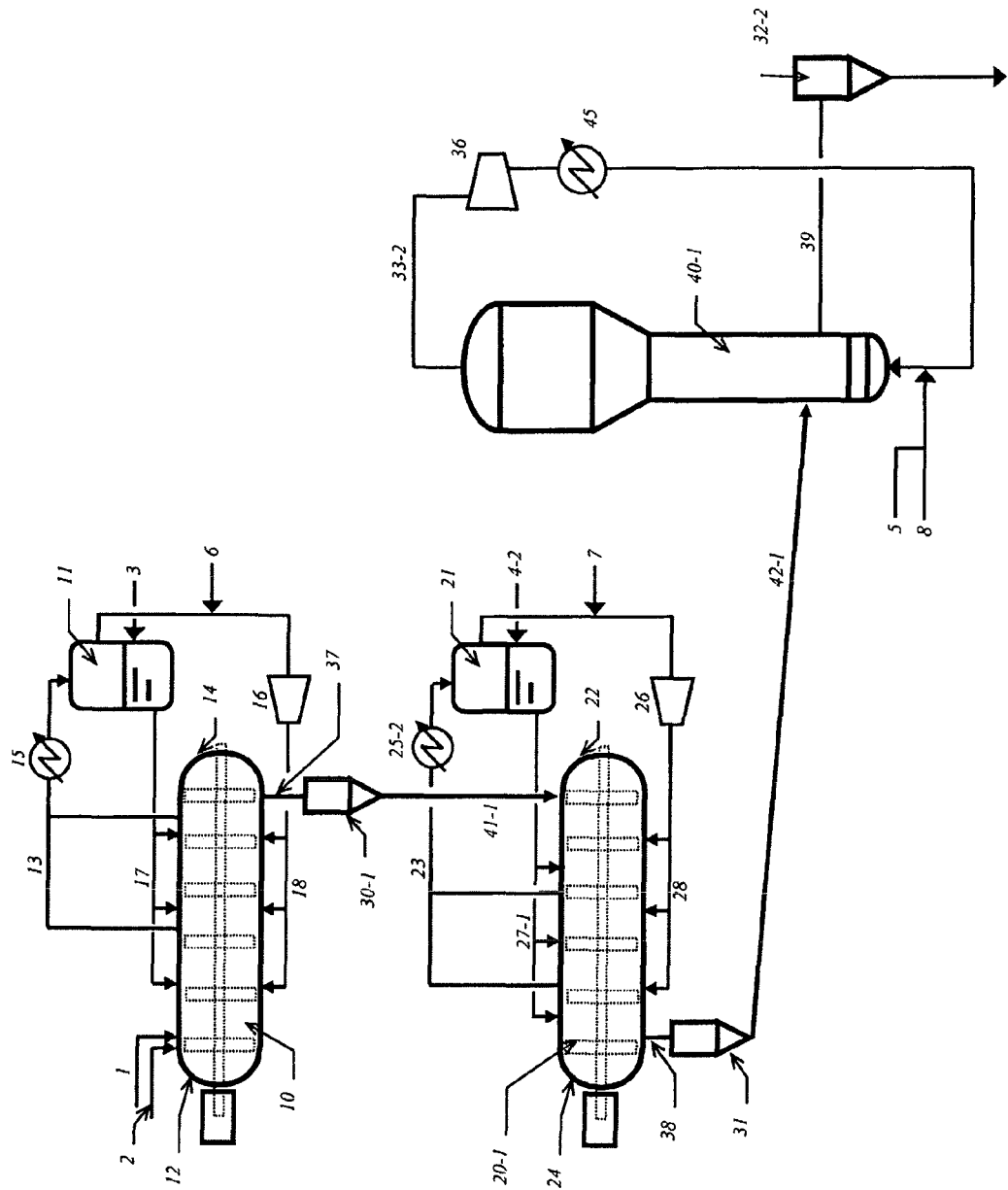
FIG. 7 is a schematic drawing showing a flow sheet of a propylene polymerization reaction apparatus, in combination of two horizontal-type reactors and one fluidized bed-type reactor, in the present invention.

In FIGS. 5 to 8, at least two tanks of the horizontal-type reactors are used. The horizontal-type reactor 10 or 20-1, having inside a stirring machine which rotates around a horizontal axis, is slender, and has the upstream end 12 or 22 and the downstream end 14 or 24, and generally installed at a horizontal position, as shown in FIG. 5. The stirring axis extends into the reaction tank 10 or 20-1, and a blade for stirring is attached. The stirring blade mixes polymer particles, in the reaction tank 10 or 20-1, with other substances introduced therein.

In FIGS. 5 to 8, the horizontal-type reactor 10—the horizontal-type reactor 20-1 are arranged in this order from the process upstream.

A catalyst component introduced from the upstream part pipelines 1 and 2 of the reaction tank 10 initiates polymerization while being mixed with polymer particles using the stirring blade. In polymerization, generating heat of polymerization is removed by latent heat of vaporization of raw material liquefied propylene supplied from a top part pipeline 17. Unreacted propylene gas is exhausted outside the reaction system using a pipeline 13, and a part thereof is condensed at a condenser 15, and separated to a liquid phase and a vapor phase at a vapor liquid separation tank 11. The liquid phase is introduced to a pipeline 17 for removal of heat of polymerization, and the vapor phase is mixed with hydrogen or the like for adjustment of molecular weight and supplied via a pipeline 18 installed at the bottom part of a reaction tank 10.

In FIGS. 5 to 8, in the horizontal-type reactor 20-1 installed at the second tank, a reaction product in the horizontal-type reactor 10 is supplied from a polymer supplying pipeline 41-1 to the vicinity of the upstream end 22 of a reactor of the horizontal-type reactor 20-1. A polymer supplied to the polymerization reactor 20-1 is subjected to subsequent polymerization while being mixed with a stirring blade. In polymerization, generating heat of polymerization is removed by latent heat of vaporization of raw material liquefied propylene supplied from a top part pipeline 27-1. Unreacted propylene gas is exhausted outside the reaction system using a pipeline 23, and a part thereof is condensed at a condenser 25-2, and separated to a liquid phase and a vapor phase at a vapor liquid separation tank 21. The liquid phase is introduced to the pipeline 27-1 for removal of heat of polymerization, and the vapor phase is mixed with hydrogen, ethylene or the like as needed, and supplied via a pipeline 28 installed at the bottom part of the reaction tank 20-1.

A largely different point of the horizontal-type reactor, which is an essential polymerization tank of the present invention, from other reaction tanks is that a catalyst component is added to the upstream part of the reaction tank, and moves to the downstream side of the reaction tank, while growing as powder particles by polymerization.

Therefore, the horizontal-type reactor has narrower residence time distribution, as compared with the continuous stirred tank reactor-type reaction tank, and, in particular, concentration of particles with relatively short residence time (bypassing particles), present at the vicinity of the exit of the reaction tank, becomes very low. Therefore, in the present invention aiming at reducing gel and preventing adhesion in the reaction tank, it is essential to be carried out using the horizontal-type reactor.

In the present invention, at least one tank of this horizontal-type reactor is arranged. To suppress bypassing particles, it is preferable that the horizontal-type reactor is installed before the continuous stirred tank reactor, which is an essential element of the present invention. Installment of the horizontal-type reactor reduces bypassing particles flowing into the continuous stirred tank reactor, and enables to suppress gel in the continuous stirred tank reactor, or reduce addition amount of an electron donor compound to be added aiming at preventing adhesion inside the reaction tank. To begin with, since the electron donor compound originally has action to deactivate a polymerization active point of a catalyst, excess addition significantly decreases catalytic activity of and subsequent to the second reaction tank (a reaction tank subsequent to the tank added with the electron donor compound), which makes difficult to secure desirable reaction amount. Installment of the horizontal-type reactor before the continuous stirred tank reactor enables to decrease the electron donor compound and safety operate the continuous stirred tank reactor, resulting in making possible to increase content of a copolymer of a propylene-based block copolymer produced.

The horizontal-type reactor has characteristics of having narrower residence time distribution as compared with other reaction tanks, and enables to attain desired effect of the present invention sufficiently by one tank, however, by further increasing the number of the reaction tank, the effect can be enhanced further.

In addition, in the present invention, at least two tanks of this horizontal-type reactor can be arranged in series. Installment of two or more tanks of the horizontal-type reactor enables to attain narrower residence time distribution, and further lower concentration of the bypassing particles. In addition, by setting hydrogen concentration in the second horizontal-type reactor lower than hydrogen concentration in the first horizontal-type reactor, leakage of hydrogen to and subsequent to the reaction tanks can be decreased, and a copolymer component having higher molecular weight can be produced easier.

In the case of installing two or more horizontal-type reactors, it is preferable that the horizontal-type reactor to be installed at and subsequent to the second tank uses the one having the same shape as that of the above-described reaction tank. Size of the reaction tank is not especially limited, however, it is desirable to use a reaction tank having the same volume as or larger volume than that of the reaction tank at the previous stage. The case of using a reaction tank having too smaller volume as compared with the reaction tank at the previous stage provides extremely shorter residence time inside that tank, resulting in disadvantage in view of suppression of bypassing particles.

L/D of the horizontal-type reactor in the present invention is preferably 3 or larger, and more preferably 5 or larger, while preferably 10 or smaller. L represents length of a horizontally longer direction of the reaction tank, and D represents inner diameter of the reaction tank. The case of excessively small L/D could not attain sufficient narrowing of residence time distribution. In addition, it does not provide sufficient decreasing effect of concentration of bypassing particles, and could increase gel. On the other hand, the case of excessively large L/D requires large stirring axis in view of strength, and could decrease practical reaction volume and decrease productivity <The Continuous Stirred Tank Reactor>

"The continuous stirred tank reactor" in the present invention means a reaction tank characterized in that concentration in the tank and concentration of flowing-out are equal, in the case where a certain substance flows into a tank and flows out. That is, the continuous stirred tank reactor, because of uniformity of temperature in the tank or a reactant gas composition, is advantageous in view of quality uniformity of a substance produced inside the reaction tank.

Figure 2:
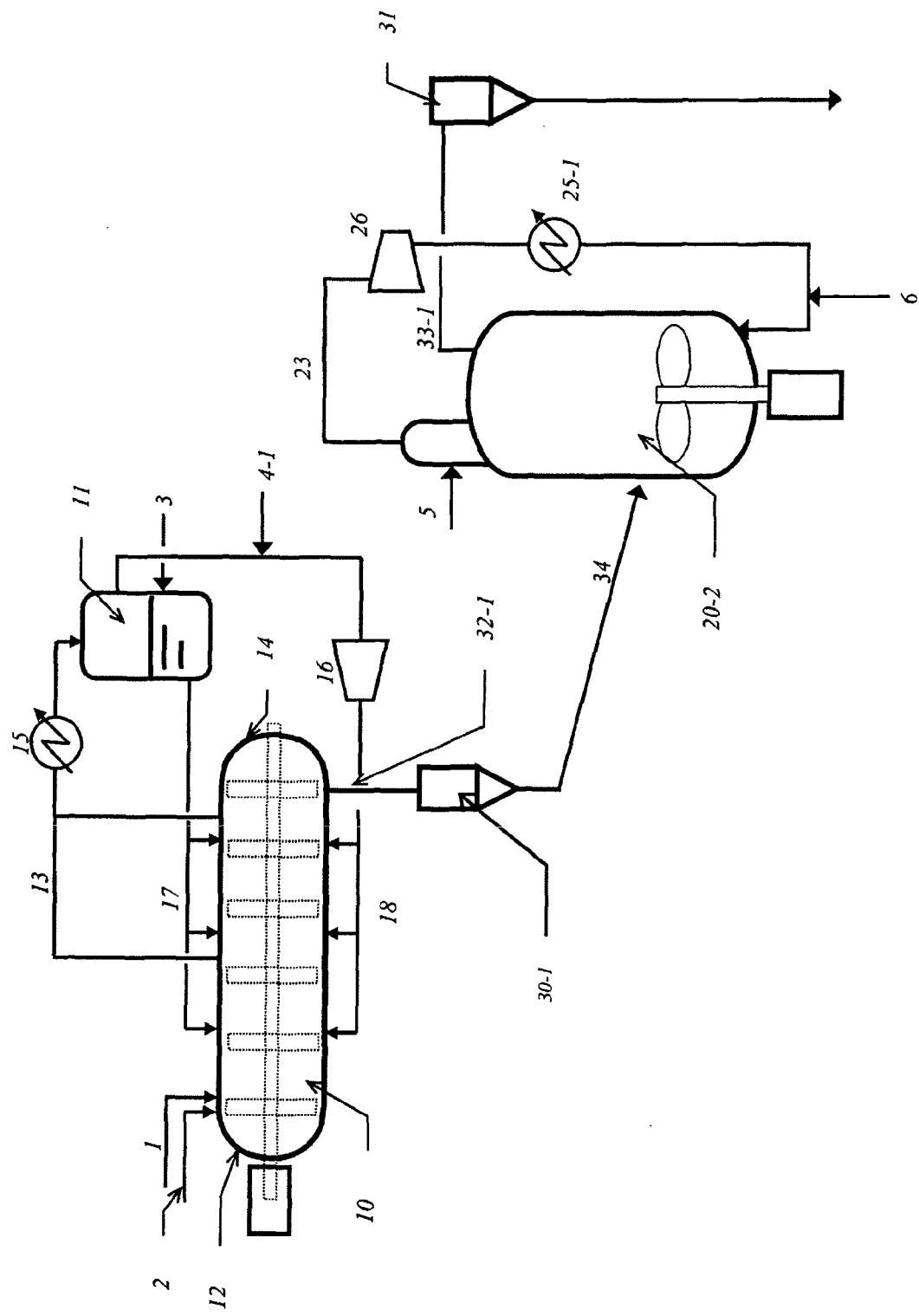
FIG. 2 is a schematic drawing showing a flow sheet of a propylene polymerization reaction apparatus, in combination of a horizontal-type reactor and a vertical-type stirring tank, in the present invention.
Figure 3:
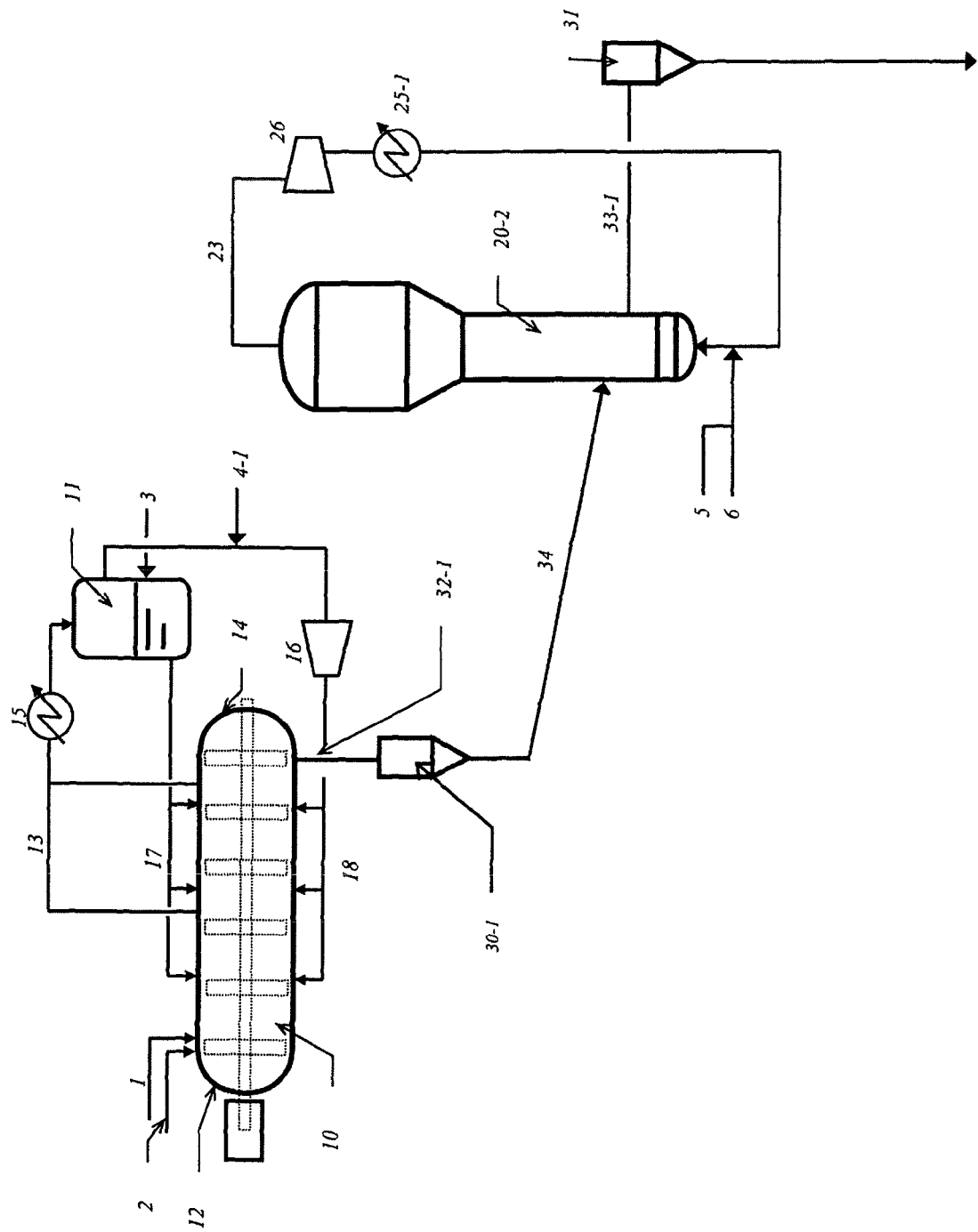
FIG. 3 is a schematic drawing showing a flow sheet of a propylene polymerization reaction apparatus, in combination of a horizontal-type reactor and a fluidized bed-type reactor, in the present invention.

As the continuous stirred tank reactor constituting the production apparatus of a propylene-based polymer of the present invention, a known reaction tank can be used as long as it is the continuous stirred tank reactor as described above. The continuous stirred tank reactor widely utilized as a polymerization apparatus of propylene includes a vertical-type stirring tank, a stirring-type fluidized bed-type reactor, and a fluidized bed-type reactor. As one example, the continuous stirred tank reactor as shown in FIGS. 1 to 16 can be used. FIG. 1 shows a stirring-type fluidized bed-type reactor as the continuous stirred tank reactor, FIG. 2 shows a vertical-type stirring tank, and FIG. 3 shows a fluidized bed-type reactor, As one example. The continuous stirred tank reactors shown in FIGS. 1 to 16 each may be the same one.

In a vapor phase production process of a propylene-based resin, there are a system for removing heat of polymerization by latent heat of vaporization mainly of liquefied propylene of a raw material, or a removing system by mainly sensible heat of circulation gas inside the reaction tank (for example, the stirring-type fluidized bed-type reactor or the fluidized bed-type reactor), however, as the continuous stirred tank reactor to be used at least one tank in the present invention, a reaction tank characterized by performing removal of heat of polymerization mainly by sensible heat of circulation gas is preferable. Here, reactant gas (gas at a reaction zone) and circulation gas (gas at a circulation region) in the multi-stage continuous vapor phase polymerization method using the continuous stirred tank reactor for a propylene-based polymer is, as described-above, propylene as a raw material, the α-olefin including ethylene, hydrogen and other raw materials.

A process for removing heat of polymerization mainly by circulation gas includes a stirring-type fluidized bed-type reactor, and a fluidized bed-type reactor, however, in the present invention, the fluidized bed-type reactor is desirable in view of uniformity of reactant gas and uniform stirring of copolymer particles. The number of said reaction tank is not especially limited, however, it is preferable to have at least one reaction tank for removing heat of polymerization by circulation gas.

In the multi-stage continuous vapor phase polymerization method, in the case of performing production under polymerization condition of low dew point of reactant gas, the horizontal-type reactor is difficult to remove heat and significantly decreases productivity. Dew point of the reactant gas below 50° C. significantly decreases productivity, although it depends on balance of reaction amount in each stage of the multi-stage continuous polymerization and capability of a heat exchanger.

As an optimal polymerization reaction tank at a portion requiring such polymerization environment, a reaction tank mainly utilizing sensible heat of circulation gas is used. As said reaction tank widely utilized, there is the stirring-type fluidized bed-type reactor or the fluidized bed-type reactor, however, in the present invention, utilization of the fluidized bed-type reactor is desirable in view of control of residence time, uniform dispersion of a polymer, uniformity of reactant gas and uniform stirring of copolymer particles. Said reaction tank utilizes sensible heat of circulation gas to remove heat of polymerization, therefore does not receive influence of decreased dew point of reactant gas on productivity.

In addition, in a process using a system for removing heat of polymerization by latent heat of vaporization of raw material liquefied propylene, because of supply of propylene/the α-olefin (for example, ethylene or the like) gas or the like from the bottom part of the reaction tank, and supply of raw material liquefied propylene from the upper part of the reaction tank, a gas composition inside the reaction tank tends to become inhomogeneous, resulting in generation of composition distribution or molecular weight distribution of the α-olefin to be copolymerized around polymer particles. As a result, a component having low content of the α-olefin, or a component having low molecular weight is present in a copolymer, which results in decreasing impact resistance at low temperature of a final product. For example, presence of a component having low content of the α-olefin in the copolymer increases gloss of the final product. To avoid this, it is necessary to further increase content of the α-olefin, however, the excess α-olefin causes increase in gel. Therefore, to exert desired characteristics of the present invention, it is essential to make a reactant gas composition uniform inside the reaction tank, and to attain this, such a system is suitable that a large quantity of gas is passed through for removing heat of polymerization.

Additionally, in a process which utilizes latent heat of vaporization of raw material liquefied propylene for removal of heat of polymerization, because propylene concentration necessarily increases in reactant gas, it has a defect that increase in content of the α-olefin in a copolymer component (a component (B) to be described later) becomes difficult, while, in a process which performs heat removal mainly by sensible heat of circulation gas, because of having no such restriction, it is superior in view of suppression of gloss and furnishing impact resistance at low temperature.

In the present invention, at least two tanks of this complete mixing reaction tank can also be arranged in series. By installing two or more continuous stirred tank reactors, not only increase in content of the copolymer component of the propylene-based block copolymer becomes easy but also in the case of producing the copolymer component in two or more tanks, by making the copolymer component having different content of the α-olefin and/or molecular weight in each tank, further quality enhancement and diversity can be attained.

Figure 4:
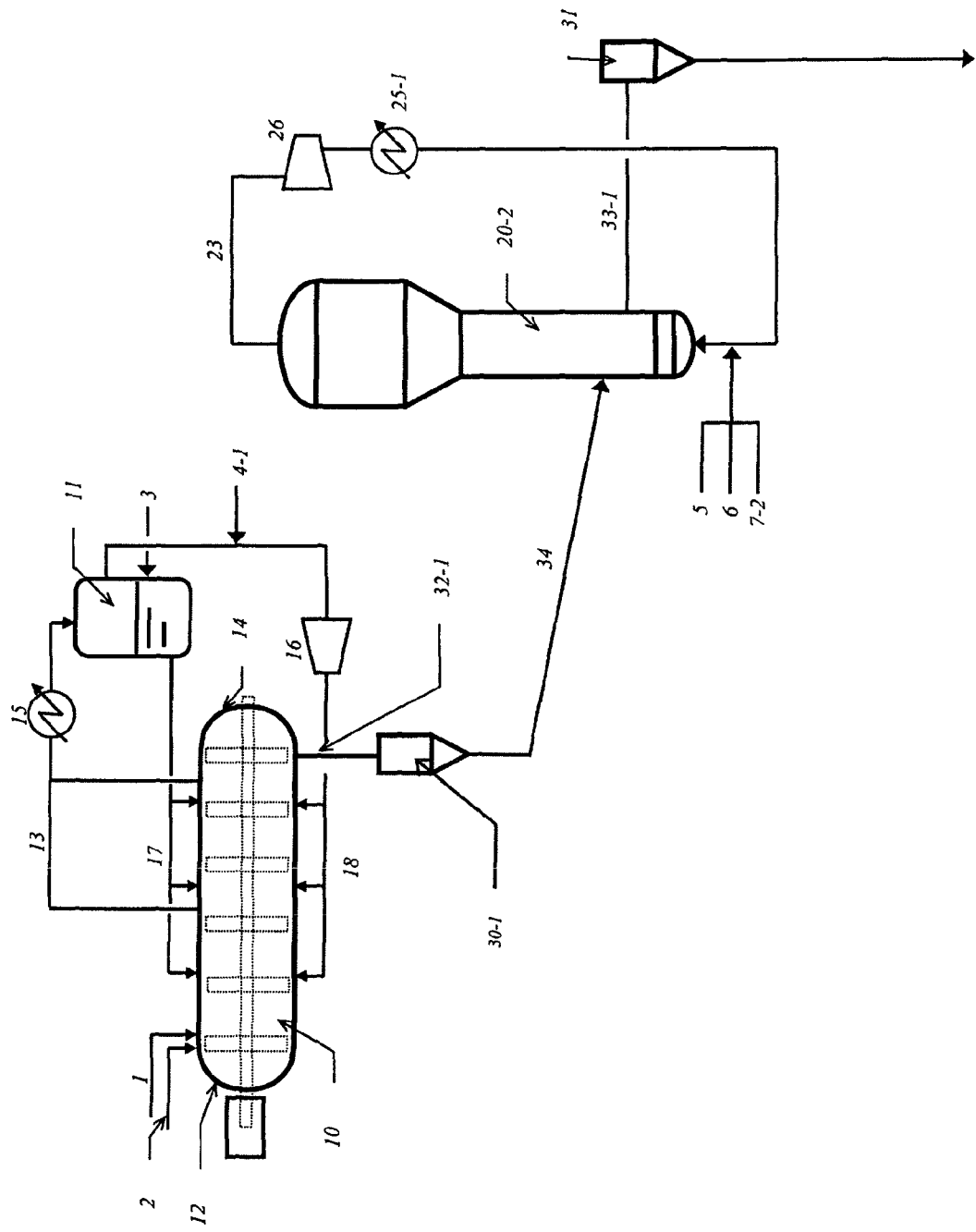
FIG. 4 is a process flow of a preferable aspect of the case where a horizontal-type reactor and a fluidized bed-type reactor are combined, and a schematic drawing showing a flow sheet of the production method used in Example, in the present invention.

As one example of an apparatus of the present invention, a flow of an apparatus utilizing a fluidized bed-type reactor is shown in FIG. 4. The fluidized bed-type reactor 20-2 is slender longitudinally, and a polymer produced in the previous step is supplied from a pipeline 34. A polymer in the fluidized bed-type reactor 20-2 is fluidized for performing a polymerization reaction, by raw material propylene and other raw material gas such as hydrogen or ethylene supplied to said reaction tank in a linear velocity of minimal fluidization speed or more. Unreacted mixed gas is taken out from an unreacted gas taking out pipeline 23 to the outside of the reaction system and is cooled using a circulation gas cooler 25-1, to be supplied to the reaction tank 20-2 as circulation gas (gas for fluidization).

A polymer produced in the reaction tank 20-2 is transferred to the next step, via a pipeline 33-1 and a receiver (a degassing tank) 31.

Figure 12:
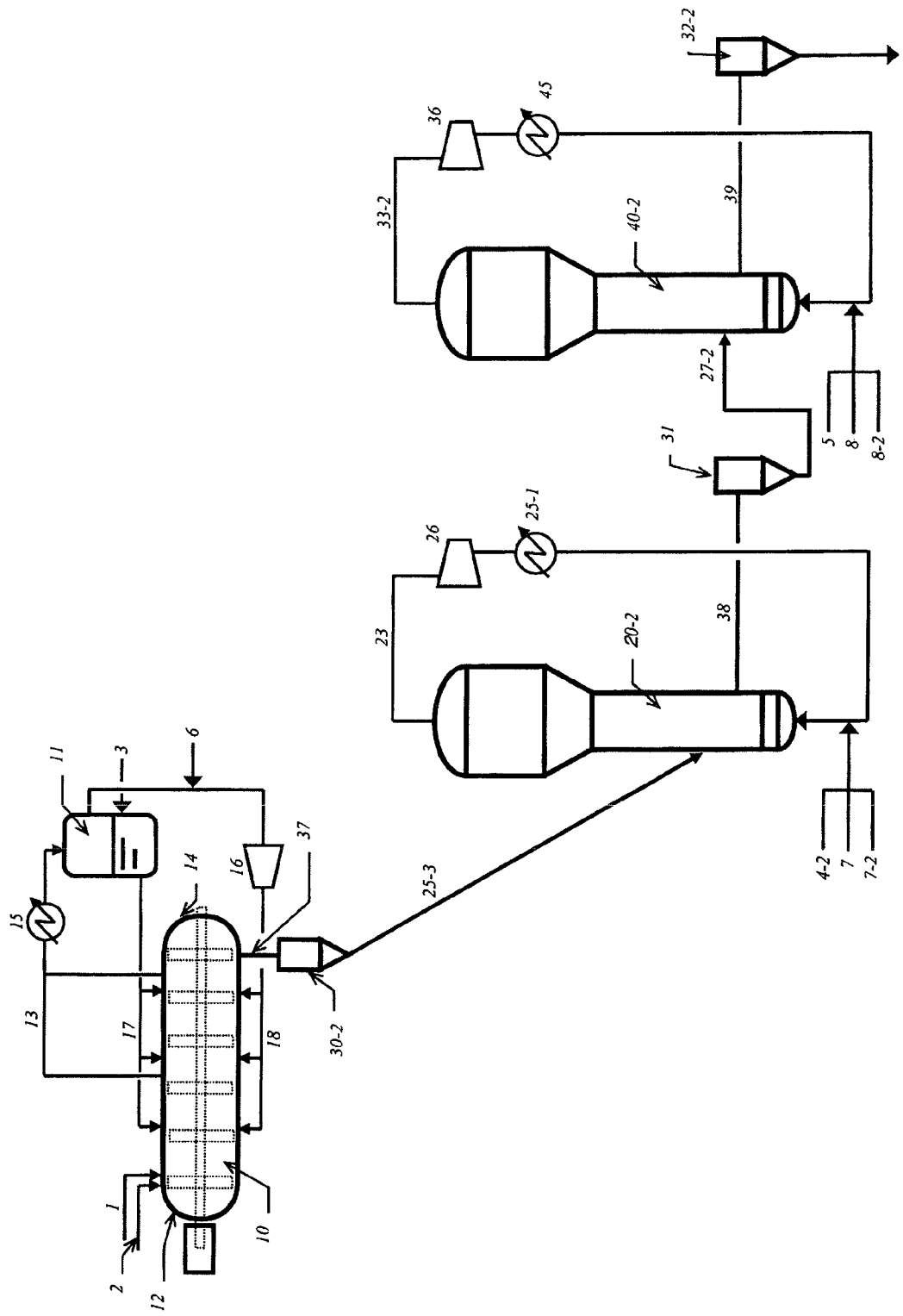
FIG. 12 is a schematic drawing showing a flow sheet of a propylene polymerization reaction apparatus, in combination of one horizontal-type reactor and two fluidized bed-type reactors, in the present invention.
Figure 13:
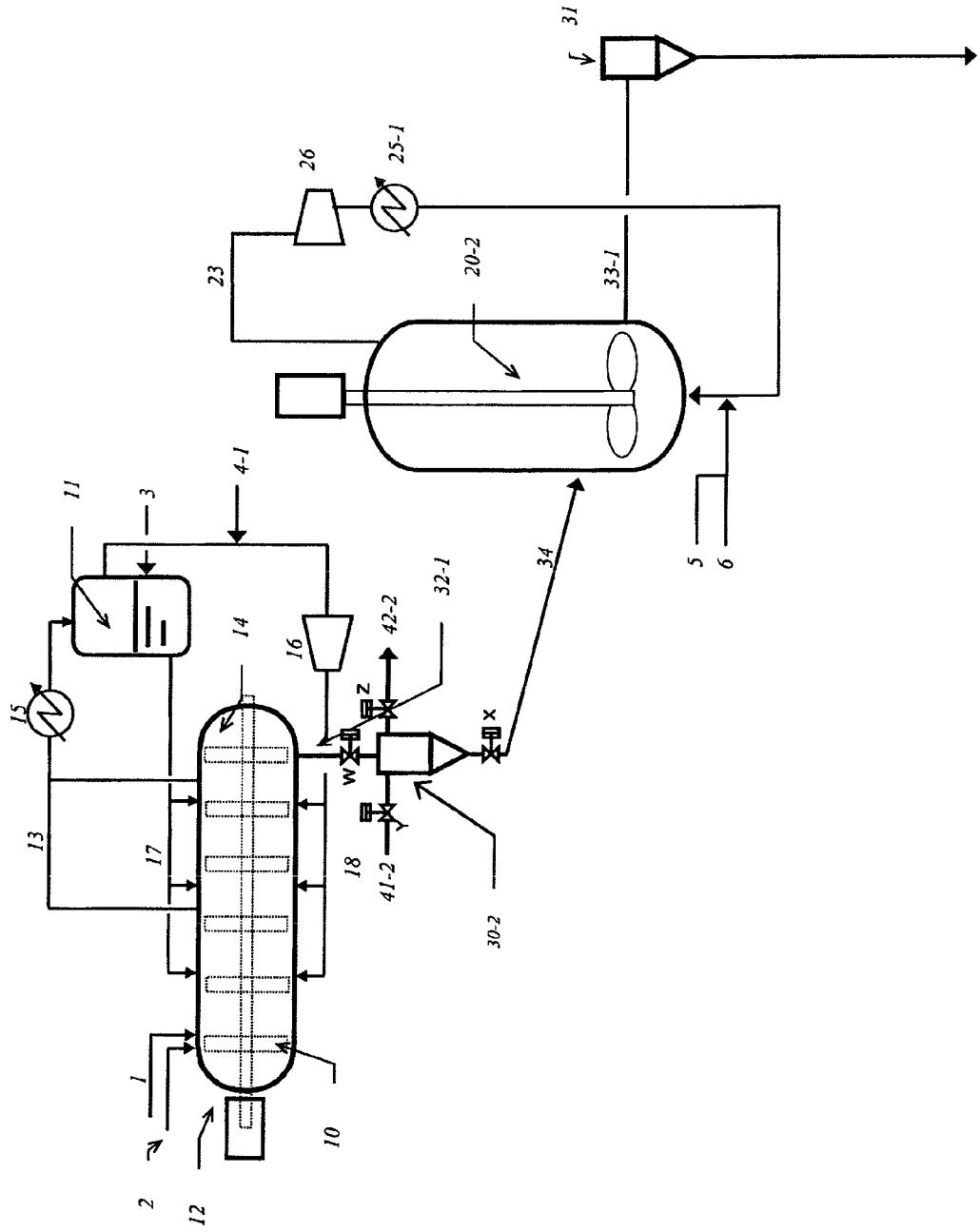
FIG. 13 is a schematic drawing showing a flow sheet of a propylene polymerization reaction apparatus, in combination of a horizontal-type reactor and a stirring-type fluidized bed-type reactor, in the present invention.
Figure 14:
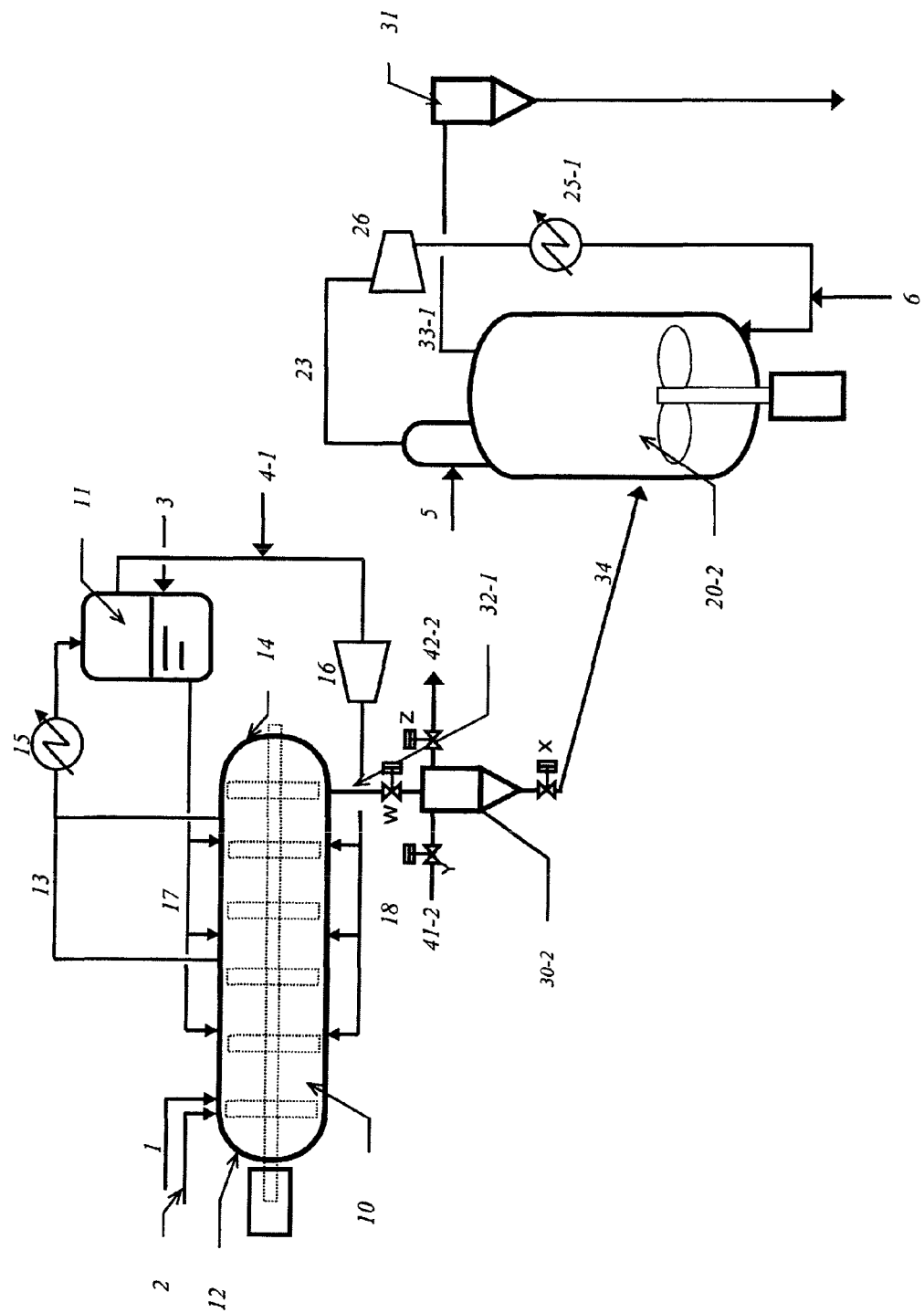
FIG. 14 is a schematic drawing showing a flow sheet of a propylene polymerization reaction apparatus, in combination of a horizontal-type reactor and a vertical-type stirring tank, in the present invention.
Figure 15:
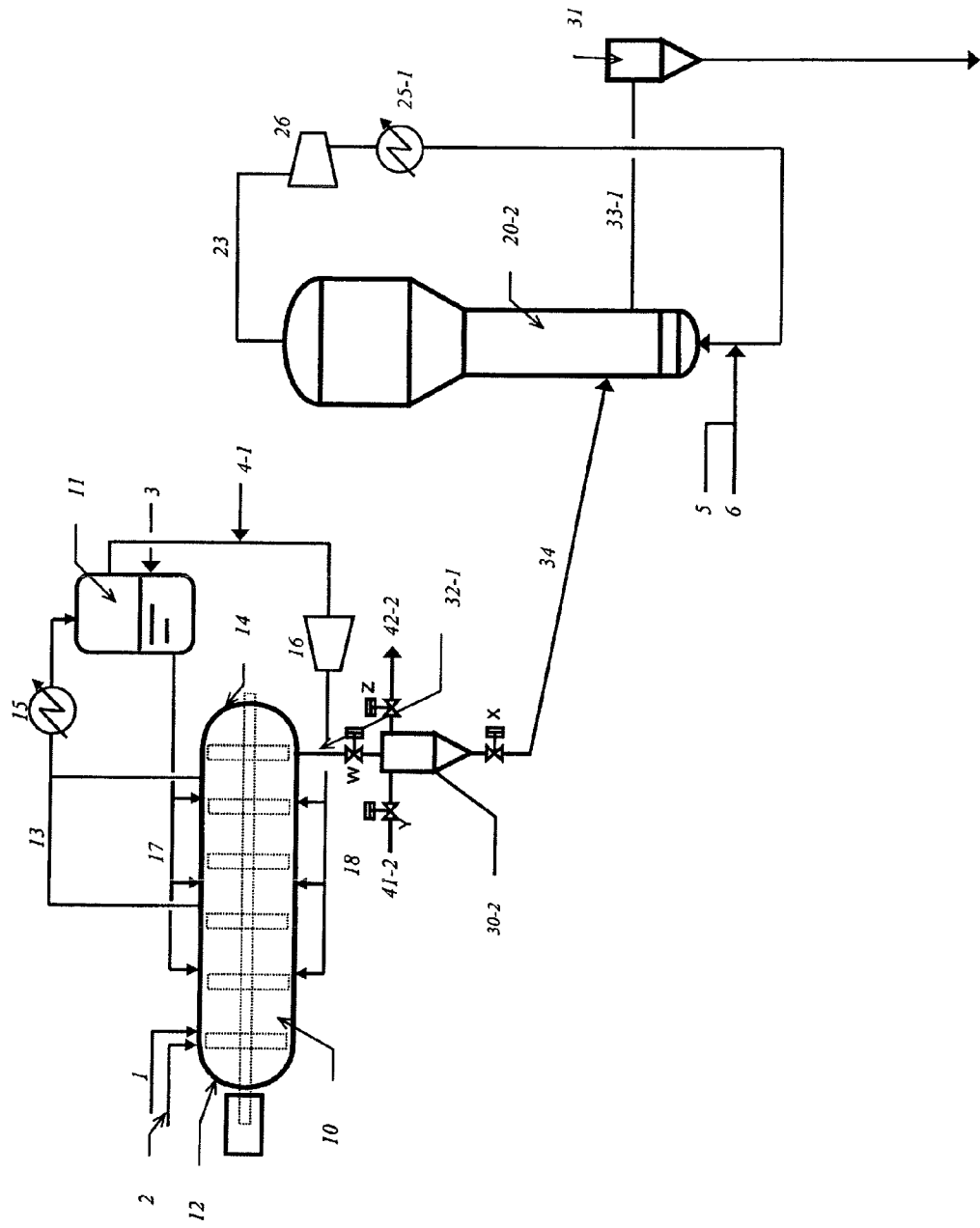
FIG. 15 is a schematic drawing showing a flow sheet of a propylene polymerization reaction apparatus, in combination of a horizontal-type reactor and a fluidized bed-type reactor, in the present invention.

As one example of an apparatus of the present invention, a flow of an apparatus each utilizing a fluidized bed-type reactor, as two continuous stirred tank reactors, is shown in FIG. 12.

The first fluidized bed-type reactor 20-2 is slender longitudinally, and a polymer produced in the previous step is supplied from a pipeline 25-3. A polymer in the fluidized bed-type reactor 20-2 is fluidized for performing a polymerization reaction, by raw material propylene and other raw material gas such as hydrogen or ethylene or the like supplied to said reaction tank in a linear velocity of minimal fluidization speed or more. Unreacted mixed gas is taken out from an unreacted gas taking out pipeline 23 to the outside of the reaction system and is cooled using a circulation gas cooler 25-1, to be supplied to the reaction tank 20-2 as circulation gas (gas for fluidization).

A polymer produced in the reaction tank 20-2 is transferred to the next step, via a pipeline 38 and a receiver (a degassing tank) 31.

Polymer particles taken out from the reaction tank 20-2 are supplied from a pipeline 27-2 to a second fluidized bed-type reactor 40-2. The fluidized bed-type reactor 40-2 is slender longitudinally, and a polymer produced in the previous step is fluidized for performing a polymerization reaction, by raw material propylene and other raw material gas such as hydrogen or ethylene supplied to said reaction tank in a linear velocity of minimal fluidization speed or more. Unreacted mixed gas is taken out from an unreacted gas taking out pipeline 33-2 to the outside of the reaction system and is cooled using a circulation gas cooler 45, to be supplied to the reaction tank 40-2 as circulation gas (gas for fluidization).

A polymer produced in the reaction tank 40-2 is transferred to the next step, via a pipeline 39 and a receiver (a degassing tank) 32-2.

<A Receiver Having a Level Gauge>

In the present invention, in transferring a polymer between reaction tanks, a receiver (degassing tank) may be installed and used between said reaction tanks. In this way, it becomes possible to reduce amount of entrained gas, and reduce amount of a polymer remained inside a pipeline.

Preferably in transferring a polymer from the horizontal-type reactor to the continuous stirred tank reactor, a receiver having a level gauge is installed and used between said reaction tanks. As one example of the present invention, in explaining with reference to FIGS. 13 to 16, a receiver 30-2 is disposed just under the horizontal-type reactor, and at a position higher than a polymer entrance of the next reaction tank. The level gauge installed at the receiver 30-2 is the one for measuring amount of a polymer in the receiver 30-2, and a γ-ray-type level gauge or an admittance-type level gauge is exemplified.

The receiver 30-2 is attached with a polymer taking out pipeline 32-1 from the horizontal-type reactor, a polymer supplying pipeline 34 to the next reaction tank, a pressurized gas supplying pipeline 41-2, and a gas exhausting pipeline 42-2; and a polymer exhausting valve W and a polymer transferring valve X are attached to these pipelines, and preferably further a gas introducing valve Y and a gas exhausting valve Z are attached.

For the present invention to achieve desired effect by using the receiver, it is necessary to block flow-in of a molecular weight modifier such as hydrogen to the next step as much as possible, and to reduce fluctuation of a reactant gas composition in the next step reaction tank. Therefore, it is necessary to exclude gas entrained with a polymer into said receiver as much as possible, and to exhaust a polymer by minimal possible amount of pressurized gas in exhausting a polymer from said receiver. Arrangement of the receiver just under the taking out port of the horizontal-type reactor, and at a position higher than an entrance of the fluidized bed-type reactor is effective to reduce entrained gas amount as less as possible, and to reduce amount of a polymer remained inside a pipeline as less as possible. In addition, control of polymer exhaustion by installing the level gauge to the receiver is effective to prevent flow-in of excess pressurized gas to the next step.

When amount of a polymer in the reaction tank increases by a polymerization reaction more than setting amount, the polymer exhausting valve W opens, and introduces intermittently a predetermined amount of the polymer into the receiver 30-2. Gas entrained with the polymer into said receiver 30-2 is exhausted to a (not shown) gas recovery system by opening the gas exhausting valve Z, and after pressure of the receiver 30-2 reaches predetermined value, the gas exhausting valve Z is closed. After that, the pressurized gas introducing valve Y is opened to introduce pressurized gas to the receiver 30-2 through the pipeline 41-2, and then said valve Y is closed. Next, the polymer transferring valve X is opened to transfer the polymer in the receiver 30-2 and the transferring pipeline 34 to the next step by pressurized gas. Using the level gauge installed at the receiver 30-2, an amount of the polymer inside the receiver 30-2 is measured, and after the amount of said polymer becomes setting value or lower, 1 cycle of the polymer transfer operation is completed by closing the polymer transferring valve X. A series of treatment is performed automatically by a series of sequential action of each block valve.

<A Constitution of an Apparatus>

As for provision of high productivity of the multi-stage continuous vapor phase polymerization method by the present invention, installment order is not restricted, as long as it is an apparatus connected with the horizontal-type reactor and the continuous stirred tank reactor. The installment order may be any of a horizontal-type reactor-continuous stirred tank reactor, or a continuous stirred tank reactor-horizontal-type reactor. In addition, in the present invention, it is enough that there is at least one apparatus connected with the horizontal-type reactor and the continuous stirred tank reactor in series of a production step, and other apparatuses may be arranged before and after this apparatus. Specifically, an apparatus composed of three or more reaction tanks may be attained by installing one or a plurality of additional polymerization reaction tank, such as the horizontal-type reactor or a reaction tank mainly utilizing sensible heat of circulation gas, at a former stage or a later stage. Such a constitution of the apparatus includes a horizontal-type reactor-horizontal-type reactor-continuous stirred tank reactor, a horizontal-type reactor-continuous stirred tank reactor-continuous stirred tank reactor, a horizontal-type reactor-horizontal-type reactor-continuous stirred tank reactor-continuous stirred tank reactor, or the like.

It should be noted that, in the case of reducing generation amount of an off-specification product in changing residence time in a reaction tank utilizing sensible heat of circulation gas, it is preferable that the continuous stirred tank reactor is arranged just after the horizontal-type reactor. In an apparatus where any of or both of the horizontal-type reactor and the continuous stirred tank reactor is arranged in multiple, such an apparatus is preferable that includes a constitution where the continuous stirred tank reactor is arranged just after the horizontal-type reactor.

In the case of the multi-stage continuous vapor phase polymerization method, reaction amount thereof can be controlled at the polymerization step of each stage. In general, in the case of suppressing a reaction amount in a certain polymerization step, the reaction amount is controlled by supplying a small amount of a polymerization deactivator, however, use of excess amount of the polymerization deactivator results in large decrease in the reaction amount of the next step. Therefore, control of the reaction amount in the multi-stage continuous vapor phase polymerization method may require change of propylene partial pressure or residence time inside the reaction tank, in response to use of the polymerization deactivator.

For example, in the case of absence of the horizontal-type reactor at the stage before the continuous stirred tank reactor, as a specific example, in the case of using a fluidized bed-type reactor, which is the continuous stirred tank reactor, as a reaction tank mainly utilizing sensible heat of circulation gas, and further the horizontal-type reactor is absent at the stage before the fluidized bed-type reactor, polymer particles having history of wide residence time distribution are supplied to the fluidized bed-type reactor as a result. Particle size distribution of this polymer particle will become wide. Under such a circumstance, in the case of changing partial pressure of propylene in the fluidized bed-type reactor, or changing amount of a polymer held inside a reaction tank, it is necessary to perform it gradually, while adjusting amount of circulation gas so that a polymer of small particles do not scatter to the outside of a system, resulting in a large quantity of generation of off-specification products.

On the other hand, in the case of presence of the horizontal-type reactor at the stage before the continuous stirred tank reactor, as a specific example, in the case of installing the horizontal-type reactor at the stage before the fluidized bed-type reactor, particle diameter distribution of a polymer to be supplied to the fluidized bed-type reactor becomes narrow (amount of small particles is less), and as compared with the above-described case, condition can be changed within a shorter time. The present effect is the one firstly recognized by arranging the continuous stirred tank reactor just after the horizontal-type reactor.

The apparatus of the present invention exerts the highest effect, in producing a polymer having a polypropylene component with low molecular weight, or an ethylene component in high concentration in the polymer component.

For example, in producing homo-polypropylene with widened molecular weight distribution, high productivity is obtained by producing a high molecular weight component in the horizontal-type reactor, and subsequently producing a low molecular weight component in the continuous stirred tank reactor, which is a reaction tank mainly utilizing sensible heat of circulation gas, and further in the case of using the fluidized bed-type reactor as the continuous stirred tank reactor, generation of an off-specification product caused by condition change can be held to the minimal.

As another example, in producing a propylene/ethylene copolymer, a propylene/ethylene/1-butene copolymer or the like, a copolymer having largely different ethylene content at each polymerization step can be produced suitably. In particular, it is suitable for producing a propylene-based block copolymer, and said copolymer includes, for example, a propylene-propylene/ethylene block copolymer, a propylene/ethylene-propylene/ethylene block copolymer or the like.

In the case of producing the propylene-propylene/ethylene block copolymer, high productivity is obtained by producing a homo-polypropylene component in the horizontal-type reactor, and subsequently producing the propylene/ethylene copolymer in the continuous stirred tank reactor, which is a reaction tank mainly utilizing sensible heat of circulation gas, and further in the case of using the fluidized bed-type reactor as the continuous stirred tank reactor, generation of an off-specification product caused by condition change can be held to the minimal.

In addition, as for provision of high productivity of the multi-stage continuous vapor phase polymerization method by the present invention, such an apparatus may be adopted where two or more horizontal-type reactors and one or more continuous stirred tank reactor are connected, and in this case, installment order is not restricted. Preferably, two or more tanks in the horizontal-type reactors are installed before the continuous stirred tank reactor arranged at the most upstream of a process. Such an apparatus constitution includes, from the upstream of a process, the one arranged in the order of a horizontal-type reactor-horizontal-type reactor-continuous stirred tank reactor, a horizontal-type reactor-horizontal-type reactor-continuous stirred tank reactor-horizontal-type reactor, a horizontal-type reactor-horizontal-type reactor-continuous stirred tank reactor-continuous stirred tank reactor, a horizontal-type reactor-horizontal-type reactor-horizontal-type reactor-continuous stirred tank reactor, or the like.

In the present invention, at least two tanks of this horizontal-type reactor can be arranged in series. Installment of two or more horizontal-type reactors enables to more narrow residence time distribution, and further decrease concentration of bypassing particles. In addition, by setting hydrogen concentration inside the second horizontal-type reactor lower than hydrogen concentration inside the first horizontal-type reactor, leakage of hydrogen to and subsequent to the reaction tanks can be decreased, and a copolymer component having higher molecular weight can be produced easier.

In particular, the one arranged in the order of a horizontal-type reactor-horizontal-type reactor-continuous stirred tank reactor is preferable.

In this way, such a propylene-based block polymer can be produced efficiently, which is superior in balance of rigidity/impact resistance at low temperature, as well as having suppressed gel generation, and high fluidity, suitable for automotive exterior materials and the like. Additionally, the propylene-based block copolymer, which is cheaper and stable in quality, can be supplied, because of a continuous vapor phase polymerization method.

In addition, as for provision of a polymer, which is cheaper and stable in quality, of the multi-stage continuous vapor phase polymerization method by the present invention, such an apparatus may be allowed where one or more horizontal-type reactor and two or more continuous stirred tank reactors are connected, and in this case, as for installment order, any of the following constitutions may be adopted: a horizontal-type reactor-continuous stirred tank reactor-continuous stirred tank reactor, a horizontal-type reactor-horizontal-type reactor-continuous stirred tank reactor-continuous stirred tank reactor, a horizontal-type reactor-vertical-type reaction tank-vertical-type reaction tank-horizontal-type reactor, and the like. Preferably, such one is included where one or more horizontal-type reactor is arranged before the continuous stirred tank reactor arranged at the most upstream of a process.

In the present invention, at least two tanks of this continuous stirred tank reactor can be arranged in series. By installing two or more continuous stirred tank reactors, not only increase in content of the copolymer component of the propylene-based block copolymer becomes easy but also in the case of producing the copolymer component in two or more tanks, by making the copolymer component having different content of the α-olefin and/or molecular weight in each tank, further quality enhancement and diversity can be attained.

In particular, the one arranged in the order of a horizontal-type reactor-continuous stirred tank reactor—continuous stirred tank reactor is preferable.

In this way, such a propylene-based block polymer can be produced stably and efficiently, with suppressed adhering inside the reaction tank, which is superior in balance of rigidity/impact resistance, as well as having suppressed gel generation, suitable for automotive members or electric appliance members and the like. Additionally, the propylene-based block copolymer which is cheaper and stable in quality, can be supplied, because of a continuous vapor phase polymerization method.

In the present invention, a receiver (degassing tank) may be installed and used between said reaction tanks. For example, in transferring a polymer from the horizontal-type reactor to the continuous stirred tank reactor, the receiver (degassing tank) may be installed and used between said reaction phases. In this way, it becomes possible to reduce amount of entrained gas, and reduce amount of a polymer remained inside a pipeline. As the receiver, a receiver installed with a level gauge is preferable. In addition, it is preferable that a series of treatment is performed automatically by a series of sequential action of each block valve.

In the present invention, as for a reaction tank other than the horizontal-type reactor and the continuous stirred tank reactor, or other equipment, one usually used in a polymerization reaction apparatus of a propylene-based polymer may be used.

<A Catalyst for Olefin Polymerization, and a Production Method of a Propylene-Based Polymer>

Subsequently, explanation will be given in detail on the catalyst for olefin polymerization, and the production method of a propylene-based polymer in the multi-stage continuous vapor phase polymerization apparatus of the present invention.

<The Catalyst for Olefin Polymerization>

The production method of a propylene-based polymer of the present invention is characterized in performing multi-stage continuous vapor phase polymerization of propylene in the presence of the catalyst for olefin polymerization, using the above propylene polymerization reaction apparatus.

Kind of the catalyst for olefin polymerization to be used in the present invention is not especially limited, and a known catalyst can be used. For example, the Ziegler-Natta catalyst combining a titanium compound and an organoaluminum (for example, JP-A-47-34478, JP-A-58-23806, JP-A-63-146906, JP-A-58-157808, JP-A-58-83006, JP-A-58-5310, JP-A-61-218606) or the metallocene catalyst (for example, JP-A-5-295022) may be used. These catalysts are not especially limited, and a known catalyst can be used.

As for enhancement of impact resistance at low temperature, because the higher molecular weight of the propylene/α-olefin copolymer has tendency to enhance impact resistance at low temperature the more, the Ziegler-Natta catalyst generally having less chain transfer in polymerization is more preferable. In addition, also for low gloss, because the higher molecular weight of the propylene/α-olefin copolymer has tendency to suppress gloss the more, the Ziegler-Natta catalyst generally having less chain transfer in polymerization is more preferable.

The Ziegler-Natta catalyst includes, as a titanium compound, the one having titanium trichloride obtained by reducing with an organoaluminum or the like, or the one obtained by further activation of a titanium trichloride composition by treatment with an electron donor compound (for example, JP-A-47-34478, JP-A-58-23806, JP-A-63-146906), what is called a supporting-type catalyst obtained by supporting titanium tetrachloride on a carrier such as magnesium chloride or the like (for example, JP-A-58-157808, JP-A-58-83006, JP-A-58-5310, JP-A-61-218606). These catalysts are not especially limited, and a known catalyst can be used.

In addition, as a promoter, an organoaluminum compound can be used. The organoaluminum compound includes, for example, trialkylaluminum such as trimethylalminum, triethylalminum, triisobutylalminum; alkylalminum halide such as diethylalminum chloride, diisobutylalminum chloride; alkylaluminum hydride such as diethylalminum hydride; alkylalminum alkoxide such as diethylalminum ethoxide; alumoxane such as methylalumoxane, tetrabutylalumoxane; a complex organoaluminum compound such as dibutyl methylboronate, lithium aluminum tetraethyl, or the like. In addition, it is also possible to use these by mixing two or more kinds.

In addition, in the above catalyst, various polymerization additives may be used, aiming at improvement of stereo regularity or control of particle property, control of a soluble component, control of molecular weight distribution or the like. For example, there are included an electron donor compound such as an organosilicon compound such as diphenyldimethoxysilane, tert-butylmethyldimethoxysilane; esters such as ethyl acetate, butyl benzoate, methyl p-toluate, dibutyl phthalate; ketones such as acetone, methyl isobutyl ketone; ethers such as diethyl ether; organic acids such as benzoic acid, propionic acid; alcohols such as ethanol, butanol.

<Preliminary Polymerization Treatment>

It is preferable that the catalyst for olefin polymerization in the present invention is used after preliminary polymerization treatment before use in final polymerization. By forming a small amount of a polymer around the catalyst in advance, by preliminary polymerization treatment, before final polymerization, the catalyst becomes more uniform and generation amount of fine powder can be suppressed.

Preliminary polymerization treatment can be performed in the presence of a similar organoaluminum compound as the organoaluminum compound used in final polymerization. Addition amount of the organoaluminum compound to be used depends on kind of a polymerization catalyst component to be used, however, the organoaluminum compound is usually used in a range of 0.1 to 40 mole, and more preferably 0.3 to 20 mole, relative to 1 mole of titanium atom. Temperature in preliminary polymerization treatment is preferably −150° C. to 150° C., and more preferably 0° C. to 80° C. Time of preliminary polymerization treatment is preferably 10 minutes to 48 hours. As amount of preliminary polymerization treatment, preferably 0.1 to 100 g, and more preferably 0.5 to 50 g of a monomer such as the α-olefin may be polymerized, per 1 g of the catalyst for olefin polymerization. Preliminary polymerization treatment is usually performed in an inert solvent.

In preliminary polymerization treatment, a similar electron donor (it may also be referred to as an electron donor compound) as an electron donor to be used in final polymerization may also be used as needed. In the case where the electron donor is an organosilicon compound, it may be used in a range of 0.01 to 10 mole, relative to 1 mole of the organoaluminum compound.

As a monomer to be used in preliminary polymerization treatment of the catalyst for olefin polymerization, a compound disclosed in JP-A-2004-124090, or the like may be used. An example of the specific compound includes olefins represented by ethylene, propylene, 1-butene, 3-methylbutene-1,4-methylpentene-1,1-pentene, 1-hexene, 1-octene, 1-decene, 1-dodecene, 1-tetradecene, 1-hexadecene, 1-octadecene, 1-eicosene, 4-methyl-1-pentene, 3-methyl-1-pentene, and the like; styrene analogous compound represented by styrene, α-methylstyrene, allylbenzene, chlorostyrene, and the like; and diene compounds represented by 1,3-butadine, isoprene, 1,3-pentadiene, 1,5-hexadiene, 2,6-octadiene, dicyclopentadiene, 1,3-cyclohexadiene, 1,9-decadiene, divinylbenzenes, and the like can be exemplified. Among them, ethylene, propylene, 3-methylbutene-1,4-methylpentene-1, styrene, divinylbenzenes or the like are particularly preferable.

They may be used not only alone but also they may be a mixture of two or more kinds with other α-olefin. In addition, to adjust molecular weight of a polymer formed in the polymerization, a molecular weight modifier such as hydrogen may be used in combination.

It is preferable that preliminary polymerization treatment is performed generally under stirring, and in that case, an inert solvent may be present. The inert solvent to be used in preliminary polymerization treatment of the catalyst for olefin polymerization is the one having no extreme influence on a polymerization reaction, such as hexane, heptane, octane, decane, dodecane, and a liquid saturated hydrocarbon such as liquid paraffin, and silicone oil having a structure of dimethylpolysiloxane, or the like. These inert solvents may be any of a single solvent of one kind, or a mixed solvent of two or more kinds. It is preferable to use these inert solvents after removing impurities such as moisture, a sulfur compound, adversely influencing on polymerization.

Preliminary polymerization treatment may be performed in a plurality of times, and a monomer to be used in this case may be the same or different. In addition, washing may be performed for the catalyst for olefin polymerization after preliminary polymerization treatment, with an inert solvent such as hexane, heptanes or the like. The catalyst for olefin polymerization after completion of preliminary polymerization treatment may be used as it is, in response to use form of the catalyst, however, it may be dried as needed.

Further, in preliminary polymerization treatment, in contacting of the catalyst for olefin polymerization with the above each component, or after the contacting, a polymer such as polyethylene, polypropylene, polystyrene, or a solid inorganic oxide such as silica, titania may be present at the same time.

<The Production Method of a Propylene-Based Polymer>

The production method of a propylene-based polymer of the present invention is characterized by performing multi-stage continuous vapor phase polymerization of propylene in the presence of the catalyst for olefin polymerization, using the above propylene polymerization reaction apparatus. In more detail, the production method of a propylene-based polymer of the present invention is a multi-stage continuous production method of propylene, and performs production of polypropylene, that is, a propylene-based polymer (a propylene homopolymer, a propylene/α-olefin copolymer), by polymerization of propylene (homopolymerization, copolymerization). The α-olefin other than propylene, to be used in the present invention, includes ethylene, 1-butene, 1-pentene, 4-methylpentene-1,5-methylhexene-1,1-heptene, 1-octene or the like.

The α-olefin to be used may be changed in each polymerization step, and two or more kinds of the α-olefin may be used.

As for provision of high productivity of the multi-stage continuous vapor phase polymerization method by the production method of the present invention, it is necessary to use the above-described propylene polymerization reaction apparatus of the present invention.

However, in the case of reducing generation amount of an off-specification product in changing residence time in the continuous stirred tank reactor, which is a reaction tank utilizing sensible heat of circulation gas, it is preferable to perform polymerization in the continuous stirred tank reactor just after polymerization in the horizontal-type reactor.

<Polymerization in the Horizontal-Type Reactor>

In the present invention, in the horizontal-type reactor, polypropylene, that is, a propylene-based polymer (including a propylene homopolymer and a propylene/α-olefin copolymer) is produced, by polymerization of propylene (homopolymerization, copolymerization). The α-olefin other than propylene, to be used in the present invention, includes ethylene, 1-butene, 1-pentene, 4-methylpentene-1,5-methylhexene-1,1-heptene, 1-octene or the like.

Polymerization condition such as temperature or pressure in the horizontal-type reactor may be set arbitrary, as long as it does not hinder productivity, to obtain desired index (MFR or ethylene content or the like). Specifically, polymerization temperature is preferably 0° C. or higher, further preferably 30° C. or higher, and particularly preferably 40° C. or higher, while preferably 100° C. or lower, further preferably 90° C. or lower, and particularly preferably 80° C. or lower. Polymerization pressure is exemplified to be atmospheric pressure or higher, preferably 600 kPa or higher, further preferably 1000 kPa or higher, and particularly preferably 1600 kPa or higher, while preferably 4200 kPa or lower, further preferably 3500 kPa or lower, and particularly preferably 3000 kPa or lower.

However, polymerization pressure should not be set at higher than vapor pressure of propylene in polymerization temperature.

Residence time may be adjusted arbitrary in response to a constitution of polymerization reaction tanks or a product index. In general, it is set within a range of 30 minutes to 10 hours.

<Polymerization in the Continuous Stirred Tank Reactor>

In the present invention, in the continuous stirred tank reactor, polypropylene, that is, a propylene-based polymer (including a propylene homopolymer and a propylene/α-olefin copolymer) is produced, by polymerization of propylene (homopolymerization, copolymerization). The α-olefin other than propylene, to be used in the present invention, includes ethylene, 1-butene, 1-pentene, 4-methylpentene-1,5-methylhexene-1,1-heptene, 1-octene or the like.

In addition, as the "continuous stirred tank reactor" in the present invention, such a reaction tank is preferable, as described above, that is characterized by removing heat of polymerization mainly by sensible heat of circulation gas. In the multi-stage continuous vapor phase polymerization, in the case of performing production under polymerization condition of low dew point of reactant gas, the horizontal-type reactor makes difficult to remove heat and significantly decreases productivity. Dew point of the reactant gas below 50° C. significantly decreases productivity, although it depends on balance of reaction amount in each stage in the multi-stage continuous polymerization and capability of a heat exchanger. As the most suitable polymerization reaction tank at a part requiring such polymerization environment, a reaction tank mainly utilizing sensible heat of circulation gas is used. As said reaction tank to be utilized widely, there is a stirring-type fluidized bed or a fluidized bed-type reactor, however, in the present invention, utilization of the fluidized bed-type reactor is desirable, in view of control of residence time or uniform distribution of a polymer. Said reaction tank does not receive influence of decrease in dew point of reactant gas on productivity, because of utilization of sensible heat of circulation gas to remove heat of polymerization. Therefore, in the production method of the present invention, it is preferable that a polymerization reaction in the continuous stirred tank reactor is performed using reactant gas having a dew point of 50° C. or lower. It should be noted that "reactant gas" is, as described above, raw material propylene, the α-olefin including ethylene, hydrogen, and other raw materials.

Polymerization condition such as temperature or pressure in the continuous stirred tank reactor may be set arbitrary, as long as it does not hinder productivity. For example, specifically, in the case of the fluidized bed-type reactor, polymerization temperature is preferably 0° C. or higher, further preferably 30° C. or higher, and particularly preferably 40° C. or higher, while preferably 100° C. or lower, further preferably 90° C. or lower, and particularly preferably 80° C. or lower. Polymerization pressure is exemplified to be atmospheric pressure or higher, preferably 600 kPa or higher, further preferably 1000 kPa or higher, and particularly preferably 1600 kPa or higher, while preferably 4200 kPa or lower, further preferably 3500 kPa or lower, and particularly preferably 3000 kPa or lower. However, polymerization pressure should not be set at higher than vapor pressure of propylene in polymerization temperature.

Residence time may be adjusted arbitrary in response to a constitution of polymerization reaction tanks or a product index. In general, it is set within a range of 30 minutes to 10 hours.

<The Production Method of the Propylene-Based Block Copolymer>

The production method of a propylene-based block copolymer of the present invention is characterized by performing multi-stage continuous vapor phase polymerization of propylene in the presence of the catalyst for olefin polymerization, using the above propylene polymerization reaction apparatus.

Preferably, the polymerization step of the present invention is composed of two stages of the first stage polymerization step and the second stage polymerization step, and more preferably, the first stage polymerization step and the second stage polymerization step are performed in this order (from the first stage polymerization step to the second stage polymerization step). In detail, in the production method of the propylene-based block copolymer of the present invention, the first stage polymerization step is performed in the horizontal-type reactor having, inside of at least one tank or more tanks, a stirring machine which rotates around a horizontal axis, and the second stage polymerization step is performed in an at least one or more reaction tank, which is continuous stirred tank reactor, where sensible heat of circulation gas is mainly utilized to remove heat of polymerization.

In addition, the production method of the propylene-based block copolymer is characterized in that the first stage polymerization step is performed for producing a polymer component (A) having a content of a monomer unit, based on propylene, of 95% by weight or more, by homopolymerization of propylene, or copolymerization of propylene and the α-olefin (provided that propylene is excluded), preferably in the horizontal-type reactor, and subsequently the second stage polymerization step is performed for producing the copolymer component (B) having a content of a monomer unit, based on propylene, of 95 to 5% by weight, by copolymerization of propylene and the α-olefin (provided that propylene is excluded), in the continuous stirred tank reactor.

<Polymerization in the Horizontal-Type Reactor>

Polymerization in the horizontal-type reactor is preferably the first stage polymerization step, and polymerization in the first stage polymerization step is the step for producing a crystalline propylene polymer (the polymer component (A)), by continuous polymerization of propylene alone or a mixture of propylene and the α-olefin in a substantially vapor phase state, in the presence of the catalyst for olefin polymerization and an electron donor, as needed. As the α-olefin, ethylene is general. In this the first stage polymerization step, a propylene homopolymer or a propylene/α-olefin copolymer having an α-olefin content of 5% by weight or lower is formed. When the content of the α-olefin in the propylene/α-olefin polymer obtained in the first stage polymerization step is over 5% by weight, rigidity of a final copolymer could decrease. Therefore, it is preferable that, in the first stage polymerization step, the polymer component (A) having a content of a monomer unit, based on propylene, of 95% by weigh or higher is produced.

Polymerization condition such as temperature or pressure or the like in the first stage polymerization step may be set arbitrary, as long as it does not hinder productivity. Specifically, polymerization temperature is preferably 0° C. or higher, further preferably 30° C. or higher, and particularly preferably 40° C. or higher, while preferably 100° C. or lower, further preferably 90° C. or lower, and particularly preferably 80° C. or lower. Polymerization pressure is exemplified to be atmospheric pressure or higher, preferably 600 kPa or higher, further preferably 1000 kPa or higher, and particularly preferably 1600 kPa or higher, while preferably 4200 kPa or lower, further preferably 3500 kPa or lower, and particularly preferably 3000 kPa or lower. However, polymerization pressure should not be set at higher than vapor pressure of propylene in polymerization temperature.

Residence time may be adjusted arbitrary in response to a constitution of polymerization tanks or a product index. In general, it is set within a range of 30 minutes to 10 hours.

In the first stage polymerization step, melt flow rate (MFR) of a polymer can be controlled using a molecular weight modifier such as hydrogen. In particular, to obtain a propylene-based block copolymer having high fluidity, MFR in the first stage polymerization step can be set at preferably 10 g/10 minutes or higher, more preferably 30 g/10 minutes or higher, and further preferably 50 g/10 minutes or higher.

It is preferable that the first stage polymerization step is performed in one or two or more horizontal-type reactors.

For example, using two or more horizontal-type reactors, the first stage polymerization step can be performed in said two or more horizontal-type reactors. In the case of performing the first stage polymerization step by two horizontal-type reactors, an electron donor exemplified in JP-A-2002-265516 or the like may be added to the two tanks as needed, aiming at selectively and efficiently deactivating bypassing particles from the horizontal-type reactor of the previous stage.

In the case of performing the first stage polymerization step by two or more horizontal-type reactors, MFR may also be differed in each of the reaction tanks. In transferring polymer powder between each reaction tank, in no small way, amount of hydrogen is also transferred to the next reaction tank entrained with powder particles. To produce a copolymer component having high molecular weight in the second stage polymerization step, amount of this hydrogen entrained cannot be neglected. In particular, in the case of producing a propylene-based block copolymer with high fluidity, it inevitably requires high concentration hydrogen in the first stage polymerization step, and due to this, amount of hydrogen entrained to the second stage polymerization step also increases. In the case of performing the first stage polymerization step by two or more horizontal-type reactors, by setting hydrogen concentration low inside the horizontal-type reactor at the later stage, amount of hydrogen entrained to the second stage polymerization step can be suppressed at a low level.

It is preferable that the first stage polymerization step is performed in one or two or more horizontal-type reactors. Further preferably, the first stage polymerization step is performed in two or more horizontal-type reactors. Performing the first stage polymerization step by two or more horizontal-type reactors is capable of reducing gel more. On the other hand, in the case of performing the first stage polymerization step in one horizontal-type reactor, a part of copolymerization of propylene and the α-olefin, which is the second stage polymerization step, will be performed by the remaining one or more horizontal-type reactor. However, in the case of introducing the excess α-olefin into the horizontal-type reactor, in particular, introducing the excess α-olefin with low boiling point, such as ethylene, dew point in the reaction tank decreases largely, which could decrease productivity largely, depending on capability of a condenser. Further, it could raise risk of increasing gel in a product. In the case of producing a part of the second stage polymerization step in the horizontal-type reactor, it is desirable that content of the α-olefin in a copolymer component in said horizontal-type reactor is preferably 30% by weight or lower, more preferably 25% by weight or lower, further preferably 20% by weight or lower, and particularly preferably 15% by weight or lower.

<Polymerization in the Continuous Stirred Tank Reactor>

Polymerization in the continuous stirred tank reactor is preferably the first stage polymerization step, and is a step for producing a rubbery polymer (the polymer component (B)), by polymerization of a mixture of propylene and the α-olefin in one or more continuous stirred tank reactor. As the α-olefin, ethylene is preferable.

In the second stage polymerization step, it is preferable to produce the copolymer component (B) having content of a monomer unit, based on propylene, of 95 to 5% by weight, by copolymerization of propylene and the α-olefin (provided that propylene is excluded). The propylene/α-olefin copolymer can be produced having a ratio of more preferably 90/10 to 10/90, further preferably 70/30 to 10/90, particularly preferably 60/40 to 20/80, and more particularly preferably 55/45 to 30/70. The α-olefin of 5% by weight or lower decreases impact resistance at low temperature of the propylene-based block copolymer, while the excess α-olefin could incur increase in gel or decrease in tensile characteristics of the propylene-based block copolymer.

In addition, polymerization amount in this step is preferably 10% by weight or more of total polymerization weight, preferably 15% by weight or more of total polymerization weight, more preferably 20% by weight or more, and further preferably 25% by weight or more, while preferably 90% by weight or less, more preferably 70% by weight or less, and further preferably 50% by weight or less. Too low amount of the rubbery polymer does not provide sufficient impact strength, and too many amount thereof significantly deteriorates powder fluidity of the propylene-based block copolymer, and could form adhesion to the inside of a system.

In the second stage polymerization step, a comonomer other than ethylene may be present at the same time. As the comonomer, for example, an α-olefin such as 1-butene, 1-pentene, 1-hexene, 4-methylpentene-1, or the like may be used.

Polymerization condition such as temperature or pressure in the second stage polymerization step may be set arbitrary, as long as it does not hinder effect of the present invention. Specifically, polymerization temperature is preferably 0° C. or higher, further preferably 30° C. or higher, and particularly preferably 40° C. or higher, while preferably 100° C. or lower, further preferably 90° C. or lower, and particularly preferably 80° C. or lower. Polymerization pressure is exemplified to be atmospheric pressure or higher, preferably 600 kPa or higher, further preferably 1000 kPa or higher, and particularly preferably 1600 kPa or higher, while preferably 4200 kPa or lower, further preferably 3500 kPa or lower, and particularly preferably 3000 kPa or lower. However, polymerization pressure should not be set at higher than vapor pressure of propylene in polymerization temperature.

Residence time may be adjusted arbitrary in response to a constitution of polymerization tanks or a product index. In general, it is set within a range of 30 minutes to 10 hours.

In the second stage polymerization step, the molecular weight modifier may be used or may not be used, in response to an object, however, in the case where a reaction tank of the second stage polymerization step has maintained objective hydrogen concentration, due to leakage of hydrogen from the previous reaction tank, it may not be used anew.

Further, an electron donor exemplified in JP-A-2002-265516 or the like may be added to selectively and efficiently deactivate bypassing particles from the first step polymerization tank as needed.

It is preferable that the second stage polymerization step is performed in two or more continuous stirred tank reactors.

For example, using two or more continuous stirred tank reactors, the second stage polymerization step can be performed in said two or more continuous stirred tank reactors. In the case of performing the second stage polymerization step in two or more continuous stirred tank reactors, content of the α-olefin or molecular weight of the copolymer can be made different in each of the continuous stirred tank reactors. For example, in the case of performing the second stage polymerization step in two continuous stirred tank reactors, by attaining different content of the α-olefin or molecular weight in the copolymer component (B1) produced in the former stage, and the copolymer component (B2) produced in the latter stage, in the copolymer component (B), further quality enhancement and diversity can be attained in the propylene-based block copolymer, as a final product.

It is preferable that the second stage polymerization step is performed in two or more continuous stirred tank reactors. In the case of performing the second stage polymerization step in one continuous stirred tank reactor, the first stage polymerization step will be performed in the continuous stirred tank reactor in the former stage, and the horizontal-type reactor connected thereto. In this case, it is difficult to attain different content of the α-olefin or molecular weight in the second stage polymerization step, however, it is possible to attain different molecular weight of a polymer produced in each reaction tank of the first stage polymerization step, or by setting low hydrogen concentration in the continuous stirred tank reactor at the former stage, entrainment of hydrogen or the like to the second stage polymerization step can be reduced, which makes easy to increase molecular weight of the propylene/α-olefin copolymer.

<Transfer of a Polymer Between Tanks>

Transfer of a polymer from the horizontal-type reactor to a reaction tank performing removal of heat of polymerization mainly by sensible heat of circulation gas, is preferably transfer of a polymer from the first stage polymerization step to the second stage polymerization step, and is performed by a receiver having a level gauge. A transfer step by said receiver is preferably composed of:

a) a step for intermittently taking out a polymer from the first stage polymerization step to said receiver,
b) a step for excluding gas from said receiver, which is introduced entrained with said polymer,
c) a step for raising pressure of said receiver again, using propylene gas or inert gas,
d) a step for introducing a polymer in said receiver to the second stage polymerization step.

In the step a), amount of a polymer taken out by one intermittent taking out operation is desirably 50% by volume or more, more preferably 60% by volume or more, and 90% by volume or less, and more preferably 80% by volume or less of volume of said receiver. Too less taking out amount increases amount of entrained gas, while too many amounts provide mixing in of also a part of a polymer taken out in the step b), and could incur a trouble of clogging or the like.

Because taking out a polymer accompanies leakage of a gas component of the first stage polymerization step, by dropping pressure of said receiver after blocking communication with the first stage polymerization step, the leaked gas is exhausted from the receiver (the step b). Decrease in pressure is preferably 0.5 MPa or lower, and more preferably 0.2 MPa or lower. Next, pressure of the receiver introduced with said polymer is raised. As gas to be used for pressure-rising, inert gas not becoming a catalyst poison, for example, nitrogen, a saturated hydrocarbon having a carbon number of 1 to 4, or propylene, and further a mixture thereof can be used. Preferably gas to be used for pressure-rising is propylene single gas.

It is desirable that pressure-rising is higher than polymerization pressure of the second stage polymerization step, and preferably higher by 0.2 MPa, to make transferring of a polymer to the second stage polymerization step easy. The receiver, after being pressurized to predetermined value, is made communicated with the second stage polymerization step, and said polymer is transferred to the second stage polymerization step. In the transfer, decreased amount of a polymer inside the receiver is monitored using a level gauge installed in said receiver, and at the same time of exhaustion completion of the polymer, said receiver and the second stage polymerization step are blocked. Use of excess amount of gas for pressurization for complete exhaustion from the receiver is a useful method for preventing remaining inside a transfer pipeline, however, it makes a composition ratio of reactant gas of the second stage polymerization step unstable, resulting in widening distribution of α-olefin content in a copolymer and increasing gloss, and is thus not a desirable method in view of the object of the present invention. In the present invention, arrangement of said receiver at a position higher than the entrance of the reactor tank of the second stage polymerization step suppresses remaining inside a pipeline as well as possible, and use of inert gas or propylene single gas, as gas for pressurization, is capable of suppressing generation of an adhering component.

The above series of treatment is performed automatically by a series of sequence operation of each block valve, however, it is desirable that this series of sequence (from the step a to the step d) is performed within 15 minutes, preferably within 10 minutes, and more preferably within 3 minutes. The case for a series of sequence to take longer time than 15 minutes could incur clogging by a polymer remained inside a transfer pipeline.

The above receiver may be installed between the horizontal-type reactor (the first stage polymerization step) and the continuous stirred tank reactor (the second stage polymerization step) in multiple units, as long as it satisfies the above condition.

<A Propylene-Based Polymer>

In the apparatus and the production method of the present invention, as described above, production of polypropylene, that is, a propylene-based polymer (including propylene homopolymer and a propylene/α-olefin copolymer) is performed by polymerization (homopolymerization, copolymerization) of propylene.

The apparatus of the present invention exerts the highest effect, in producing a polymer having a polypropylene component with low molecular weight, or an ethylene component in high concentration in the polymer component.

As a specific production example, in the present invention, limiting viscosity of a polymer component produced in the polymerization step using the horizontal-type reactor for producing a polymer component having the highest molecular weight, is 5 to 100 dl/g, and said limiting viscosity is 5 times or more limiting viscosity of a polymer component produced in the polymerization step using the continuous stirred tank reactor for producing a polymer component having the lowest molecular weight, and includes a propylene-based polymer containing amount of a polymer component, produced in the polymerization step using the horizontal-type reactor for producing the polymer component having the highest molecular weight, of 0.1 to 80% by weight in the propylene-based polymer.

As another example, a copolymer having largely different ethylene content in each polymerization step, in a propylene/ethylene copolymer, a propylene/ethylene/1-butene copolymer or the like, can be produced suitably. In particular, it is suitable for producing a propylene-based block copolymer, and said copolymer includes, for example, a propylene-propylene/ethylene block copolymer, a propylene/ethylene-propylene/ethylene block copolymer or the like.

In the case of the propylene-propylene/ethylene block copolymer, high productivity is obtained by producing a homo-polypropylene component in the horizontal-type reactor, and subsequently producing the propylene/ethylene copolymer component in the continuous stirred tank reactor, which is a reaction tank mainly utilizing sensible heat of circulation gas, and further in the case of using the fluidized bed-type reactor as the continuous stirred tank reactor, generation of an off-specification product caused by condition change can be held to the minimal.

In particular, the propylene-based copolymer produced by the "propylene polymerization reaction apparatus provided with at least two horizontal-type reactors", which is the third to the fifth aspects of the present invention, and the propylene-based copolymer produced by the "propylene polymerization reaction apparatus provided with at least two continuous stirred tank reactors", which is the sixth to the eighth aspects of the present invention, are preferably produced as those satisfying $3 \leq \log(MFR_1/MFR_2)$ by producing the polymer component (A) with a melt flow rate of ($MFR_1$) and a copolymer component (B) with a melt flow rate of ($MFR_2$). In this way, balance of rigidity/impact resistance of the propylene-based copolymer can be maintained at a high level. However, excessively large difference of MFR could incur decrease in tensile characteristics of a molded article. In addition, excessively small difference could not provide sufficient balance of rigidity/impact resistance.

In addition, in particular, the propylene-based copolymer produced by the "propylene polymerization reaction apparatus provided with at least two continuous stirred tank reactors", which is the sixth to the eighth aspects of the present invention, is the propylene-based polymer superior in balance of rigidity/impact resistance, as well as having suppressed gel generation, and can be produced stably and efficiently with less adhesion inside the reaction tank as well. In addition, supply of the propylene-based copolymer, which has such characteristics and is stable in quality, becomes possible in cheaper price, because of a continuous vapor phase polymerization method.

As described above, according to the present invention, there can be provided an apparatus and a production method which are capable of producing a continuous multi-stage polymer in low cost, high productivity and stably, and significantly reducing generation amount of an off-specification product accompanying with change of polymerization condition. In addition, the present apparatus and production method have high replaceability of a polymer in a multi-stage polymerization reaction apparatus, which reduces product loss accompanying with change of production condition in continuous polymerization.

In addition, the propylene-based polymer obtained the apparatus and the production method of the present invention is superior in uniformity of a polymer structure among the propylene-based polymer particles, and thus used suitably for automotive parts, electric appliance parts, packaging materials and the like.

In particular, the propylene-based copolymer produced by the production apparatus "in which a receiver having at least one level gauge between the horizontal-type reactor and the continuous stirred tank reactor is installed, to control amount of a polymer which should be transferred between both tanks", is superior in balance of rigidity/impact resistance, additionally the propylene-based copolymer produced having suppressed gel generation and gloss can be produced efficiently. Additionally, supply of the propylene-based copolymer, which has the above-described characteristics and is stable in quality, becomes possible in cheaper price, due to a continuous vapor phase polymerization method.

The propylene-based copolymer obtained by the present invention has, as described above, characteristics of superior balance of rigidity/impact resistance, as well as reduced gel generation and suppressed gloss, therefore it is used in an injection molding field or an extrusion molding field, and in particular, is suitable for an automotive material.

In addition, in particular, the propylene-based copolymer produced by the "propylene polymerization reaction apparatus provided with at least two horizontal-type reactors", has characteristics of superior balance of rigidity/impact resistance at low temperature, as well as reduced gel generation. Therefore, it is used in an injection molding field and an extrusion molding field, and in particular, is suitable for an automotive material.

In addition, in particular, the propylene-based copolymer produced by the "propylene polymerization reaction apparatus provided with at least two continuous stirred tank reactors", has characteristics of superior balance of rigidity/impact resistance, as well as reduced gel generation, therefore used in an injection molding field and an extrusion molding field and in particular, is suitable for an automotive material or an electric appliance material or the like.

EXAMPLES

Explanation will be given below in further detail on the present invention with reference to Examples, however, the present invention should not be limited to these Examples. It should be noted that Example 1 was performed using the apparatus shown in FIG. 4, Example 2 was performed using the apparatus shown in FIG. 8, Example 3 was performed using the apparatus shown in FIG. 12, while Examples 4 and 5, as well as Comparative Example 10 were performed using the apparatus shown in FIG. 16. Measurement methods of each physical property in the present invention are shown below.

(Measurement Methods of Various Physical Properties)

a) MFR (unit: g/10 minutes): It was measured in accordance with a method of JIS-K6921 under a condition of 23° C. and 21.18 N.

b) Content of the α-olefin (% by weight): It was measured by an infrared absorption spectral method.

c) Time required in level change in the second stage polymerization step (hr): Time required in increasing powder holding amount in a reactor from 30 kg to 60 kg, while monitoring so that fine powder particles do not scatter into a circulation system, was defined as time required in level change in the second stage polymerization step.

d) Gel: Gel generation amount was compared by visual inspection of an injection molded article under a fluorescent light.

Evaluation Criteria were as Follows:

⊚ (little)<○ (small)<Δ (several)<x (many)

(Measurement Methods of Mechanical Properties)

a) Flexural modulus (MPa): It was measured in accordance with JIS-K7203.

b) Izod impact value: It was measured in accordance with JIS-K7110.

c) Gloss: It was measured in accordance with JIS-Z8741.

Example 1

1) Preparation of a Catalyst for Olefin Polymerization (Solid Catalyst)

An autoclave with a volume of 10 L, equipped with a stirring apparatus, was sufficiently replaced with nitrogen, wherein 2 L of purified toluene was introduced. Into this, 200 g of Mg(OEt)$_2$ and 1 L of TiCl$_4$ were added at room temperature. Temperature was raised up to 90° C. and 50 mL of n-butyl phthalate was introduced. After that, temperature was raised up to 110° C. to perform a reaction for 3 hours. A reaction product was sufficiently washed with purified toluene. Next, purified toluene was introduced to adjust total liquid amount to 2 L. At room temperature, 1 L of TiCl$_4$ was added, and temperature was raised up to 110° C. to perform a reaction for 2 hours. A reaction product was sufficiently washed with purified toluene. Further, toluene was replaced with purified n-heptane to obtain slurry of a solid catalyst. A part of this slurry was sampled and dried. As an analysis result, it was found that Ti content and Mg content of the solid catalyst were 2.7% by weight and 18% by weight, respectively. In addition, average particle diameter of the solid catalyst was 33 μm.

2) Preliminary Polymerization Treatment of the Catalyst for Olefin Polymerization (Solid Catalyst)

A stainless steel reactor with an inner volume of 20 L, equipped with an inclined blade, was replaced with nitrogen, and then 17.7 L of hexane, 100.6 mmol of triethylalminum, 15.1 mmol of diisopropyldimethoxysilane, and 120.4 g of the above prepared solid catalyst were added at room temperature, and then warmed up to 30° C. Next, 240.8 g of propylene was supplied over 3 hours, under stirring, to perform preliminary activation treatment. Analysis result showed that 1.9 g of propylene per 1 g of the solid catalyst was reacted.

3) The First Stage Polymerization Step

Explanation will be given with reference to the flow sheet shown in FIG. 4. Into a horizontal-type reactor (L/D=5.2, inner volume of 100 L), having a stirring blade, the preliminary activation treatment (preliminary polymerization treatment) solid catalyst was supplied continuously in 0.95 g/hr, triethylalminum as an organoaluminum compound, and diisopropyldimethoxysilane as an organosilicon compound were supplied continuously in 42 mmol/hr and 7.0 mmol/hr, respectively, so as to attain an Al/Mg molar ratio of 6 and an Al/Si molar ratio of 6. While maintaining conditions of a reaction temperature of 65° C., a reaction pressure of 2.2 MPa, and a stirring speed of 35 rpm, hydrogen gas was continuously supplied from a circulating pipeline 4-1, so that hydrogen concentration in the vapor phase in the polymerization reactor attains a hydrogen/propylene molar ratio of 0.002, to adjust MFR of the first stage polymer.

Reaction heat was removed by vaporization heat of raw material liquefied propylene supplied from a pipeline 17. Unreacted gas exhausted from the polymerization reactor was cooled and condensed outside the reaction system through a pipeline 13, to be refluxed to a polymerization reactor 10 by a pipeline 18.

A polymer of the first stage polymerization formed was taken out intermittently from the polymerization reactor 10 through a pipeline 32-1, so that a holding level of the polymer of 60% by volume of the reaction volume is attained, to supply to a polymerization reactor 20-2 of the second stage polymerization step. In addition, a part of the polymer was taken out as a sample for measuring MFR and polymer yield per unit weight of the catalyst. MFR was 0.8 g/10 minutes. Polymer yield per unit weight of the catalyst was calculated from Mg content in the polymer, measured using inductively coupled plasma-atomic emission spectrometry (ICP method). Mg content was 13.1 ppm.

4) The Second Stage Polymerization Step

Subsequent to the first stage polymerization step, the second stage polymerization step was performed in a fluidized bed-type reactor with an inner volume of 2000 L. Hydrogen as a molecular weight controlling agent was continuously supplied so as to attain a molar ratio of hydrogen/propylene of 0.13 and to attain a pressure of 2.0 MPa at a reaction temperature of 70° C. Dew point of reactant gas was 46° C.

Powder polymerized in the second reactor was fluidized, so as to attain a superficial velocity of 0.40 m/sec, as well as taken out intermittently to a vessel once in 5 to 10 minutes, by about 2 kg each time, so as to attain a powder holding amount inside the reactor of 30 kg in average, and further transferred to another vessel, where a reaction was terminated by supplying nitrogen gas containing moisture, residual propylene was purged to obtain a propylene polymer. Production speed of the propylene polymer was 21 kg/hr in average. In addition, in the second stage polymerization step, the powder holding amount inside the reactor was increased from 30 kg to 60 kg, while monitoring so that fine powder particles do not scatter into a circulation system, and time required in this time was measured, and found to be 3.5 hours.

A part of the resultant polymer was used as a sample for measuring MFR and polymer yield per unit weight of the catalyst. MFR was 4.9 g/10 minutes. Polymer yield per unit weight of the catalyst was calculated by dividing production speed with supply amount of the solid catalyst. Results are shown in FIG. 1.

Comparative Example 1

Polymerization was performed using a continuous reaction apparatus composed by connecting two horizontal-type reactors (L/D=5.2, inner volume of 100 L), having a stirring blade.

Firstly, into the first reactor, the preliminary activation treatment (preliminary polymerization treatment) solid catalyst, described in Example 1, was supplied continuously in 0.59 g/hr, triethylalminum as an organoaluminum compound, and diisopropyldimethoxysilane as an organosilicon compound were supplied continuously in 26 mmol/hr and 4.4 mmol/hr, respectively, so as to attain an Al/Mg molar ratio of 6 and an Al/Si molar ratio of 6. While maintaining conditions of a reaction temperature of 65° C., a reaction pressure of 4.4 MPa, and a stirring speed of 35 rpm, hydrogen gas was continuously supplied, so that hydrogen concentration in the vapor phase in the polymerization reactor attains a hydrogen/propylene molar ratio of 0.002, to adjust MFR of the first stage polymer. MFR was 0.7 g/10 minutes. A polymer of the first stage polymerization formed was taken out intermittently, so that a holding level of the polymer of 60% by volume of the reaction volume is attained, to supply to a polymerization reactor of the second stage polymerization step (the first stage polymerization step).

Hydrogen as a molecular weight controlling agent was continuously supplied so as to attain a molar ratio of hydrogen/propylene of 0.13, while maintaining condition of a pressure of 2.0 MPa at a reaction temperature of 70° C., and a stirring speed of 35 rpm. Dew point of reactant gas was 46° C.

Powder polymerized in the second reactor was taken out intermittently, so that a holding level of the polymer of 60% by volume of the reaction volume is attained, where the reaction was terminated by supplying nitrogen gas containing moisture, to obtain a propylene polymer (the second stage polymerization step).

Production speed of the propylene polymer was 14.8 kg/hr. MFR was 3.7 g/10 minutes. To increase production speed of the propylene polymer, increase in supply amount of the solid catalyst was tried, however, it increased load to a heat exchanger of the second stage polymerization step, which made difficult to maintain pressure. Results are shown in Table 1.

Comparative Example 2

1) Preparation of the Catalyst for Olefin Polymerization (Solid Catalyst)

The solid catalyst was prepared in accordance with Example 1.

2) Preliminary Polymerization Treatment of the Catalyst for Olefin Polymerization (Solid Catalyst)

An autoclave with a volume of 20 L, equipped with a stirring apparatus, was sufficiently replaced with nitrogen, wherein 100 g of the solid catalyst was introduced. Into this, 50 mL of $SiCl_4$ were added to perform a reaction at 90° C. for 1 hour, and then a reaction product was sufficiently washed with purified n-heptane. Purified n-heptane was introduced to adjust a liquid level to 4 L, and then, 30 mL of dimethyldivinylsilane, 30 mL of diisopropyldimethoxysilane and 80 g of triethylalminum were added to perform a reaction at 40° C. for 2 hours. A reaction product was sufficiently washed with purified n-heptane. Purified n-heptane was introduced again to adjust so that concentration of the solid catalyst attains 20 g/L.

After cooling the slurry to 10° C., 10 g of triethylalminum was added and 280 g of propylene was supplied over 4 hours. After completion of supply of propylene, the reaction was continued further 30 minutes. Next, the vapor phase part was sufficiently replaced with nitrogen, and the reaction product was sufficiently washed with purified n-heptane. The resultant slurry was taken out from the autoclave to obtain the preliminary activation treatment solid catalyst by performing vacuum drying. Analysis result showed that 2.5 g of propylene was contained per 1 g of the solid catalyst.

3) Polymerization

Polymerization was performed using a continuous reaction apparatus composed by connecting two fluidized bed-type reactors, with an inner volume of 2000 L. Into the first reactor, the preliminary activation treatment (preliminary polymerization treatment) solid catalyst was supplied continuously in 1.01 g/hr, triethylalminum as an organoaluminum compound was supplied continuously in 45 mmol/hr, so as to attain an Al/Mg molar ratio of 6. While maintaining a reaction temperature of 65° C., and a partial pressure of propylene of 2.2 MPa, hydrogen, as a molecular weight controlling agent, was continuously supplied, so as to attain a hydrogen/propylene molar ratio of 0.002. MFR was 0.8 g/10 minutes.

Powder polymerized in the first reactor was fluidized, so as to attain a superficial velocity of 0.35 m/sec, as well as taken out intermittently to a vessel once in 5 to 10 minutes, by about 2 kg each time, so as to attain a powder holding amount inside the reactor of 30 kg in average, and further transferred to the second reactor (the first polymerization step).

In the second stage polymerization step, hydrogen as a molecular weight controlling agent was continuously supplied so as to attain a molar ratio of hydrogen/propylene of 0.13 and to attain a pressure of 2.0 MPa at a reaction temperature of 70° C. Dew point of reactant gas was 46° C.

Powder polymerized in the second reactor was fluidized, so as to attain a superficial velocity of 0.40 m/sec, as well as taken out intermittently to a vessel once in 5 to 10 minutes, by about 2 kg each time, so as to attain a powder holding amount inside the reactor of 30 kg in average, and further transferred to other vessel, where the reaction was terminated by supplying nitrogen gas containing moisture, residual propylene was purged to obtain a propylene polymer (the first polymerization step).

Production speed of the propylene polymer was 20 kg/hr in average. MFR was 6.4 g/10 minutes. In addition, in the second stage polymerization step, the powder holding amount inside the reactor was increased from 30 kg to 60 kg, while monitoring so that fine powder particles do not scatter into a circulation system, and time required in this time was measured, and found to be 6 hours. Results are shown in Table 1.

TABLE 1

|  |  | Example 1 | Comparative Example 1 | Comparative Example 2 |
|---|---|---|---|---|
| Catalyst supply |  |  |  |  |
| Catalyst for olefin polymerization (solid catalyst) | g/h | 0.95 | 0.59 | 1.01 |
| Triethylaluminum | mmol/h | 42 | 26 | 45 |
| Diisopropyldimethoxysilane | mmol/h | 7.0 | 4.4 | — |
| First stage polymerization step |  |  |  |  |
| Process |  | Horizontal-type reactor | Horizontal-type reactor | Fluidized bed-type reactor |
| Hydrogen/propylene | molar ratio | 0.002 | 0.002 | 0.002 |
| MFR (first stage polymer) | g/10 minutes | 0.8 | 0.7 | 0.8 |
| Polymer yield per unit weight of catalyst | g/g | 13700 | 16600 | 11300 |
| Second stage polymerization step |  |  |  |  |
| Process |  | Fluidized bed-type reactor | Horizontal-type reactor | Fluidized bed-type reactor |

TABLE 1-continued

|  |  | Example 1 | Comparative Example 1 | Comparative Example 2 |
|---|---|---|---|---|
| Hydrogen/propylene | molar ratio | 0.13 | 0.13 | 0.13 |
| Dew point of reaction gas | ° C. | 46 | 46 | 46 |
| Polymerization ratio of second stage polymer | wt % | 38 | 34 | 43 |
| Propylene-based polymer |  |  |  |  |
| Production speed | kg/h | 21.0 | 14.8 | 20.0 |
| MFR | g/10 minutes | 4.9 | 3.7 | 6.4 |
| Time required in level change in second stage polymerization step | h | 3.5 | — | 6.0 |
| Polymer yield per unit weight of catalyst | g/g | 22100 | 25100 | 19800 |

Example 2

1) The First Stage Polymerization Step

Figure 8:
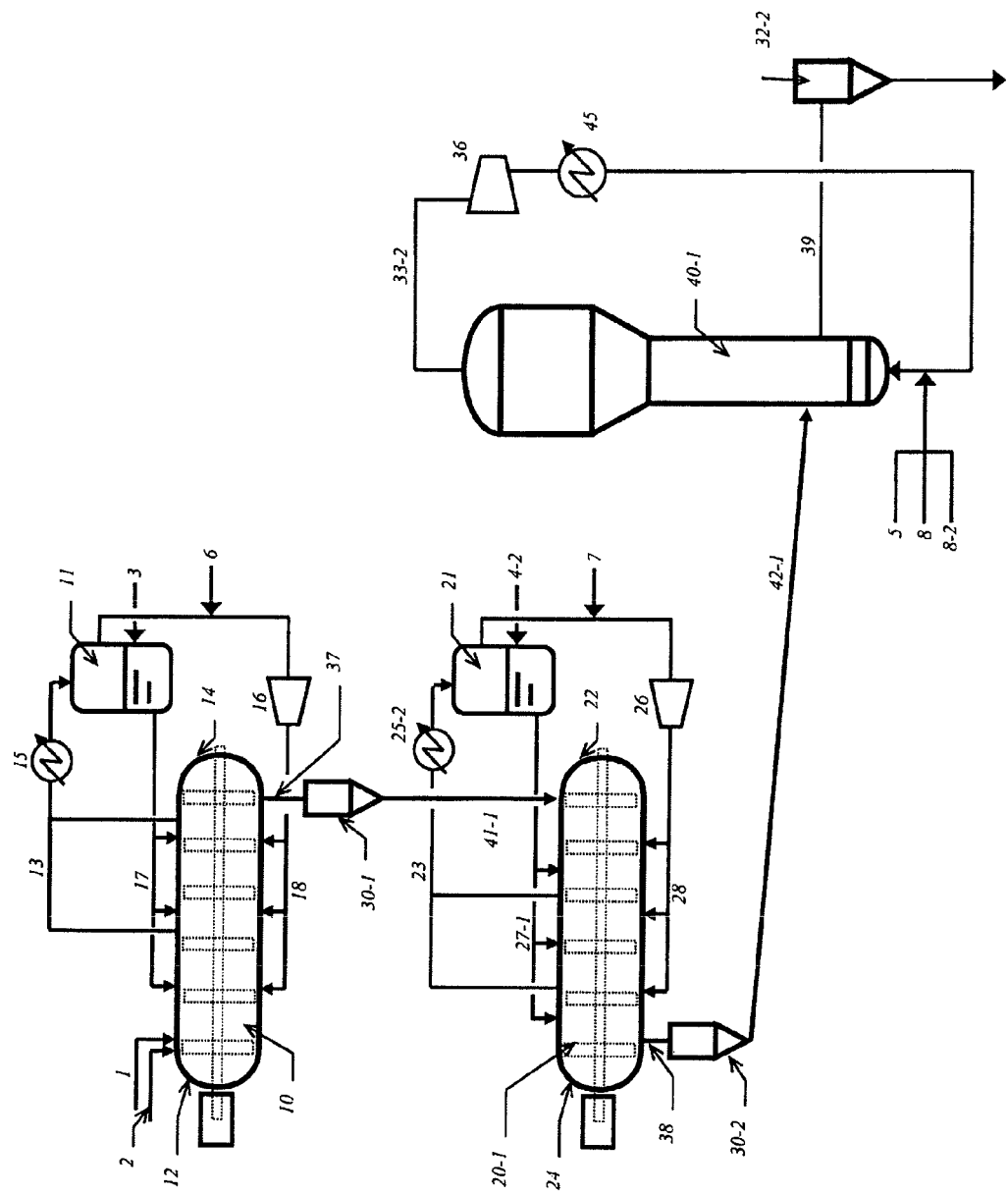
FIG. 8 is flow sheet of a propylene polymerization reaction apparatus, in combination of two horizontal-type reactors and one fluidized bed-type reactor, in the present invention and a schematic drawing showing a flow sheet of the production method used in Example.
Figure 9:
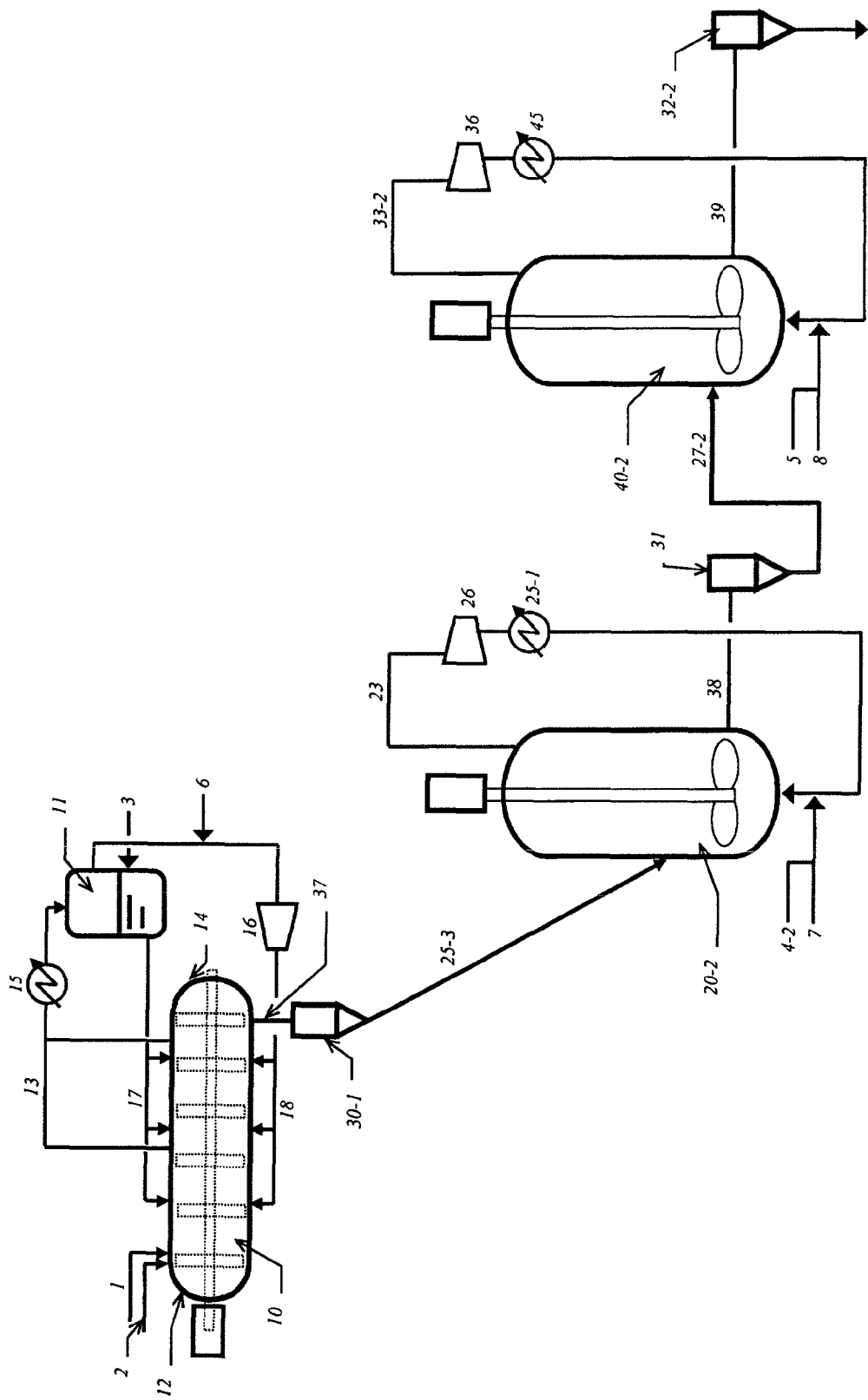
FIG. 9 is a schematic drawing showing a flow sheet of a propylene polymerization reaction apparatus, in combination of one horizontal-type reactor and two stirring-type fluidized beds, in the present invention.
Figure 10:
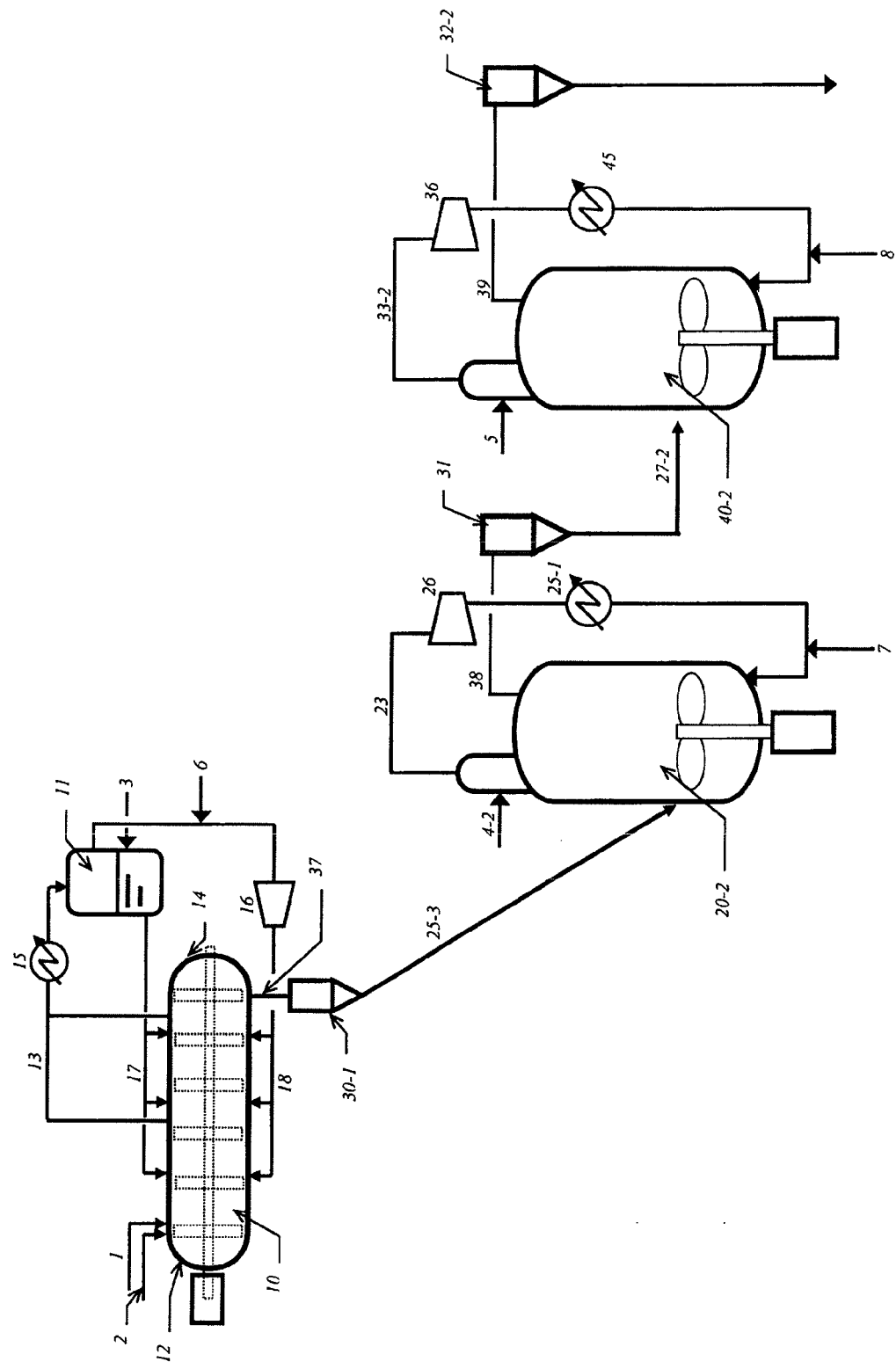
FIG. 10 is a schematic drawing showing a flow sheet of a propylene polymerization reaction apparatus, in combination of one horizontal-type reactor and two vertical-type stirring tanks, in the present invention.
Figure 11:
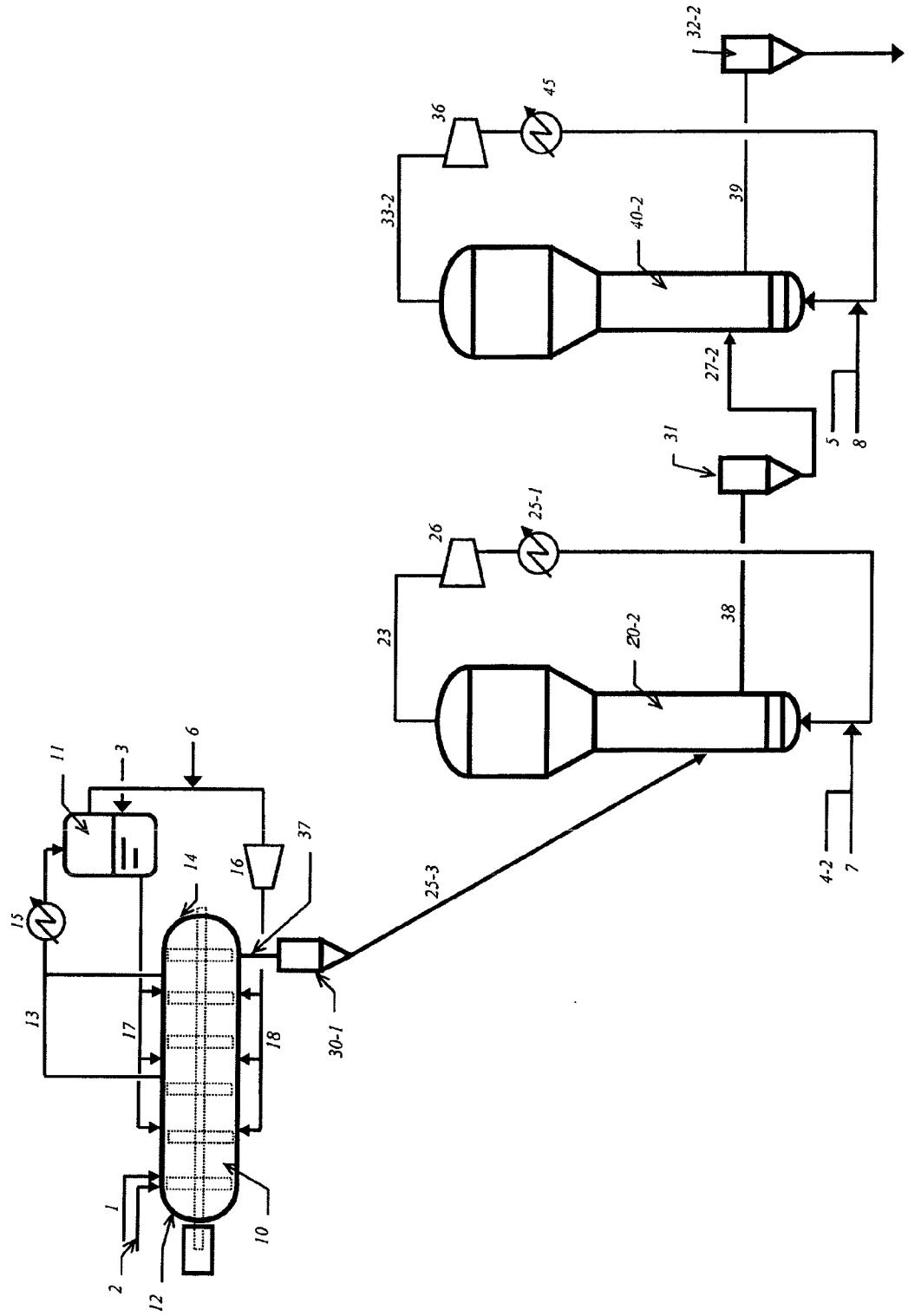
FIG. 11 is a schematic drawing showing a flow sheet of a propylene polymerization reaction apparatus, in combination of one horizontal-type reactor and two fluidized bed-type reactors, in the present invention.

Explanation will be given with reference to the flow sheet shown in FIG. 8. Into two horizontal-type reactors (L/D=5.2, inner volume of 100 L), having a stirring blade, (a reactor A and a reactor B), installed in series, the preliminary activation treatment (preliminary polymerization treatment) solid catalyst, described in Example 1, was supplied continuously in 0.51 g/hr, and triethylalminum as an organoaluminum compound, and diisopropyldimethoxysilane as an organosilicon compound were supplied continuously to the most upstream part of the reactor A (10), so as to attain an Al/Mg molar ratio of 6 and an Al/Si molar ratio of 6. While maintaining conditions of a reaction temperature of 65° C., a reaction pressure of 2.2 MPa, and a stirring speed of 35 rpm, hydrogen gas was continuously supplied from a circulating pipeline 6, so that hydrogen concentration in the vapor phase in the reactor maintains hydrogen/propylene molar ratio as shown in Table 1, to adjust MFR of the reactor A.

Reaction heat was removed by vaporization heat of raw material liquefied propylene supplied from a pipeline 17. Unreacted gas exhausted from the reactor was cooled and condensed outside the reactor system through the pipeline 13, to be refluxed to the reactor A (10) by the pipeline 17.

A polymer of the first stage polymerization formed was taken out intermittently from the reactor A (10) through the pipeline 37, so that a holding level of the polymer of 60% by volume of the reaction volume is attained, to supply to the reactor B (20-1).

In this time, a part of the polymer was intermittently collected from a pipeline 41-1, as a sample for measuring MFR and polymer yield per unit weight of the catalyst. Polymer yield per unit weight of the catalyst was calculated from Mg content in the polymer, measured using inductively coupled plasma-atomic emission spectrometry (ICP method).

Powder exhausted from the reactor A (10) was received from the upstream side of the horizontal-type reactor B (20-1). While maintaining conditions of a reaction temperature of 70° C., a reaction pressure of 2.1 MPa, and a stirring speed of 35 rpm, hydrogen gas was continuously supplied from a circulating pipeline 7-2, so that hydrogen concentration in the vapor phase in the reactor attains a hydrogen/propylene molar ratio as shown in Table 1, to adjust MFR of the reactor B.

Reaction heat was removed by vaporization heat of raw material liquefied propylene supplied from the pipeline 27-1. Unreacted gas exhausted from the reactor was cooled and condensed outside the reaction system through a pipeline 23, to be refluxed to the reactor 20-1 by the pipeline 27-1.

A polymer formed in the reactor B was taken out intermittently from the reactor B (20-1) through a pipeline 38, so that a holding level of the polymer of 60% by volume of the reaction volume is attained, to supply to the reactor C (40-1) as the second reactor.

In this time, a part of the polymer was intermittently collected from a pipeline 42-1, as a sample for measuring MFR and polymer yield per unit weight of the catalyst. Polymer yield per unit weight of the catalyst was calculated from Mg content in the polymer, measured using inductively coupled plasma-atomic emission spectrometry (ICP method).

2) The Second Stage Polymerization Step

Subsequent to the first stage polymerization step, polymerization of the second stage polymerization step was performed in a fluidized bed-type reactor with an inner volume of 2000 L. This fluidized bed-type reactor is the one connected in series just after the second reactor of first stage polymerization step. Propylene and ethylene were continuously supplied, so as to attain a molar ratio of ethylene/propylene of 0.33, and a pressure of 2.0 MPa at a reaction temperature of 70° C., further hydrogen as a molecular weight controlling agent was continuously supplied so as to attain a molar ratio of hydrogen/ethylene of 0.01, as well as ethyl alcohol as an activated hydrogen compound (an electron donor compound) was supplied so as to be 1.2 times mole, relative to triethylalminum.

Powder polymerized in the fluidized bed-type reactor was fluidized, so as to attain a superficial velocity of 0.40 m/sec, as well as taken out intermittently to a vessel once in 5 to 10 minutes, by about 2 kg each time, so as to attain a powder holding amount in the reactor of 40 kg in average, and further transferred to another vessel, where a reaction was terminated by supplying nitrogen gas containing moisture, residual propylene was purged to obtain a propylene-based block copolymer.

A part of the resultant propylene-based block copolymer was supplied to measure MFR, content of ethylene by an infrared ray absorption spectroscopy, generation amount of the copolymer by measurement of Mg content in a polymer by an ICP method, various mechanical properties and gel.

Further, to 4 kg of the resultant propylene-based block copolymer, 2.0 g of pentaerythrityl-tetrakis[3-(3,5-di-t-butyl-4-hydroxyphenyl) propionate] and 2.0 g of tris-(2,4-di-t-butylphenyl)phosphite, as phenol-based antioxidants, 2.0 g of calcium stearate as a neutralization agent, and 12 g of talc were added and mixed for 2 minutes at room temperature using a high speed stirring-type mixing machine (Henshcel mixer), and the mixture was granulated using an extrusion granulator with a screw diameter of 40 mm. Next, a test piece was prepared from the granulated substance, using an injection molding machine at a molten resin temperature of 250° C. and a mold temperature of 50° C. The obtained test piece was conditioned at a humidity of 50% and a temperature of 23° C., for 72 hours in a room to measure mechanical property values. Results are shown in Table 2.

Comparative Example 2

Polymerization was performed using a continuous reaction apparatus composed by connecting two horizontal-type reactors (L/D=5.2, inner volume of 100 L), having a stirring blade, as the first reactor and the second reactor.

Firstly, into the first reactor, the preliminary activation treatment (preliminary polymerization treatment) solid catalyst, described in Example 1, was supplied continuously in 0.53 g/hr, and triethylalminum as an organoaluminum compound, and diisopropyldimethoxysilane as an organosilicon compound were supplied continuously, so as to attain an Al/Mg molar ratio of 6 and an Al/Si molar ratio of 6. While maintaining conditions of a reaction temperature of 65° C., a reaction pressure of 2.2 MPa, and a stirring speed of 35 rpm, hydrogen gas was continuously supplied, so that hydrogen concentration in the vapor phase in the reactor maintains hydrogen/propylene molar ratio as shown in Table 1, to adjust MFR of the first stage polymer. A polymer of the first stage polymerization formed was taken out intermittently, so as to attain a holding level of the polymer of 60% by volume of the reaction volume, to supply to the reactor of the second stage polymerization step (the first stage polymerization step).

Propylene and ethylene were continuously supplied, so as to attain a molar ratio of ethylene/propylene of 0.39, and a pressure of 2.0 MPa at a reaction temperature of 60° C. Hydrogen as a molecular weight controlling agent was not supplied. Ethyl alcohol as an activated hydrogen compound was supplied so as to be 1.1 time mole, relative to triethylalminum. Powder polymerized in the second reactor was taken out intermittently, so as to attain a polymer holding amount level of 60% by volume of the reaction volume, where a reaction was terminated by supplying nitrogen gas containing moisture, to obtain the propylene-based block copolymer (the second stage polymerization step).

To 4 kg of the resultant propylene-based block copolymer, 2.0 g of pentaerythrityl-tetrakis[3-(3,5-t-butyl-4-hydroxyphenyl)propionate] and 2.0 g of tris-(2,4-di-t-butylphenyl) phosphite, as phenol-based antioxidants, 2.0 g of calcium stearate as a neutralization agent, and 12 g of talc were added and mixed for 2 minutes at room temperature using a high speed stirring-type mixing machine (Henshcel mixer), and the mixture was granulated using an extrusion granulator with a screw diameter of 40 mm. Next, a test piece was prepared from the granulated substance, using an injection molding machine at a molten resin temperature of 250° C. and a mold temperature of 50° C. The obtained test piece was conditioned at a humidity of 50% and a temperature of 23° C., for 72 hours in a room to measure mechanical property values. Results are shown in Table 2.

TABLE 2

|  |  | Example 2 | Comparative Example 3 |
|---|---|---|---|
| Catalyst supply |  |  |  |
| Catalyst for olefin polymerization (solid catalyst) | g/h | 0.51 | 0.53 |
| Triethylaluminum | mmol/h | 23 | 24 |
| Diisopropyldimethoxysilane | mmol/h | 3.8 | 3.9 |
| First stage polymerization step |  |  |  |
| Reactor A |  | Horizontal-type reactor | Horizontal-type reactor |
| Hydrogen/propylene | molar ratio | 0.16 | 0.15 |
| MFR (Reaction tank A) | g/10 minutes | 130 | 111 |
| Reactor B |  | Horizontal-type reactor | — |
| Hydrogen/propylene | molar ratio | 0.06 | — |
| Polymerization ratio (Reactor B/first stage polymerization step) | wt % | 26 | — |
| MFR (Reactor B) | g/10 minutes | 39 | — |
| MFR1 of polymer in 1st stage polymerization step | g/10 minutes | 92 | 111 |
| Second stage polymerization step |  |  |  |
| Reactor C |  | Fluidized bed-type reactor | Horizontal-type reactor |
| Hdrogen/propylene | molar ratio | 0.01 | 0.02 |
| Ethylene/propylene | molar ratio | 0.33 | 0.39 |
| EtOH supply amount (EtOH/TEA) | molar ratio | 1.2 | 1.1 |
| MFR2(2nd stage polymerization step) | g/10 minutes | 0.010 | 0.027 |
| Polymerization ratio of second stage polymer | wt % | 13.3 | 14.3 |
| Ethylene amount in second stage polymer | wt % | 44.3 | 44.6 |
| Propylene-based block copolymer |  |  |  |
| log (MFR1/MFR2) |  | 3.97 | 3.61 |
| Production speed | kg/h | 21.3 | 15.8 |
| MFR | g/10 minutes | 28.1 | 33.8 |
| Flexural modulus | Mpa | 1230 | 1160 |
| Izod impact strength (−30° C.) | KJ/m$^2$ | 2.4 | 2.2 |
| Gel |  | ⊚+ | Δ |

Example 3

1) Production of the Propylene-Based Block Copolymer

Explanation will be given with reference to the flow sheet shown in FIG. 12. Production of the propylene-based block copolymer was performed using a propylene polymerization apparatus arranged with one horizontal-type reactor (L/D=5.2, inner volume of 100 L), having a stirring blade (a reactor A), and two fluidized bed-type reactors with an inner volume of 2000 L (a reactor C and a reactor D) in series.

(i) The First Stage Polymerization Step

The preliminary activation treatment (preliminary polymerization treatment) solid catalyst, described in Example 1, was supplied continuously in 0.53 g/hr, and triethylalminum as an organoaluminum compound, and diisopropyldimethoxysilane as an organosilicon compound were supplied continuously to the most upstream part of the reactor A (10), so as to attain an Al/Mg molar ratio of 6 and an Al/Si molar ratio of 6. While maintaining conditions of a reaction temperature of 65° C., a reaction pressure of 2.2 MPa, and a stirring speed of 35 rpm, hydrogen gas was continuously supplied from a pipeline 6, so that hydrogen concentration in the vapor phase in the reactor maintains hydrogen/propylene molar ratio as shown in Table 1, to adjust MFR of the reactor A.

Reaction heat was removed by vaporization heat of raw material liquefied propylene supplied from a pipeline 17. Unreacted gas exhausted from the reactor was cooled and condensed outside the reactor system through the pipeline 13, to be refluxed to the reactor A (10) by the pipeline 17.

A polymer of the first stage polymerization formed was taken out intermittently from the reactor A (10) through the pipeline 37, so that a holding level of the polymer of 60% by volume of the reaction volume is attained.

In this time, a part of the polymer was intermittently collected from a pipeline 37, as a sample for measuring MFR and polymer yield per unit weight of the catalyst. Polymer yield per unit weight of the catalyst was calculated from Mg content in the polymer, measured using inductively coupled plasma-atomic emission spectrometry (ICP method). A component polymerized in the first stage polymerization step was defined as a polymer component (A).

(ii) The Second Stage Polymerization Step

Subsequent to the first stage polymerization step, the second stage polymerization step was performed in two fluidized bed-type reactors with an inner volume of 2000 L (20-2 and 40-2). Propylene and ethylene were continuously supplied, so as to attain a molar ratio of ethylene/propylene of 0.30, and a pressure of 2.0 MPa at a reaction temperature of 60° C., further hydrogen as a molecular weight controlling agent and ethylene were continuously supplied so as to attain a molar ratio of hydrogen/ethylene of 0.13 from a pipeline 7-2, as well as ethyl alcohol as an activated hydrogen compound (an electron donor compound) was supplied from the pipeline 7-2, so as to be 0.5 time mole, relative to triethylalminum. Powder polymerized in the fluidized bed-type reactor 20-2 was fluidized, so as to attain a superficial velocity of 0.40 m/sec, as well as taken out intermittently to a degassing tank 31 from a pipeline 38 once in 5 to 10 minutes, by about 2 kg each time, so as to attain a powder holding amount inside the reactor of 40 kg in average. In this time, a part of the polymer was intermittently collected from a pipeline 38, to be provided for measuring MFR and content of ethylene by an infrared ray absorption spectroscopy, and calculation of polymer yield per unit weight of the catalyst by measurement of Mg content in the polymer by an ICP method. A component polymerized in the present step was defined as a polymer component (B1).

A polymer exhausted from the fluidized bed-type reactor 20-2 was supplied to the fluidized bed-type reactor 40-2 from the pipeline 27-2 to subsequently perform the second stage polymerization step. Propylene and ethylene were continuously supplied, so as to attain a molar ratio of ethylene/propylene of 0.63, and a pressure of 2.0 MPa at a reaction temperature of 60° C., further hydrogen as a molecular weight controlling agent and ethylene were continuously supplied so as to attain a molar ratio of hydrogen/ethylene of 0.09 from a pipeline 8, as well as ethyl alcohol as an activated hydrogen compound was supplied from the pipeline 8-2, so as to be 0.9 time mole, relative to triethylalminum. Powder polymerized in the reactor 40-2 was fluidized, so as to attain a superficial velocity of 0.40 m/sec, as well as taken out intermittently to a degassing tank 32-2 from a pipeline 39 once in 5 to 10 minutes, by about 2 kg each time, so as to attain a powder holding amount inside the reactor of 60 kg in average. A component polymerized in the present step was defined as a polymer component (B2).

It was further transferred to another vessel, where the reaction was terminated by supplying nitrogen gas containing moisture, and residual propylene was purged to obtain a propylene-based block copolymer.

A part of the resultant propylene-based block copolymer was supplied to measure MFR, content of ethylene by an infrared ray absorption spectroscopy, generation amount of a copolymer by measurement of Mg content in the polymer by an ICP method, various mechanical properties and gel.

Further, to 4 kg of the resultant propylene-based block copolymer, 2.0 g of pentaerythrityl-tetrakis[3-(3,5-t-butyl-4-hydroxyphenyl)propionate] and 2.0 g of tris-(2,4-di-t-butylphenyl)phosphite, as phenol-based antioxidants, 2.0 g of calcium stearate as a neutralization agent, and 12 g of talc were added and mixed for 2 minutes at room temperature using a high speed stirring-type mixing machine (Henshcel mixer), and the mixture was granulated using an extrusion granulator with a screw diameter of 40 mm. Next, a test piece was prepared from the granulated substance, using an injection molding machine at a molten resin temperature of 250° C. and a mold temperature of 50° C. The obtained test piece was conditioned at a humidity of 50% and a temperature of 23° C., for 72 hours in a room to measure mechanical property values. Results are shown in Table 3.

Comparative Example 4

1) Production of the Propylene-Based Block Copolymer

Polymerization was performed using a continuous reaction apparatus composed by connecting two fluidized bed-type reactors, with an inner volume of 2000 L. Firstly, into the first reactor, triethylalminum as an organoaluminum compound was supplied continuously in 25 mmol/hr, so as to attain an Al/Mg molar ratio of 6, while maintaining a reaction temperature of 65° C., and a partial pressure of propylene of 2.2 MPa, as well as hydrogen, as a molecular weight controlling agent, was continuously supplied, so as to attain a hydrogen/propylene molar ratio of 0.27. MFR was 0.8 g/10 minutes. The preliminary activation treatment (preliminary polymerization treatment) solid catalyst component, described in Comparative Example 2, was supplied so as to attain a polymer polymerization speed of 12 kg/hr. Powder (a crystalline propylene polymer) polymerized in the first reactor was fluidized, so as to attain a superficial velocity of 0.35 m/sec, as well as taken out intermittently to a vessel once in 5 to 10 minutes, by about 2 kg each time, so as to attain a powder holding amount inside the reactor of 30 kg in average, and further transferred to the second reactor (the first polymerization step). A component polymerized in the first stage polymerization step was defined as a polymer component (A). MFR was 135 g/10 minutes. Polymer yield per unit weight of the catalyst was calculated from Mg content in the polymer, measured using inductively coupled plasma-atomic emission spectrometry (ICP method). Mg content was 8.4 ppm.

Subsequent to the first stage polymerization step, polymerization of the second stage polymerization step was performed in a fluidized bed-type reactor with an inner volume of 2000 L. In this fluidized bed-type reactor, propylene and ethylene were continuously supplied, so as to attain a molar ratio of ethylene/propylene of 0.32, and a pressure of 2.0 MPa at a reaction temperature of 60° C., and further hydrogen as a molecular weight controlling agent was continuously supplied so as to attain a molar ratio of hydrogen/propylene of 0.10, as well as ethyl alcohol as an activated hydrogen compound was supplied so as to be 0.8 time mole, relative to triethylalminum. Powder polymerized in the second reactor was fluidized, so as to attain a superficial velocity of 0.40 m/sec, as well as taken out intermittently to a degassing tank once in 5 to 10 minutes, by about 2 kg each time, so as to attain a powder holding amount inside the reactor of 30 kg in average, and further transferred to another vessel, where the reaction was terminated by supplying nitrogen gas containing moisture, and residual gas was purged to obtain a propylene-based block copolymer (the second stage polymerization step). A component polymerized in the second stage polymerization step was defined as a polymer component (B1).

A part of the resultant propylene-based block copolymer was supplied to measure MFR, content of ethylene by an infrared ray absorption spectroscopy, various mechanical properties and gel. MFR was 30 g/10 minutes, polymerization ratio of the second stage polymer produced in the second stage polymerization step was 26% by weight, based on total of the resultant propylene-based block copolymer, as well as polymerization ratio of ethylene in the second stage polymer was 38% by weight, based on the polymer component (B1) polymerized in the second stage polymerization step.

To 4 kg of the resultant propylene-based block copolymer, 2.0 g of pentaerythrityl-tetrakis[3-(3,5-t-butyl-4-hydroxyphenyl)propionate] and 2.0 g of tris-(2,4-di-t-butylphenyl) phosphite, as phenol-based antioxidants, 2.0 g of calcium stearate as a neutralization agent, and 12 g of talc were added and mixed for 2 minutes at room temperature using a high speed stirring-type mixing machine (Henshcel mixer), and the mixture was granulated using an extrusion granulator with a screw diameter of 40 mm. Next, a test piece was prepared from the granulated substance, using an injection molding machine at a molten resin temperature of 250° C. and a mold temperature of 50° C. The obtained test piece was conditioned at a humidity of 50% and a temperature of 23° C., for 72 hours in a room to measure mechanical property values. Results are shown in Table 3.

Comparative Example 5

Polymerization was performed using a continuous reaction apparatus composed by connecting two horizontal-type reactors, having a stirring blade.

Firstly, into the first reactor, the preliminary activation treatment (preliminary polymerization treatment) solid catalyst component, described in Example 1, was supplied continuously in 0.45 g/hr, and triethylalminum as an organoaluminum compound, and diisopropyldimethoxysilane as an organosilicon compound were supplied continuously in 20 mmol/hr and 3.3 mmol/hr, respectively, so as to attain an Al/Mg molar ratio of 6 and an Al/Si molar ratio of 6. While maintaining conditions of a reaction temperature of 65° C., a reaction pressure of 2.2 MPa, and a stirring speed of 35 rpm, hydrogen gas was continuously supplied, so that hydrogen concentration in the vapor phase in the reactor maintains hydrogen/propylene molar ratio as shown in Table 1, to adjust MFR of the first stage polymer. A polymer of the first stage polymerization formed was taken out intermittently, so as to attain a holding level of the polymer of 60% by volume of the reaction volume, to supply to the reactor of the second stage polymerization step (the first stage polymerization step). A component polymerized in the first stage polymerization step was defined as a polymer component (A). MFR was 143 g/10 minutes.

Subsequent to the first stage polymerization step, polymerization of the second stage polymerization step was performed in a horizontal-type reactor (L/D=5.2, and an inner volume of 100 L). Propylene and ethylene were continuously supplied, so as to attain a molar ratio of ethylene/propylene of 0.32, and a pressure of 2.0 MPa at a reaction temperature of 60° C., and further hydrogen as a molecular weight controlling agent was continuously supplied so as to attain a molar ratio of hydrogen/ethylene of 0.13, as well as ethyl alcohol as an activated hydrogen compound was supplied so as to be 0.3 time mole, relative to triethylalminum. Powder polymerized in the second reactor was taken out intermittently, so as to attain a powder holding amount of the polymer of 60% by volume of reaction volume, where the reaction was terminated by supplying nitrogen gas containing moisture, to obtain a propylene-based block copolymer (the second stage polymerization step). A component polymerized in the second stage polymerization step was defined as a polymer component (B1).

A part of the resultant propylene-based block copolymer was supplied to measure MFR, content of ethylene by an infrared ray absorption spectroscopy, various mechanical properties and gel. MFR was 32 g/10 minutes, polymerization ratio of the second stage polymer produced in the second stage polymerization step was 28% by weight, based on total of the resultant propylene-based block copolymer, as well as polymerization ratio of ethylene in the second stage polymer was 37% by weight, based on the polymer component (B1) polymerized in the second stage polymerization step.

To 4 kg of the resultant propylene-based block copolymer, 2.0 g of pentaerythrityl-tetrakis[3-(3,5-t-butyl-4-hydroxyphenyl)propionate] and 2.0 g of tris-(2,4-di-t-butylphenyl) phosphite, as phenol-based antioxidants, 2.0 g of calcium stearate as a neutralization agent, and 12 g of talc were added and mixed for 2 minutes at room temperature using a high speed stirring-type mixing machine (Henshcel mixer), and the mixture was granulated using an extrusion granulator with a screw diameter of 40 mm. Next, a test piece was prepared from the granulated substance, using an injection molding machine at a molten resin temperature of 250° C. and a mold temperature of 50° C. The obtained test piece was conditioned at a humidity of 50% and a temperature of 23° C., for 72 hours in a room to measure mechanical property values. Results are shown in Table 3.

TABLE 3

| | | Example 3 | Comparative Example 4 | Comparative Example 5 |
|---|---|---|---|---|
| Catalyst supply | | | | |
| Catalyst for olefin polymerization | g/h | 0.53 | 0.56 | 0.45 |
| Triethylaluminum | mmol/h | 24 | 25 | 20 |
| Diisopropyldimethoxysilane | mmol/h | 3.9 | — | 3.3 |
| First stage polymerization step | | | | |
| Reactor A | | Horizontal-type reactor | Fluidized bed-type reactor | Horizontal-type reactor |
| Hydrogen/propylene | molar ratio | 0.30 | 0.27 | 0.29 |
| MFR (Reactor A, polymer component (A)) | g/10 minutes | 146 | 135 | 143 |
| Second stage polymerization step | | | | |
| Reactor B | | Fluidized bed-type reactor | Fluidized bed-type reactor | Horizontal-type reactor |
| Hydrogen/propylene | molar ratio | 0.13 | 0.1 | 0.13 |
| Ethylene/propylene | molar ratio | 0.30 | 0.32 | 0.32 |
| MFR (Reactor A, polymer component (A)) | g/10 minutes | 0.66 | 0.41 | 0.68 |
| | | 0.5 | 0.8 | 0.3 |
| Polymerization ratio of second stage polymer (B1) | wt % | 24 | 26 | 28 |
| Ethylene amount in second-stage polymer (B1) | wt % | 37 | 38 | 37 |
| Reactor C | | Fluidized bed-type reactor | — | — |
| Hdrogen/propylene | molar ratio | 0.09 | — | — |
| Ethylene/propylene | molar ratio | 0.63 | — | — |
| EtOH supply amount (EtOH/TEA) | molar ratio | 0.9 | — | — |
| MFR (Reactor C, polymer component (B2)) | g/10 minutes | 0.33 | — | — |
| Polymerization ratio of second stage polymer | wt % | 13 | — | — |
| Ethylene amount in second stage polymer (B2) | wt % | 55 | — | — |
| Propylene-based block copolymer | | | | |
| Production speed | kg/h | 18.7 | 16.2 | 16.7 |
| MFR | g/10 minutes | 18.6 | 30.0 | 32.0 |
| Presence or absence of adhesion in 2nd stage polymerization step | | No | Yes | No |
| Gel | | ◎ | Δ | Δ |

Example 4

1) The First Stage Polymerization Step

Figure 16:
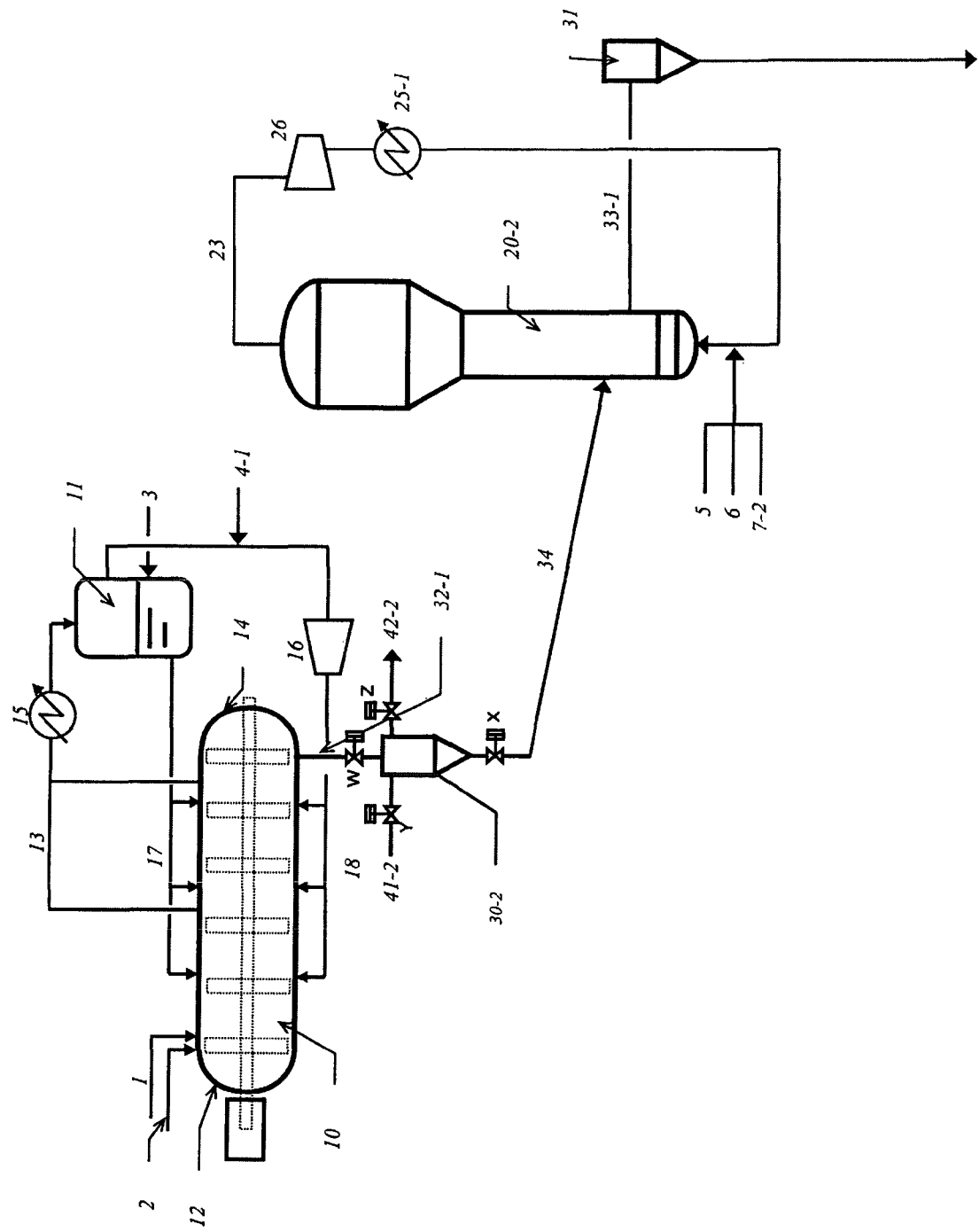
FIG. 16 is a process flow of a preferable aspect of the case where a horizontal-type reactor and a fluidized bed-type reactor are combined, and a schematic drawing showing a flow sheet of the production method used in Example, in the present invention.

Explanation will be given with reference to the flow sheet shown in FIG. 16. Into the horizontal-type reactors (L/D=5.2, inner volume of 100 L), having a stirring blade, the preliminary activation treatment (preliminary polymerization treatment) solid catalyst component, described in Example 1, was supplied continuously in 0.53 g/hr, and triethylalminum as an organoaluminum compound, and diisopropyldimethoxysilane as an organosilicon compound were supplied continuously in 24 mmol/hr and 3.9 mmol/hr, respectively, so as to attain an Al/Mg molar ratio of 6 and an Al/Si molar ratio of 6. While maintaining conditions of a reaction temperature of 65° C., a reaction pressure of 2.2 MPa, and a stirring speed of 35 rpm, hydrogen gas was continuously supplied, so that hydrogen concentration in the vapor phase in the reactor maintains hydrogen/propylene molar ratio as shown in Table 1, to adjust MFR of the first stage polymer.

Reaction heat was removed by vaporization heat of raw material liquefied propylene supplied from the pipeline 17. Unreacted gas exhausted from the polymerization reactor was cooled and condensed outside the reaction system through a pipeline 13, to be refluxed to a polymerization reactor 10 by the pipeline 17.

A polymer of the first stage polymerization formed was taken out intermittently from the polymerization reactor 10 through the pipeline 32-1, so that a holding level of the polymer of 60% by volume of the reaction volume is attained, to supply to the polymerization reactor 20-2 of the second stage polymerization step. Transfer of the polymer from the first stage polymerization step to the second stage polymerization step was performed, based on the following valve sequence operation:

a) Increase of powder level in the first stage polymerization reactor is sensed to open a valve W and receive the polymer up to 60% by volume, relative to volume of a receiver 30.
b) After closing the valve W, a valve Z is opened to exhaust gas so as to attain a pressure of the receiver 30 of 0.1 MPa.
c) After closing the valve Z, a valve Y is opened to pressurize the receiver 30 up to 2.2 MPa.
d) The valve X is opened to introduce the polymer in the receiver to the second stage polymerization step, and after a level gauge installed at the receiver shows 5% by volume, the valve X is closed after 1 second.

In this case, a part of the polymer was intermittently collected from the pipeline 32-1, as a sample for measuring MFR and polymer yield per unit weight of the catalyst. MFR was 145 g/10 minutes. Polymer yield per unit weight of the catalyst was calculated from Mg content in the polymer, measured using inductively coupled plasma-atomic emission spectrometry (ICP method).

2) The Second Stage Polymerization Step

Subsequent to the first stage polymerization step, polymerization of the second stage polymerization step was performed in a fluidized bed-type reactor with an inner volume of 2000 L. Propylene and ethylene were continuously supplied, so as to attain a molar ratio of ethylene/propylene of 0.3, and a pressure of 2.0 MPa at a reaction temperature of 60° C., and further hydrogen as a molecular weight controlling agent was continuously supplied so as to attain a molar ratio of hydrogen/ethylene of 0.13, as well as ethyl alcohol as an activated hydrogen compound was supplied so as to be 0.4 time mole, relative to triethylalminum. Powder polymerized in the second reactor was fluidized, so as to attain a superficial velocity of 0.40 m/sec, as well as taken out intermittently to a vessel once in 5 to 10 minutes, by about 2 kg each time, so as to attain a powder holding amount inside the reactor of 30 kg in average, and further transferred to another vessel, where the reaction was terminated by supplying nitrogen gas containing moisture, and residual gas was purged to obtain a propylene-based block copolymer.

A part of the resultant propylene-based block copolymer was supplied to measure MFR, content of ethylene by an infrared ray absorption spectroscopy, generation amount of a copolymer by measurement of Mg content in the polymer by an ICP method, and various mechanical properties and gel. MFR was 34 g/10 minutes, polymerization ratio of the second stage polymer produced in the second stage polymerization step was 27% by weight, based on total of the resultant propylene-based block copolymer, as well as polymerization ratio of ethylene in the second stage polymer was 37% by weight, based on the polymer polymerized in the second stage polymerization step.

Further, to 4 kg of the resultant propylene-based block copolymer, 2.0 g of pentaerythrityl-tetrakis[3-(3,5-t-butyl-4-hydroxyphenyl)propionate] and 2.0 g of tris-(2,4-di-t-butylphenyl)phosphite, as phenol-based antioxidants, 2.0 g of calcium stearate as a neutralization agent, and 12 g of talc were added and mixed for 2 minutes at room temperature using a high speed stirring-type mixing machine (Henshcel mixer), and the mixture was granulated using an extrusion granulator with a screw diameter of 40 mm. Next, a test piece was prepared from the granulated substance, using an injection molding machine at a molten resin temperature of 250° C. and a mold temperature of 50° C. The obtained test piece was conditioned at a humidity of 50% and a temperature of 23° C., for 72 hours in a room to measure mechanical property values. Results are shown in Table 4.

Example 5

Polymerization was performed in accordance with Example 4, except that hydrogen/propylene ratio in the first stage polymerization step, hydrogen/ethylene ratio, ethylene/propylene ratio and ethanol/TEA ratio in the second stage polymerization step were changed, and talc was excluded in granulation of the propylene-based block copolymer. Results are shown in Table 4.

Comparative Example 6

Polymerization was performed using a continuous reaction apparatus composed by connecting two horizontal-type reactors (L/D=5.2, inner volume of 100 L), having a stirring blade.

Firstly, into the first reactor, the preliminary activation treatment (preliminary polymerization treatment) solid catalyst component, described in Example 1, was supplied continuously in 0.45 g/hr, and triethylalminum as an organoaluminum compound, and diisopropyldimethoxysilane as an organosilicon compound were supplied continuously in 20 mmol/hr and 3.3 mmol/hr, respectively, so as to attain an Al/Mg molar ratio of 6 and an Al/Si molar ratio of 6. While maintaining conditions of a reaction temperature of 65° C., a reaction pressure of 2.2 MPa, and a stirring speed of 35 rpm, hydrogen gas was continuously supplied, so that hydrogen concentration in the vapor phase in the reactor maintains hydrogen/propylene molar ratio as shown in Table 1, to adjust MFR of the first stage polymer. A polymer of the first stage polymerization formed was taken out intermittently, so as to attain a holding level of the polymer of 60% by volume of the reaction volume, to supply to the polymerization reactor of the second stage polymerization step (the first stage polymerization step). It should be noted that transfer of the polymer from the first stage polymerization step to the second stage polymerization step was performed, using the level gauge installed at the receiver (30), based on the valve sequence operation of the receiver (30) described in Example 1. MFR was 76 g/10 minutes.

Subsequent to the first stage polymerization step, polymerization of the second stage polymerization step was performed in the horizontal-type reactor (L/D=5.2, and an inner volume of 100 L). Propylene and ethylene were continuously supplied, so as to attain a molar ratio of ethylene/propylene of 0.32, and a pressure of 2.0 MPa at a reaction temperature of 60° C., and further hydrogen as a molecular weight controlling agent was continuously supplied so as to attain a molar ratio of hydrogen/ethylene of 0.13, as well as ethyl alcohol as an activated hydrogen compound was supplied so as to be 0.3 time mole, relative to triethylalminum. Powder polymerized in the second reactor was taken out intermittently, so as to attain a powder holding amount of the polymer of 60% by volume of reaction volume, where the reaction was terminated by supplying nitrogen gas containing moisture, to obtain a propylene-based block copolymer (the second stage polymerization step).

A part of the resultant propylene-based block copolymer was supplied to measure MFR, content of ethylene by an infrared ray absorption spectroscopy, generation amount of a copolymer by measurement of Mg content in the polymer by an ICP method, various mechanical properties and gel. MFR was 32 g/10 minutes, polymerization ratio of the second stage polymer produced in the second stage polymerization step was 28% by weight, based on total of the resultant propylene-based block copolymer, as well as polymerization ratio of ethylene in the second stage polymer was 37% by weight, based on the polymer polymerized in the second stage polymerization step.

To 4 kg of the resultant propylene-based block copolymer, 2.0 g of pentaerythrityl-tetrakis[3-(3,5-t-butyl-4-hydroxyphenyl)propionate] and 2.0 g of tris-(2,4-di-t-butylphenyl)phosphite, as phenol-based antioxidants, 2.0 g of calcium stearate as a neutralization agent, and 12 g of talc were added and mixed for 2 minutes at room temperature using a high speed stirring-type mixing machine (Henshcel mixer), and the mixture was granulated using an extrusion granulator with a screw diameter of 40 mm. Next, a test piece was prepared from the granulated substance, using an injection molding machine at a molten resin temperature of 250° C. and a mold temperature of 50° C. The obtained test piece was conditioned at a humidity of 50% and a temperature of 23° C., for 72 hours in a room to measure mechanical property values. Results are shown in Table 4.

Comparative Example 7

Polymerization was performed in accordance with Comparative Example 6, except that hydrogen/propylene ratio in the first stage polymerization step, hydrogen/ethylene ratio, ethylene/propylene ratio and ethanol/TEA ratio in the second stage polymerization step were changed, and talc was exclude in granulation of the propylene-based block copolymer. Results are shown in Table 4.

Comparative Example 8

1) Polymerization

Polymerization was performed using a continuous reaction apparatus composed by connecting two fluidized bed-type reactors, with an inner volume of 2000 L. Firstly, into the first reactor, triethylalminum as an organoaluminum compound was supplied continuously in 25 mmol/hr, so as to attain an Al/Mg molar ratio of 6, while maintaining a reaction temperature of 65° C., and a partial pressure of propylene of 2.2 MPa, as well as hydrogen, as a molecular weight controlling agent, was continuously supplied, so as to attain a hydrogen/propylene molar ratio of 0.27. The preliminary activation treatment (preliminary polymerization treatment) solid catalyst component, described in Comparative Example 2, was supplied so as to attain a polymer polymerization speed of 12 kg/hr. Powder (a crystalline propylene polymer) polymerized in the first reactor was fluidized, so as to attain a superficial velocity of 0.35 m/sec, as well as taken out intermittently to a vessel once in 5 to 10 minutes, by about 2 kg each time, so as to attain a powder holding amount inside the reactor of 30 kg in average, and further transferred to the second reactor (the first polymerization step). It should be noted that transfer of the polymer from the first stage polymerization step to the second stage polymerization step was performed, using the level gauge installed at the receiver (30), based on the valve sequence operation of the receiver (30) described in Example 1. MFR was 135 g/10 minutes.

Subsequent to the first stage polymerization step, polymerization of the second stage polymerization step was performed in a fluidized bed-type reactor with an inner volume of 2000 L. In this second reactor, propylene and ethylene were continuously supplied, so as to attain a molar ratio of ethylene/propylene of 0.32, and a pressure of 2.0 MPa at a reaction temperature of 60° C., and further hydrogen as a molecular weight controlling agent was continuously supplied so as to attain a molar ratio of hydrogen/propylene of 0.10, as well as ethyl alcohol as an activated hydrogen compound was supplied so as to be 0.8 time mole, relative to triethylalminum. Powder polymerized in the second reactor was fluidized, so as to attain a superficial velocity of 0.40 m/sec, as well as taken out intermittently to a vessel once in 5 to 10 minutes, by about 2 kg each time, so as to attain a powder holding amount inside the reactor of 30 kg in average, and further transferred to another vessel, where the reaction was terminated by supplying nitrogen gas containing moisture, and residual gas was purged to obtain a propylene-based block copolymer (the second stage polymerization step).

A part of the resultant propylene-based block copolymer was supplied to measure MFR, content of ethylene by an infrared ray absorption spectroscopy, generation amount of the copolymer by measurement of Mg content in the polymer by an ICP method, various mechanical properties and gel. MFR was 30 g/10 minutes, polymerization ratio of the second stage polymer produced in the second stage polymerization step was 26% by weight, based on total of the resultant propylene-based block copolymer, as well as polymerization ratio of ethylene in the second stage polymer was 38% by weight, based on the polymer polymerized in the second stage polymerization step.

To 4 kg of the resultant propylene-based block copolymer, 2.0 g of pentaerythrityl-tetrakis[3-(3,5-t-butyl-4-hydroxyphenyl)propionate] and 2.0 g of tris-(2,4-di-t-butylphenyl) phosphite, as phenol-based antioxidants, 2.0 g of calcium stearate as a neutralization agent, and 12 g of talc were added and mixed for 2 minutes at room temperature using a high speed stirring-type mixing machine (Henshcel mixer), and the mixture was granulated using an extrusion granulator with a screw diameter of 40 mm. Next, a test piece was prepared from the granulated substance, using an injection molding machine at a molten resin temperature of 250° C. and a mold temperature of 50° C. The obtained test piece was conditioned at a humidity of 50% and a temperature of 23° C., for 72 hours in a room to measure mechanical property values. Results are shown in Table 4.

Comparative Example 9

Polymerization was performed in accordance with Example 8, except that hydrogen/propylene ratio in the first stage polymerization step, hydrogen/ethylene ratio, ethylene/propylene ratio and ethanol/TEA ratio in the second stage polymerization step were changed, and talc was exclude in granulation of the propylene-based block copolymer. Results are shown in Table 4.

Comparative Example 10

Polymerization was performed in accordance with Example 4, except that level gauge actuation was not used in actuation sequence of the valve (B) of the receiver (30), and the valve (B) was closed at a timing when pressure of the receiver (30) became 2.1 MPa.

TABLE 4

|  |  | Example 4 | Example 5 | Comparative Example 6 | Comparative Example 7 | Comparative Example 8 | Comparative Example 9 | Comparative Example 10 |
|---|---|---|---|---|---|---|---|---|
| Catalyst supply |  |  |  |  |  |  |  |  |
| Catalyst for olefin polymerization | g/h | 0.53 | 0.54 | 0.45 | 0.42 | 0.56 | 0.51 | 0.71 |
| Triethylaluminum | mmol/h | 24 | 24 | 20 | 19 | 25 | 23 | 32 |
| Diisopropyldimethoxysilane | mmol/h | 3.9 | 4.0 | 3.3 | 3.1 | — | — | 5.3 |

TABLE 4-continued

| | | Example 4 | Example 5 | Comparative Example 6 | Comparative Example 7 | Comparative Example 8 | Comparative Example 9 | Comparative Example 10 |
|---|---|---|---|---|---|---|---|---|
| First stage polymerization step | | | | | | | | |
| Process | | Horizontal-type reactor | Horizontal-type reactor | Horizontal-type reactor | Horizontal-type reactor | Fluidized bed-type reactor | Fluidized bed-type reactor | Horizontal-type reactor |
| Hydrogen/propylene | molar ratio | 0.3 | 0.16 | 0.29 | 0.18 | 0.27 | 0.15 | 0.30 |
| MFR (first stage polymer) | g/10 minutes | 145 | 70 | 143.00 | 76 | 135 | 65 | 146.00 |
| Polymer yield per unit weight of catalyst | g/g | 24900 | 26100 | 26700 | 28700 | 21400 | 23600 | 18300 |
| Second stage polymerization step | | | | | | | | |
| Process | | Fluidized bed-type reactor | Fluidized bed-type reactor | Horizontal-type reactor | Horizontal-type reactor | Fluidized bed-type reactor | Fluidized bed-type reactor | Fluidized bed-type reactor |
| Hydrogen/propylene | molar ratio | 0.13 | 0.11 | 0.13 | 0.08 | 0.10 | 0.09 | 0.11 |
| Ethylene/propylene | molar ratio | 0.30 | 0.60 | 0.32 | 0.68 | 0.32 | 0.62 | 0.28-0.30*[1] |
| EtOH supply amount (EtOH/TEA) | molar ratio | 0.4 | 1.1 | 0.3 | 1.0 | 0.8 | 1.2 | 0.4 |
| Polymerization ratio of second-stage polymer | wt % | 27 | 17 | 28 | 17 | 26 | 16 | 26 |
| Ethylene amount in second-stage polymer | wt % | 37 | 54 | 37 | 51 | 38 | 54 | 36 |
| Propylene-based block copolymer | | | | | | | | |
| Production speed | kg/h | 18.1 | 17.0 | 16.7 | 14.5 | 16.2 | 14.3 | 17.6 |
| MFR | g/10 minutes | 34 | 30 | 32 | 28 | 30 | 28 | 34 |
| Polymer yield per unit weight of catalyst | g/g | 34200 | 31500 | 37100 | 34500 | 28900 | 28000 | 24800 |
| Flexural modulus Mpa | | 920 | 1190 | 950 | 1210 | 940 | 1200 | 960 |
| Izod impact strength (−20° C.) | KJ/m$^2$ | — | 5.0 | — | 6.2 | — | 5.6 | — |
| Izod impact strength (−30° C.) | KJ/m$^2$ | 6.0 | — | 6.8 | — | 6.4 | — | 5.2 |
| Gloss | % | 49 | 54 | 57 | 60 | 50 | 56 | 65 |
| Gel | | ⊚ | ○ | ○ | ○ | Δ | Δ | ⊚ |

*[1] A gas composition was not stable

As is clear from Table 1, in Comparative Examples 1 and 2, which are methods not satisfying the requisite of "each at least one or more reactor of a horizontal-type reactor having inside a stirring machine which rotates around a horizontal axis, and a continuous stirred tank reactor to be connected to said horizontal-type reactor are provided", which is the propylene polymerization reaction apparatus and the production method of a propylene-based polymer of the present invention, productivity decreased significantly (Comparative Example 1) under condition of a dew point of reactant gas of lower than 50° C., or long time was required for changing polymerization condition (Comparative Example 2).

Therefore, it has been confirmed from Example 1 that not only high productivity can be maintained but also superior result can be obtained in that, in the case of changing polymerization condition (residence time), adjustment thereof becomes extremely easy (short time), by using the propylene polymerization reaction apparatus in combination of the horizontal-type reactor and the continuous stirred tank reactor, which is a specified item of the present invention, in the production method for the propylene multi-stage continuous vapor phase polymer including a polymerization component requiring reactant gas condition of low dew point.

In addition, as is clear from Table 2, it has been understood that, as compared with the one obtained in Comparative Example 3, which is a method not satisfying the requisite of "to produce a propylene/α-olefin copolymer component in at least two or more horizontal-type reactors having inside a stirring machine which rotates around a horizontal axis, and at least one or more continuous stirred tank reactor-type reactor", which is a specified matter of the production method of the present invention, which is the propylene-based block copolymer having many gel generation, the propylene-based block copolymer composition of Example 2 by the production method of the present invention is the propylene-based block copolymer having suppressed gel generation.

Additionally, it has been understood that by controlling hydrogen concentration in the second horizontal-type reactor, it becomes possible to decrease hydrogen concentration in the second stage polymerization step, and further increase molecular weight of a copolymer component.

Therefore, Examples can be said to provide superior result in view of suppressing gel and producing a copolymer component having high molecular weight, by specifying a process at each polymerization step, which is a specified item of the production method of the present invention, in production method of the propylene-based block copolymer. In addition, the polypropylene-based block copolymer composition according to Example of the production method of the present invention satisfies also a value of an MFR of 25 g/10 minutes or higher, as a target for maintaining fluidity.

In addition, as is clear from Table 3, it has been understood that, as compared with the one obtained in Comparative Examples 4 and 5, which are methods not satisfying the requisite of "to produce a propylene/α-olefin copolymer component in a propylene polymerization reaction apparatus, all arranged with, in series, at least one horizontal-type reactor having inside a stirring machine which rotates around a horizontal axis, and at least two continuous stirred tank reactors", which is a specified matter of the production method of the present invention, which is the propylene-based block copolymer having many gel generation, the polypropylene-based block copolymer composition of Example 3 by the production method of the present invention is the propylene-based block copolymer having suppressed gel generation, irrespective of high content of a copolymer and containing a component having high ethylene in the copolymer component. In addition, it has been understood that installment of the horizontal-type reactor at the stage before the continuous stirred tank reactor has suppressing effect of adhering substance inside the reactor of the continuous stirred tank reactor.

Accordingly, Examples can be said to provide superior result in view of suppressing gel and producing a copolymer component having high content and a copolymer component having high content of α-olefin, by specifying a process at each polymerization step, which is a specified item of the production method of the present invention, in the production method of the propylene-based block copolymer.

In addition, as is clear from Table 4, it has been understood that, as compared with the one obtained in Comparative Examples 6 to 10, which are methods not satisfying the requisite of "each at least one or more horizontal-type reactor having inside a stirring machine which rotates around a horizontal axis, and a continuous stirred tank reactor to be connected to said horizontal-type reactor are provided; and a receiver having a level gauge is installed between the horizontal-type reactor and the continuous stirred tank reactor to control amount of a polymer which should be transferred between both reactors", which is a specified matter of the production method of the present invention, which is the propylene-based block copolymer having high gloss or many gel generation, the polypropylene-based block copolymer composition of Example 3 by the production method of the present invention is the propylene-based block copolymer having suppressed gloss and gel generation.

Specifically, in comparison between Example 4 and Comparative Example 6, it has been understood that by using the "continuous stirred tank reactor" in the second stage polymerization step, gloss can be suppressed. In addition, in comparison between Example 4 and Comparative Example 8, it has been understood that by using the "the horizontal-type reactor having inside a stirring machine which rotates around a horizontal axis" in the first stage polymerization step, gel generation can be suppressed.

Although both Example 4 and Comparative Example 10 are examples of producing a propylene/α-olefin copolymer component using "an apparatus provided with each at least one horizontal-type reactor having inside a stirring machine which rotates around a horizontal axis, and a continuous stirred tank reactor to be connected to said horizontal-type reactor", they are examples of sequence actuation by pressure change of a receiver, without using a level gauge, in transferring a polymer from the first stage polymerization step to the second stage polymerization step. In this case, turbulence (fluctuation) of a reactant gas composition in the second stage polymerization step increases, resulting in increasing in gloss of the propylene-based block copolymer. This is because of incurring disturbance of a reactant gas composition in the step for transferring the polymer, and thus widening ethylene distribution in the propylene-based block copolymer, irrespective of adopting "the continuous stirred tank reactor" which enables to provide a more uniform reactant gas composition, in the second stage polymerization step.

Accordingly, from Examples 4 and 5, it has been confirmed that by using a polymerization apparatus, which is a specified item of the present invention, by specifying a process at each polymerization step, and by using a transferring method of a polymer disclosed in the present invention, superior result can be obtained in view of suppression of gloss and gel generation.

INDUSTRIAL APPLICABILITY

According to the apparatus and the production method of the present invention, a continuous multi-stage polymer of the propylene-based polymer can be produced in minimal capital investment cost, and by stably maintaining high productivity; as well as in the case of changing residence time in a specific vapor phase polymerization reactor in the multi-stage continuous vapor phase polymerization method, adjustment thereof becomes extremely easy (short time), thus enabling production in a large degree of decreased state of generation amount of an off-specification product accompanying with change of polymerization condition.

In addition, according to the apparatus and the production method of the present invention, it is possible to obtain an injection molded article or the like superior in appearance and rigidity/impact resistance at low temperature, because the propylene-based block copolymer having suppressed gel generation can be obtained. In addition, it enables to supply the propylene-based block copolymer which is cheaper and is stable in quality, because of a continuous vapor phase polymerization method.

In addition, according to the apparatus and the production method of the present invention, the propylene-based block copolymer, having superior balance of rigidity/impact resistance, as well as reduced gel generation, suitable for automotive members or an electric appliance members and the like, can be produced stably and efficiently having suppressed adhesion inside the reactor. In addition, it enables to supply the propylene-based block copolymer which is cheaper and is stable in quality, because of a continuous vapor phase polymerization method. In addition, by installing two or more continuous stirred tank reactors, not only increase in content of the copolymer component of the propylene-based block copolymer becomes easy but also in the case of producing the copolymer component in two or more reactors, by making the copolymer component having different content of the α-olefin and/or molecular weight in each reactor, further quality enhancement and diversity can be attained.

In addition, according to the apparatus and the production method of the present invention, it is possible to obtain an injection molded article or an extrusion molded article superior in appearance, because the propylene-based block copolymer having suppressed gloss and gel generation can be obtained. Additionally, it enables to supply the propylene-based block copolymer which is cheaper and is stable in quality, because of a continuous vapor phase polymerization method.

Accordingly, the apparatus and the production method of the present invention are very useful industrially.

REFERENCE SIGNS LIST

1, 2 Catalyst supplying pipeline
3, 4-2, 5 Raw material propylene replenishing pipeline
4-1,6,7,8 Raw material replenishing pipeline (hydrogen.ethylene or the like)
7-2, 8-2 Electron donor compound supplying pipeline
10 Horizontal-type reactor
11, 21 Vapor liquid separation tank
12, 22 Upstream end of a reactor
13, 23, 33-2 Unreacted gas taking out pipeline
14, 24 Downstream end of a reactor 15, 25-2 Condenser
16, 26, 36 Compressor
17, 27-1 Raw material liquefied propylene replenishing pipeline
18, 28 Raw material mixed gas supplying pipeline
20-1 Horizontal-type reactor
20-2 Continuous stirred tank reactor
25-1, 45 Circulation gas cooler
30-2 Receiver (installed with a level gauge)
30-1, 31, 32-2 Receiver
32-1, 33-1, 37, 38, 39 Polymer taking out pipeline
40-1, 40-2 Continuous stirred tank reactor
25-3, 27-2, 34, 41-1, 42-1 Polymer supplying pipeline
41-2 Pressurized gas supplying pipeline
42-2 Gas exhausting pipeline
W Polymer exhausting valve
X Polymer transferring valve
Y Gas introducing valve
Z Gas exhausting valve

The invention claimed is:

1. A propylene polymerization reaction apparatus for producing a propylene-based polymer by a multi-stage continuous vapor phase polymerization method, comprising at least one horizontal reactor including inside a stirring element rotatable around a horizontal axis, and at least one continuous stirred tank reactor connected to said at least one horizontal reactor; and
the at least one continuous stirred tank reactor is a reactor for performing removal of heat of polymerization by utilization of:
(i) latent heat of vaporization of liquefied propylene of a raw material; or
(ii) mainly sensible heat of recirculation gas.

2. The propylene polymerization reaction apparatus according to claim 1, wherein the at least one continuous stirred tank reactor is installed just after the at least one horizontal reactor.

3. The propylene polymerization reaction apparatus according to claim 1, wherein the at least one horizontal reactor comprises at least two horizontal reactors.

4. The propylene polymerization reaction apparatus according to claim 3, wherein at least two of said at least two horizontal reactors are arranged upstream of the at least one continuous stirred tank reactor.

5. The propylene polymerization reaction apparatus according to claim 3, comprising, in series from upstream to downstream, two of said at least two horizontal reactors, and one continuous stirred tank reactor of the at least one continuous stirred tank reactor.

6. The propylene polymerization reaction apparatus according to claim 1, wherein the at least one continuous stirred tank reactor comprises at least two continuous stirred tank reactors.

7. The propylene polymerization reaction apparatus according to claim 6, wherein at least one reactor among the at least one horizontal reactor is arranged at an upstream side of one of the at least two continuous stirred tank reactors arranged at a most upstream process side among the at least two continuous stirred tank reactors.

8. The propylene polymerization reaction apparatus according to claim 6, wherein at least one reactor among the at least one horizontal reactor, one reactor among the at least two continuous stirred tank reactors, and another reactor among the at least two continuous stirred tank reactors are arranged in this order from an upstream process side.

9. The propylene polymerization reaction apparatus according to claim 1, wherein a receiver having at least one level gauge is installed between the at least one horizontal reactor and the at least one continuous stirred tank reactor to control amount of a polymer which should be transferred between both reactors.

10. The propylene polymerization reaction apparatus according to claim 9, wherein the at least one continuous stirred tank reactor is installed just after the at least one horizontal reactor via the receiver.

11. The propylene polymerization reaction apparatus according to claim 9, wherein the receiver is arranged just under an exit for taking out a polymer of the at least one horizontal reactor, and at a position higher than an entrance of polymer into the at least one continuous stirred tank reactor.

12. The propylene polymerization reaction apparatus according to claim 9, wherein the receiver includes a gas introduction valve and a gas exhaustion valve.

13. The propylene polymerization reaction apparatus according to claim 1, wherein the at least one continuous stirred tank reactor is a reactor selected from a vertical stirring tank reactor, a stirring fluidized bed reactor, or a fluidized bed reactor.

14. The propylene polymerization reaction apparatus according to claim 1, wherein the at least one continuous stirred tank reactor is a fluidized bed reactor.

15. The propylene polymerization reaction apparatus according to claim 1, wherein the at least one horizontal reactor has an L/D of 5 or larger (L: length of a horizontally longer direction, and D: inner diameter).

16. A production method of a propylene-based polymer, comprising performing multi-stage continuous vapor phase polymerization of propylene in the presence of a catalyst for olefin polymerization with the propylene polymerization reaction apparatus according to claim 1.

17. The production method of a propylene-based polymer according to claim 16, wherein a polymerization reaction in at least one continuous stirred tank reactor is performed using reactant gas having a dew point of 50° C. or lower.

18. The production method of a propylene-based polymer according to claim 16, comprising performing a first stage polymerization to produce a polymer component (A) having a content of a monomer unit, based on propylene, of 95% by weight or more, by homopolymerization of propylene, or copolymerization of propylene and an α-olefin (provided that propylene is excluded) in the at least one horizontal reactor, and subsequently performing a second stage polymerization to produce a copolymer component (B) having a content of a monomer unit, based on propylene, of 95 to 5% by weight, by copolymerization of propylene and an α-olefin (provided that propylene is excluded) in the at least one continuous stirred tank reactor.

19. A production method of a propylene-based polymer for performing multi-stage continuous vapor phase polymerization of propylene in the presence of a catalyst for olefin polymerization, with the propylene polymerization reaction apparatus according to claim 3, comprising:
performing a first stage polymerization to produce a polymer component (A) having a content of a monomer unit, based on propylene, of 95% by weight or more, by homopolymerization of propylene, or copolymerization of propylene and an α-olefin (provided that propylene is excluded) in at least two reactors of the at least one horizontal reactor.

20. A production method of a propylene-based polymer for performing multi-stage continuous vapor phase polymerization of propylene in the presence of a catalyst for olefin polymerization, using the propylene polymerization reaction apparatus according to claim 6, comprising:

performing a second stage polymerization to produce a copolymer component (B) having a content of a monomer unit, based on propylene, of 95 to 5% by weight, by copolymerization of propylene and an α-olefin (provided that propylene is excluded) in the at least two continuous stirred tank reactors.

21. The production method of a propylene-based polymer according to claim 18, wherein melt flow rate of the polymer component (A) (MFR$_1$) and melt flow rate of the copolymer component (B) (MFR$_2$) satisfy a relation of $3 \leq \log(\text{MFR}_1/\text{MFR}_2) \leq 7$.

22. The production method of a propylene-based polymer according to claim 20, wherein the copolymer components produced in each of the at least two continuous stirred tank reactors differ in content of the α-olefin and/or molecular weight.

23. A propylene polymerization reaction apparatus for producing a propylene-based polymer by a multi-stage continuous vapor phase polymerization method, comprising at least one horizontal reactor including inside a stirring element rotatable around a horizontal axis, and at least one continuous stirred tank reactor connected to said at least one horizontal reactor; and
the at least one continuous stirred tank reactor is a reactor for performing removal of heat of polymerization by utilization of mainly sensible heat of recirculation gas.

24. A propylene polymerization reaction apparatus for producing a propylene-based polymer by a multi-stage continuous vapor phase polymerization method, comprising at least one horizontal reactor including inside a stirring element rotatable around a horizontal axis, and at least one continuous stirred tank reactor connected to said at least one horizontal reactor; and
the at least one continuous stirred tank reactor is a fluidized bed reactor.

25. A propylene polymerization reaction apparatus for producing a propylene-based polymer by a multi-stage continuous vapor phase polymerization method, comprising at least one horizontal reactor including inside a stirring element rotatable around a horizontal axis, and at least one continuous stirred tank reactor connected to said at least one horizontal reactor; and
the at least one horizontal reactor has an L/D of 5 or larger (L: length of a horizontally longer direction, and D: inner diameter).

26. A production method of a propylene-based polymer, comprising performing multi-stage continuous vapor phase polymerization of propylene in the presence of a catalyst for olefin polymerization with the propylene polymerization reaction apparatus according to claim 23.

27. A production method of a propylene-based polymer, comprising performing multi-stage continuous vapor phase polymerization of propylene in the presence of a catalyst for olefin polymerization with the propylene polymerization reaction apparatus according to claim 24.

28. A production method of a propylene-based polymer, comprising performing multi-stage continuous vapor phase polymerization of propylene in the presence of a catalyst for olefin polymerization with the propylene polymerization reaction apparatus according to claim 25.

29. A production method of a propylene-based polymer, comprising performing multi-stage continuous vapor phase polymerization of propylene in the presence of a catalyst for olefin polymerization with the propylene polymerization reaction apparatus comprising at least one horizontal reactor including inside a stirring element rotatable around a horizontal axis, and at least one continuous stirred tank reactor connected to said at least one horizontal reactor, comprising:
performing a first stage polymerization to produce a polymer component (A) having a content of a monomer unit, based on propylene, of 95% by weight or more, by homopolymerization of propylene, or copolymerization of propylene and an α-olefin (provided that propylene is excluded) in the at least one horizontal reactor, and subsequently performing a second stage polymerization to produce a copolymer component (B) having a content of a monomer unit, based on propylene, of 95 to 5% by weight, by copolymerization of propylene and an α-olefin (provided that propylene is excluded) in the at least one continuous stirred tank reactor,
wherein melt flow rate of the polymer component (A) (MFR$_1$) and melt flow rate of the copolymer component (B) (MFR$_2$) satisfy a relation of $3 \leq \log(\text{MFR}_1/\text{MFR}_2) \leq 7$.

30. A production method of a propylene-based polymer, comprising performing multi-stage continuous vapor phase polymerization of propylene in the presence of a catalyst for olefin polymerization with the propylene polymerization reaction apparatus comprising at least one horizontal including inside a stirring element rotatable around a horizontal axis, and at least one continuous stirred tank reactor connected to said at least one horizontal reactor; and the at least one continuous stirred tank reactor comprises at least two continuous stirred tank reactors, comprising:
performing a second stage polymerization to produce a copolymer component (B) having a content of a monomer unit, based on propylene, of 95 to 5% by weight, by copolymerization of propylene and an α-olefin (provided that propylene is excluded) in the at least two continuous stirred tank reactors,
wherein the copolymer components produced in each of the at least two continuous stirred tank reactors differ in content of the α-olefin and/or molecular weight.

* * * * *